United States Patent
Hanawa

(10) Patent No.: US 8,710,123 B2
(45) Date of Patent: Apr. 29, 2014

(54) INK COMPOSITION, INK FOR INKJET RECORDING AND INK SET USING THE INK

(75) Inventor: Hideo Hanawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 732 days.

(21) Appl. No.: 12/405,256

(22) Filed: Mar. 17, 2009

(65) Prior Publication Data

US 2009/0247672 A1  Oct. 1, 2009

(30) Foreign Application Priority Data

Mar. 25, 2008 (JP) ................................. 2008-079346

(51) Int. Cl.
*C08K 5/3492* (2006.01)

(52) U.S. Cl.
USPC ........................................ 524/100; 524/105

(58) Field of Classification Search
USPC .................................. 523/160, 161
See application file for complete search history.

(56) References Cited

U.S. PATENT DOCUMENTS

| | | | |
|---|---|---|---|
| 4,970,244 A * | 11/1990 | Komai et al. | 522/46 |
| 6,896,937 B2 * | 5/2005 | Woudenberg | 427/511 |
| 7,097,701 B2 * | 8/2006 | Tateishi et al. | 106/31.49 |
| 2006/0174799 A1 * | 8/2006 | Aoai | 106/31.48 |
| 2007/0142492 A1 | 6/2007 | Odell et al. | |
| 2008/0145562 A1 * | 6/2008 | Kitamura et al. | 427/466 |

FOREIGN PATENT DOCUMENTS

| | | |
|---|---|---|
| EP | 0921166 A | 6/1999 |
| JP | 01202459 A | 8/1989 |
| JP | 5-214279 | 8/1993 |
| JP | 2003213185 | 7/2003 |
| JP | 2003-221530 | 8/2003 |
| JP | 2007-191644 * | 8/2007 |
| WO | 2005044924 A | 5/2005 |
| WO | WO 2005/044924 * | 5/2005 |

OTHER PUBLICATIONS

Machine translation of JP 2007-191644.*
Corresponding European Search Report.
Japanese Office Action dated Dec. 4, 2012, issued in corresponding Japanese Patent Application.

* cited by examiner

*Primary Examiner* — Doris Lee
(74) *Attorney, Agent, or Firm* — SOLARIS Intellectual Property Group, PLLC

(57) ABSTRACT

The invention provides an ink composition including a polymerizable compound, a polymerization initiator, a pigment and an oil-soluble dye, wherein the pigment and the oil-soluble dye are in any combination of a yellow pigment and a yellow oil-soluble dye, a magenta pigment and a magenta oil-soluble dye, or a cyan pigment and a cyan oil-soluble dye; an ink for inkjet recording; and an ink set using the ink.

11 Claims, No Drawings

INK COMPOSITION, INK FOR INKJET RECORDING AND INK SET USING THE INK

CROSS-REFERENCE TO RELATED APPLICATION

This application claims priority under 35 USC 119 from Japanese Patent Application No. 2008-079346, the disclosure of which is incorporated by reference herein.

BACKGROUND OF THE INVENTION

1. Field of the Invention

The invention relates to an ink composition, an ink for inkjet recording and an ink set using the same.

2. Description of the Related Art

Recently, materials for forming color images are specifically used as mainstream image recording materials. Specifically, inkjet type recording materials, thermosensitive transfer type image recording materials, electrophotographic recording materials, and the like are actively used. Inkjet recording methods have been rapidly coming into wide use and are further being developed since the costs for the materials are inexpensive, high-speed recording may be performed, there is little noise during recording, and color recording may be readily performed.

Aqueous ink compositions that are generally used in inkjet recording materials and the like have drawbacks in that the water resistance is deteriorated and bleeding tends to occur when printing is performed on plain paper, and in that when printing is performed on a non-water absorbing recording medium such as plastics, an image may not be formed due to poor adhesion of ink droplets, the recorded materials should be dried without being stacked immediately after printing since the solvent dries extremely slowly, and the images readily bleed.

In order to solve the problems concerning the drying property of ink, a method using a volatile organic solvent as a solvent for ink has been used. However, in order to dry quickly, it is necessary to use a solvent having a very high volatility such as methyl ethyl ketone or ethanol as a primary component.

As a method using an organic solvent, a method using a pigment as a colorant component is known (see Japanese Patent Application Laid-Open (JP-A) No. 5-214279). However, since the method uses a microparticle pigment in the form of a dispersion, aggregation of the pigment readily occurs, and inkjet nozzles are clogged, which makes stable ejection of the ink difficult. Furthermore, the method has a problem in that aggregation and the like of the ink are readily generated after long-term storage.

Moreover, the method also has a problem in that when a pigment is used as a colorant component, a desired color image quality is difficult to obtain due to insufficient color tone.

Furthermore, in order to obtain high image quality, high water resistance and high light fastness, an ink composition comprising an oil-soluble dye has been suggested (for example, see JP-A No. 2003-221530). However, the light fastness of the composition tends to be inferior to that of a pigment.

The invention aims to provide an ink composition that cures with a high sensitivity, has a high density, has an excellent light fastness and can form an image having a favorable color tone, and specifically, an ink useful for inkjet recording.

Furthermore, the invention aims to provide an ink set comprising the ink that cures at a high sensitivity, has a high density, has an excellent light fastness and can form an image having a favorable color tone.

The inventors have found that the above-mentioned problems can be solved by using an oil-soluble dye having a specific structure having an excellent light resistance as a coloring component in combination with a pigment. Since the invention has such a structure, a higher density than that of a conventional ink comprising only a pigment can be provided, the hue is easily adjusted, and the contrast can also be improved.

Namely, the means for solving the problems are as follows.

SUMMARY OF THE INVENTION

The present invention has been made in view of the above circumstances and provides an ink composition, an ink for inkjet recording and an ink set using the same.

<1> A first aspect of the present invention provides an ink composition comprising a polymerizable compound, a polymerization initiator, a pigment and an oil-soluble dye, wherein the pigment and the oil-soluble dye are in any combination of a yellow pigment and a yellow oil-soluble dye, a magenta pigment and a magenta oil-soluble dye, or a cyan pigment and a cyan oil-soluble dye.

<2> A second aspect of the present invention provides an ink for inkjet recording comprising the ink composition of <1>.

<3> A third aspect of the present invention provides an ink set comprising the ink for inkjet recording of <2>.

DETAILED DESCRIPTION OF THE INVENTION

[Ink Composition]

Since the ink composition of the invention comprises a pigment and an oil-soluble dye, it has a favorable light curing property, while it may have a higher density than that of a conventional ink composition comprising only a pigment, and may also have an improved contrast.

The ink composition of the invention may be cured upon irradiation with radiation ray. As used in the invention, the "radiation ray" is not specifically limited as long as it may impart energy that may generate an initiating species in the composition upon irradiation, and widely includes α-ray, γ-ray, X-ray, ultraviolet ray, visible ray, electron ray, and the like. Among these, ultraviolet ray and electron ray are preferable, and ultraviolet ray is particularly preferable in view of the curing sensitivity and the availability of the device. Therefore, the ink composition of the invention is preferably an ink composition that is curable upon irradiation with ultraviolet ray as radiation ray.

The ink composition of the invention comprises a polymerizable compound, a polymerization initiator, a pigment and an oil-soluble dye, wherein the L*a*b* value of the pigment and the L*a*b* value of the oil-soluble dye are in the same range and have a relationship of:

[1] the absolute value of the difference between the L* value of the pigment and the L* value of the oil-soluble dye is 34 or less,

[2] the absolute value of the difference between the a* value of the pigment and the a* value of the oil-soluble dye is 50 or less, and

[3] the absolute value of the difference between the b* value of the pigment and the b* value of the oil-soluble dye is 50 or less.

The above-mentioned relationship is more specifically described as follows:

[1] where the L* value of the pigment is defined as L1 and the L* value of the oil-soluble dye is defined as L2, the absolute value of the difference between the two L* values, i.e., |L1−L2|, is 34 or less,

[2] where the a* value of the pigment is defined as a1 and the a* value of the oil-soluble dye is defined as a2, the absolute value of the difference between the two a values, i. e., |a1−a2|, is 50 or less, and

[3] where the b* value of the pigment is defined as b1 and the b* value of the oil-soluble dye is defined as b2, the absolute value of the difference between the two b* values, i. e., |b1−b2|, is 50 or less.

By using the combination of the pigment and the oil-soluble dye having the L*a*b* values that are encompassed in the same range, the ink density may be improved without deterioration of the pigment dispersing property and light fastness. Furthermore, favorable adjustment of the color tone is performed more easily than the case where the pigment is solely used as a coloring agent for the ink. Meanwhile, the light-shielding ratio may be increased more than the case where the dye is solely used as a coloring agent for the ink.

Moreover, by adjusting the absolute values of the differences between the L* values, a* values and b* values of the pigment and oil-soluble dye to 34 or less, 50 or less and 50 or less, respectively, the color tone for each color becomes easy to be adjusted.

In the invention, the L*a*b* values refer to the values in the L*a*b* color space of CIE 1976, which are numerical values for chromaticity of coloring agents such as pigments and dyes. Specifics of the CIE1976 L*a*b* color space is described in detail in the "Fine Imaging and Color Hard Copy", The Society of Photographic Science and Technology of Japan and The Imaging Society of Japan, ed., p. 354 (1999, published by Colona Publishing Co., Ltd.). Furthermore, the tristimulus values used for the color space are the values obtained according to the method described in JIS Z8717 that defines a method for measuring the tristimulus values on the X, Y and Z coordinates of a fluorescent refractive object. The chromaticity on the CIE1976 L*a*b* color space is measured by measuring the chromaticity of the standard white color, in CIED65 (6504K) that is an international standard of standard daylight.

The L*a*b* value may be obtained by measuring using any chromaticity measurement device that may measure the chromaticity on the CIE1976 L*a*b* color space. For example, it may be measured by using C-2000 COLOR ANALYZER (trade name, manufactured by Hitachi, Ltd.) and CIE D65 (6504K) as a standard light source.

Hereinafter the components that constitute the invention are described. First, the oil-soluble dye is described.

<Oil-Soluble Dye>

In the invention, the oil-soluble dye is not specifically limited as long as it is a dye having an L*a*b* value that is included in the same range as the range of the L*a*b* value of the pigment to be used in combination.

Where the ink composition of the invention is used as a yellow ink, it is preferable that the oil-soluble dye has the L*a*b* value in which $70 \leq L^* \leq 104$, $-40 \leq a^* \leq 10$ and $70 \leq b^* \leq 120$. Herein the oil-soluble dye having an L*a*b* value in which $70 \leq L^* \leq 104$, $-40 \leq a^* \leq 10$ and $70 \leq b^* \leq 120$ is also referred to as "yellow dye".

The L*a*b* value of the yellow dye is more preferably in the range of $75 \leq L^* \leq 102$, $-35 \leq a^* \leq 5$ and $75 \leq b^* \leq 115$, and particularly preferably in the range of $80 \leq L^* \leq 100$, $-30 \leq a^* \leq 0$ and $80 \leq b^* \leq 110$.

Where the ink composition of the invention is used as a magenta ink, it is preferable that the oil-soluble dye has the L*a*b* value in which $30 \leq L^* \leq 64$, $55 \leq a^* \leq 105$ and $-40 \leq b^* \leq 10$. Hereinafter the oil-soluble dye having the L*a*b* value in which $30 \leq L^* \leq 64$, $55 \leq a^* \leq 105$ and $-40 \leq b^* \leq 10$ is also referred to as "magenta dye".

The L*a*b* value of the magenta dye is more preferably in the range of $35 \leq L^* \leq 64$, $60 \leq a^* \leq 100$ and $-35 \leq b^* \leq 5$, and particularly preferably in the range of $40 \leq L^* \leq 62$, $65 \leq a^* \leq 95$ and $-30 \leq b^* \leq 0$.

Where the ink composition of the invention is used as a cyan ink, it is preferable that the oil-soluble dye has the L*a*b* value in which $35 \leq L^* \leq 69$, $-60 \leq a^* \leq -10$ and $-70 \leq b^* \leq -20$. Hereinafter the oil-soluble dye having an L*a*b* value in which $35 \leq L^* \leq 69$, $-60 \leq a^* \leq -10$ and $-70 \leq b^* \leq -20$ is also referred to as "cyan dye".

The L*a*b* value of the cyan dye is more preferably in the range of $40 \leq L^* \leq 67$, $-55 \leq a^* \leq -15$ and $-65 \leq b^* \leq -25$, and particularly preferably in the range of $45 \leq L^* \leq 65$, $-50 \leq a^* \leq -20$ and $-60 \leq b^* \leq -30$.

—Yellow Dye—

Examples of the oil-soluble dye having an L*a*b* value in which $30 \leq L^* \leq 64$, $55 \leq a^* \leq 105$ and $-40 \leq b^* \leq 10$ include aryl or heterylazo dyes having a coupling component such as phenols, naphthols, anilines, pyrazolones, pyridones and open chain-type active methylene compounds; azomethine dyes having a coupling component such as open chain-type methylene compounds; methine dyes such as benzylidene dyes and monomethine oxonole dyes; quinone dyes such as naphthoquinone dyes and anthraquinone dyes; and the like. Among these, azo dyes, azomethine dyes and methine dyes are preferable, and dyes comprising at least one compound from the compounds represented by the following formulas (I) to (III) are more preferable, in view of solubility, light resistance, easy adjustment of the absorbed wavelength by changing the substituents. Hereinafter, the compound represented by the following formula (I), (II) or (III) is also referred to as "particular yellow dye".

Formula (I)

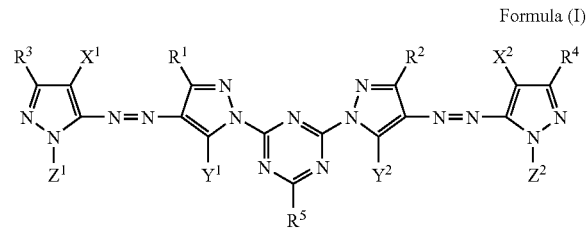

In the formula (I), $Y^1$, $Y^2$, $Z^1$ and $Z^2$, and $R^1$ to $R^5$ are each independently a hydrogen atom or a monovalent substituent. $X^1$ and $X^2$ are each independently a monovalent electron-withdrawing group having a Hammett's σp value of 0.20 or more.

Formula (II)

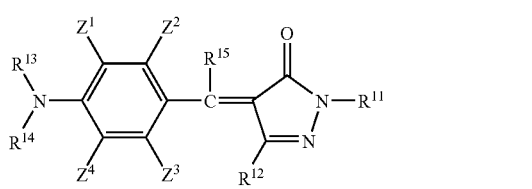

In the formula (II), $R^{11}$, $R^{13}$ and $R^{14}$ are each independently an unsubstituted or substituted alkyl group, an unsubstituted or substituted aryl group or an unsubstituted or substituted heteroaryl group, and $R^{12}$ and $R^{15}$ are each independently a hydrogen atom or a monovalent substituent, wherein $R^{13}$ and $R^{14}$ may be linked to each other to form a 5- or 6-membered hetero ring. $Z^1$, $Z^2$, $Z^3$ and $Z^4$ are each independently a hydrogen atom or a monovalent substituent, wherein $Z^1$ and $Z^2$, and $Z^3$ and $Z^4$ may be linked to each other to form a 5- or 6-membered ring.

Formula (III)

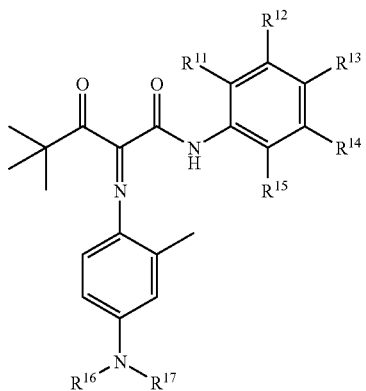

In the formula (III), $R^{11}$, $R^{12}$, $R^{13}$, $R^{14}$ and $R^{15}$ are each independently a hydrogen atom or a monovalent substituent. $R^{16}$ and $R^{17}$ are each independently an unsubstituted or substituted alkyl group, an unsubstituted or substituted aryl group or an unsubstituted or substituted heteroaryl group, or may be linked to each other to form a ring.

[Compound Represented by the Formula (I)]

First, the compound represented by the formula (I) is described.

In the formula (I), $Y^1$, $Y^2$, $Z^1$ and $Z^2$, and $R^1$ to $R^5$ are each independently a hydrogen atom or a monovalent substituent. $X^1$ and $X^2$ are each independently a monovalent electron-withdrawing group having a Hammett's σp value of 0.20 or more.

Examples of the monovalent substituent may include halogen atoms, alkyl groups, a cycloalkyl groups, aralkyl groups, alkenyl groups, alkynyl groups, aryl groups, heterocyclic groups, a cyano group, a hydroxyl group, a nitro group, alkoxy groups, aryloxy groups, a silyloxy group, heterocycleoxy groups, acyloxy groups, carbamoyloxy groups, alkoxycarbonyloxy groups, aryloxycarbonyloxy groups, amino groups (alkylamino groups and arylamino groups), acylamino groups (amide groups), an aminocarbonylamino group (an ureido group), alkoxycarbonylamino groups, aryloxycarbonylamino groups, sulfamoylamino groups, alkylsulfonylamino groups, arylsulfonylamino groups, alkylthio groups, arylthio groups, heterocyclethio groups, sulfamoyl groups, alkylsulfinyl groups, arylsulfinyl groups, alkylsulfonyl groups, arylsulfonyl groups, acyl groups, aryloxycarbonyl groups, alkoxycarbonyl groups, carbamoyl groups, a phosphino group, a phosphinyl group, a phosphinyloxy group, a phosphinylamino group, silyl groups, azo groups, imide groups, and the like, and each substituent may further have substituents. Hereinafter the monovalent substituent is further described in detail.

The halogen atom represents a chlorine atom, a bromine atom or an iodine atom. Among these, a chlorine atom or a bromine atom is preferable, and a chlorine atom is particularly preferable.

The alkyl group includes unsubstituted or substituted alkyl groups. The unsubstituted or substituted alkyl group is preferably an alkyl group having 1 to 30 carbon atoms. Examples of the substituents where the alkyl group may have further substituents include a linear or branched chain alkyl group having 1 to 12 carbon atoms, a linear or branched chain aralkyl group having 7 to 18 carbon atoms, a linear or branched chain alkenyl group having 2 to 12 carbon atoms, a linear or branched chain alkynyl group having 2 to 12 carbon atoms, a linear or branched chain cycloalkyl group having 3 to 12 carbon atoms, a linear or branched chain cycloalkenyl group having 3 to 12 carbon atoms. Among the above-mentioned groups, branched groups are preferable because they improve the solubility of the dye and the stability of the ink, and those having an asymmetry carbon are particularly preferable. Examples include methyl, ethyl, propyl, isopropyl, sec-butyl, t-butyl, 2-ethylhexyl, 2-methylsulfonylethyl, 3-phenoxypropyl, trifluoromethyl and cyclopentyl. Other examples of the substituents include halogen atoms (for example, a chlorine atom, a bromine atom), aryl groups (for example, phenyl, 4-t-butylphenyl, 2,4-di-t-amylphenyl), heterocyclic groups (for example, imidazolyl, pyrazolyl, triazolyl, 2-furyl, 2-thienyl, 2-pyrimidinyl, 2-benzothiazolyl), a cyano group, a hydroxyl group, a nitro group, an amino group, alkyloxy groups (for example, methoxy, ethoxy, 2-methoxyethoxy, 2-methylsulfonylethoxy), aryloxy groups (for example, phenoxy, 2-methylphenoxy, 4-t-butylphenoxy, 3-nitrophenoxy, 3-t-butyloxycarbonylphenoxy, 3-methoxycarbonylphenyloxy), acylamino groups (for example, acetamide, benzamide, 4-(3-t-butyl-4-hydroxyphenoxy)butanamide), alkylamino groups (for example, methylamino, butylamino, diethylamino, methylbutylamino), arylamino groups (for example, phenylamino, 2-chloroanilino), ureido groups (for example, phenylureido, methylureido, N,N-dibutylureido), sulfamoylamino groups (for example, N,N-dipropylsulfamoylamino), alkylthio groups (for example, methylthio, octylthio, 2-phenoxyethylthio), arylthio groups (for example, phenylthio, 2-butoxy-5-t-octylphenylthio, 2-carboxyphenylthio), alkyloxycarbonylamino groups (for example, methoxycarbonylamino), alkylsulfonylamino groups and arylsulfonylamino groups (for example, methylsulfonylamino, phenylsulfonylamino, p-toluenesulfonylamino), carbamoyl groups (for example, N-ethylcarbamoyl, N,N-dibutylcarbamoyl), sulfamoyl groups (for example, N-ethylsulfamoyl, N,N-dipropylsulfamoyl, N-phenylsulfamoyl), sulfonyl groups (for example, methylsulfonyl, octylsulfonyl, phenylsulfonyl, p-toluenesulfonyl), alkyloxycarbonyl groups (for example, methoxycarbonyl, butyloxycarbonyl), heterocycleoxy groups (for example, 1-phenyltetrazole-5-oxy, 2-tetrahydropyranyloxy), azo groups (for example, phenylazo, 4-methoxyphenylazo, 4-pivaloylaminophenylazo, 2-hydroxy-4-propanoylphenylazo), acyloxy groups (for example, acetoxy), carbamoyloxy groups (for example, N-methylcarbamoyloxy, N-phenylcarbamoyloxy), silyloxy groups (for example, trimethylsilyloxy, dibutylmethylsilyloxy), aryloxycarbonylamino groups (for example, phenoxycarbonylamino), imide groups (for example, N-succinimide, N-phthalimide), heterocyclethio groups (for example, 2-benzothiazolylthio, 2,4-di-phenoxy-1,3,5-triazole-6-thio, 2-pyridylthio), sulfinyl groups (for example, 3-phenoxypropylsulfinyl), phosphonyl groups (for example, phenoxyphosphonyl, octyloxyphosphonyl, phenylphosphonyl), aryloxycarbonyl groups (for example, phenoxycarbonyl), acyl groups (for example, acetyl, 3-phenylpropanoyl, benzoyl), ionic hydrophilic groups (for example, a carboxyl group, a sulfo group, a phosphono group and a quaternary ammonium group).

The cycloalkyl group includes unsubstituted or substituted cycloalkyl groups. The unsubstituted or substituted cycloalkyl group is preferably a cycloalkyl group having 5 to 30 carbon atoms. Examples of the substituent include those similar to the substituents for the case where the above-mentioned alkyl group may have further substituents. Examples of the cycloalkyl group may include cyclohexyl, cyclopentyl and 4-n-dodecylcyclohexyl.

The aralkyl group includes unsubstituted or substituted aralkyl groups. The unsubstituted or substituted aralkyl group is preferably an aralkyl group having 7 to 30 carbon atoms. Preferable examples of the substituent include those similar to the substituents for the case where the above-mentioned alkyl group may have further substituents. Examples of the aralkyl may include benzyl and 2-phenethyl.

The alkenyl group includes linear, branched or cyclic unsubstituted or substituted alkenyl groups. Preferable examples may include a unsubstituted or substituted alkenyl group having 2 to 30 carbon atoms such as vinyl, allyl, prenyl, geranyl, oleyl, 2-cyclopenten-1-yl and 2-cyclohexen-1-yl.

The alkynyl group is an unsubstituted or substituted alkynyl group having 2 to 30 carbon atoms, and examples may include ethynyl and propargyl.

The aryl group is an unsubstituted or substituted aryl group having 6 to 30 carbon atoms, and examples include phenyl, p-tolyl, naphthyl, m-chlorophenyl and o-hexadecanoylaminophenyl. Examples of the substituent include those similar to the substituents for the case where the above-mentioned alkyl group may have further substituents.

The heterocyclic group is a monovalent group obtained by removing one hydrogen atom from a 5 or 6-membered unsubstituted or substituted aromatic or non-aromatic heterocyclic compound, and the group may further be condensed. More preferably, it is a 5- or 6-membered aromatic heterocyclic group having 3 to 30 carbon atoms.

Examples of the substituent include those similar to the substituents for the case where the above-mentioned alkyl group may have further substituents. Examples of the heterocyclic group include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like, which are exemplified without limiting the positions for substitution.

The alkoxy group includes unsubstituted or substituted alkoxy groups. The unsubstituted or substituted alkoxy group is preferably an alkoxy group having 1 to 30 carbon atoms. Examples of the substituent include those similar to the substituents for the case where the above-mentioned alkyl group may have further substituents. Examples of the alkoxy group may include methoxy, ethoxy, isopropoxy, n-octyloxy, methoxyethoxy, hydroxyethoxy, 3-carboxypropoxy, and the like.

As the aryloxy group, an unsubstituted or substituted aryloxy group having 6 to 30 carbon atoms is preferable. Examples of the substituent include those similar to the substituents for the case where the above-mentioned alkyl group may have further substituents. Examples of the aryloxy group may include phenoxy, 2-methylphenoxy, 4-t-butylphenoxy, 3-nitrophenoxy, 2-tetradecanoylaminophenoxy, and the like.

As the silyloxy group, a silyloxy group 3 to 20 carbon atoms is preferable, and examples may include trimethylsilyloxy, t-butyldimethylsilyloxy, and the like.

As the heterocycleoxy group, an unsubstituted or substituted heterocycleoxy group having 2 to 30 carbon atoms is preferable. Examples of the substituent include those similar to the substituents for the case where the above-mentioned alkyl group may have further substituents. Examples of the heterocycleoxy group may include 1-phenyltetrazole-5-oxy, 2-tetrahydropyranyloxy, and the like.

As the acyloxy group, a formyloxy group, an unsubstituted or substituted alkylcarbonyloxy group having 2 to 30 carbon atoms and an unsubstituted or substituted arylcarbonyloxy group having 6 to 30 carbon atoms are preferable. Examples of the substituent include those similar to the substituents for the case where the above-mentioned alkyl group may have further substituents. Examples of the acyloxy group may include formyloxy, acetyloxy, pivaloyloxy, stearoyloxy, benzoyloxy, p-methoxyphenylcarbonyloxy, and the like.

As the carbamoyloxy group, an unsubstituted or substituted carbamoyloxy group having 1 to 30 carbon atoms is preferable. Examples of the substituent include those similar to the substituents for the case where the above-mentioned alkyl group may have further substituents. Examples of the carbamoyloxy group may include N,N-dimethylcarbamoyloxy, N,N-diethylcarbamoyloxy, morpholinocarbonyloxy, N,N-di-n-octylaminocarbonyloxy, N-n-octylcarbamoyloxy, and the like.

As the alkoxycarbonyloxy group, an unsubstituted or substituted alkoxycarbonyloxy group having 2 to 30 carbon atoms is preferable. Examples of the substituent include those similar to the substituents for the case where the above-mentioned alkyl group may have further substituents. Examples of the alkoxycarbonyloxy group may include methoxycarbonyloxy, ethoxycarbonyloxy, t-butoxycarbonyloxy, n-octylcarbonyloxy, and the like.

As the aryloxycarbonyloxy group, an unsubstituted or substituted aryloxycarbonyloxy group having 7 to 30 carbon atoms is preferable. Examples of the substituent include those similar to the substituents for the case where the above-mentioned alkyl group may have further substituents. Examples of the aryloxycarbonyloxy group may include phenoxycarbonyloxy, p-methoxyphenoxycarbonyloxy, p-n-hexadecyloxyphenoxycarbonyloxy, and the like.

As the amino group, an unsubstituted or substituted alkylamino group having 1 to 30 carbon atoms and an unsubstituted or substituted arylamino group having 6 to 30 carbon atoms are preferable. Examples of the substituent include those similar to the substituents for the case where the above-mentioned alkyl group may have further substituents. Examples of the amino group may include amino, methylamino, dimethylamino, anilino, N-methylanilino, diphenylamino, hydroxyethylamino, carboxyethylamino, a sulfoethylamino, 3,5-dicarboxyanilino, and the like.

As the acylamino group, a formylamino group, an unsubstituted or substituted alkylcarbonylamino group having 1 to 30 carbon atoms and an unsubstituted or substituted arylcarbonylamino group having 6 to 30 carbon atoms are preferable. Examples of the substituent include those similar to the substituents for the case where the above-mentioned alkyl group may have further substituents. Examples of the acylamino group may include formylamino, acetylamino, pivaloylamino, lauroylamino, benzoylamino, 3,4,5-tri-n-octyloxyphenylcarbonylamino, and the like.

As the aminocarbonylamino group, an unsubstituted or substituted aminocarbonylamino group having 1 to 30 carbon atoms is preferable. Examples of the substituent include those similar to the substituents for the case where the above-mentioned alkyl group may have further substituents. Examples of the aminocarbonylamino group may include carbamoylamino, N,N-dimethylaminocarbonylamino, N,N-diethylaminocarbonylamino, morpholinocarbonylamino, and the like.

As the alkoxycarbonylamino group, an unsubstituted or substituted alkoxycarbonylamino group having 2 to 30 carbon atoms is preferable. Examples of the substituent include those similar to the substituents for the case where the above-mentioned alkyl group may have further substituents. Examples of the alkoxycarbonylamino group may include methoxycarbonylamino, ethoxycarbonylamino, t-butoxycarbonylamino, n-octadecyloxycarbonylamino, N-methylmethoxycarbonylamino, and the like.

As the aryloxycarbonylamino group, an unsubstituted or substituted aryloxycarbonylamino group having 7 to 30 carbon atoms is preferable. Examples of the substituent include those similar to the substituents for the case where the above-mentioned alkyl group may have further substituents. Examples of the aryloxycarbonylamino group may include phenoxycarbonylamino, p-chlorophenoxycarbonylamino, m-n-octyloxyphenoxycarbonylamino, and the like.

As the sulfamoylamino group, an unsubstituted or substituted sulfamoylamino group having 0 to 30 carbon atoms is preferable. Examples of the substituent include those similar to the substituents for the case where the above-mentioned alkyl group may have further substituents. Examples of the sulfamoylamino group may include sulfamoylamino, N,N-dimethylaminosulfonylamino, N-n-octylaminosulfonylamino, and the like. As the alkylsulfonylamino group and arylsulfonylamino group, an unsubstituted or substituted alkylsulfonylamino group having 1 to 30 carbon atoms and an unsubstituted or substituted arylsulfonylamino group having 6 to 30 carbon atoms are preferable. Examples of the substituent include those similar to the substituents for the case where the above-mentioned alkyl group may have further substituents. Examples of the alkylsulfonylamino group and arylsulfonylamino group may include methylsulfonylamino, butylsulfonylamino, phenylsulfonylamino, 2,3,5-trichlorophenylsulfonylamino, p-methylphenylsulfonylamino, and the like.

As the alkylthio group, an unsubstituted or substituted alkylthio group having 1 to 30 carbon atoms is preferable. Examples of the substituent include those similar to the substituents for the case where the above-mentioned alkyl group may have further substituents. Examples of the alkylthio group may include methylthio, ethylthio, n-hexadecylthio, and the like.

As the arylthio group, an unsubstituted or substituted arylthio group having 6 to 30 carbon atoms is preferable. Examples of the substituent include those similar to the substituents for the case where the above-mentioned alkyl group may have further substituents. Examples of the arylthio group may include phenylthio, p-chlorophenylthio, m-methoxyphenylthio, and the like.

As the heterocyclethio group, an unsubstituted or substituted heterocyclethio group having 2 to 30 carbon atoms is preferable. Examples of the substituent include those similar to the substituents for the case where the above-mentioned alkyl group may have further substituents. Examples of the heterocyclethio group may include 2-benzothiazolylthio, 1-phenyltetrazol-5-ylthio, and the like.

As the sulfamoyl group, an unsubstituted or substituted a sulfamoyl group having 0 to 30 carbon atoms is preferable. Examples of the substituent include those similar to the substituents for the case where the above-mentioned alkyl group may have further substituents. Examples of the sulfamoyl group may include N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl), and the like.

As the alkylsulfinyl group and arylsulfinyl group, an unsubstituted or substituted alkylsulfinyl group having 1 to 30 carbon atoms and an unsubstituted or substituted arylsulfinyl group having 6 to 30 carbon atoms are preferable. Examples of the substituent include those similar to the substituents for the case where the above-mentioned alkyl group may have further substituents. Examples of the alkylsulfinyl and arylsulfinyl groups may include methylsulfinyl, ethylsulfinyl, phenylsulfinyl, p-methylphenylsulfinyl, and the like.

As the alkylsulfonyl group and arylsulfonyl group, an unsubstituted or substituted alkylsulfonyl group having 1 to 30 carbon atoms and an unsubstituted or substituted arylsulfonyl group having 6 to 30 carbon atoms are preferable. Examples of the substituent include those similar to the substituents for the case where the above-mentioned alkyl group may have further substituents. Examples of the alkylsulfonyl and arylsulfonyl group may include methylsulfonyl, ethylsulfonyl, phenylsulfonyl, p-toluenesulfonyl, and the like.

As the acyl group, a formyl group, an unsubstituted or substituted alkylcarbonyl group having 2 to 30 carbon atoms, an unsubstituted or substituted arylcarbonyl group having 7 to 30 carbon atoms, and a heterocyclecarbonyl group having 4 to 30 carbon atoms that is linked to a carbonyl group at the carbon atom are preferable. Examples of the substituent include those similar to the substituents for the case where the above-mentioned alkyl group may have further substituents. Examples of the acyl group may include acetyl, pivaloyl, 2-chloroacetyl, stearoyl, benzoyl, p-n-octyloxyphenylcarbonyl, 2-pyridylcarbonyl, 2-furylcarbonyl, and the like.

As the aryloxycarbonyl group, an unsubstituted or substituted aryloxycarbonyl group having 7 to 30 carbon atoms is preferable. Examples of the substituent include those similar to the substituents for the case where the above-mentioned alkyl group may have further substituents. Examples of the aryloxycarbonyl group may include phenoxycarbonyl, o-chlorophenoxycarbonyl, m-nitrophenoxycarbonyl, p-t-butylphenoxycarbonyl, and the like.

As the alkoxycarbonyl group, an unsubstituted or substituted alkoxycarbonyl group having 2 to 30 carbon atoms is preferable. Examples of the substituent include those similar to the substituents for the case where the above-mentioned alkyl group may have further substituents. Examples of the alkoxycarbonyl group may include methoxycarbonyl, ethoxycarbonyl, t-butoxycarbonyl, n-octadecyloxycarbonyl, and the like.

As the carbamoyl group, an unsubstituted or substituted carbamoyl group having 1 to 30 carbon atoms is preferable. Examples of the substituent include those similar to the substituents for the case where the above-mentioned alkyl group may have further substituents. Examples of the carbamoyl group may include carbamoyl, N-methylcarbamoyl, N,N-dimethylcarbamoyl, N,N-di-n-octylcarbamoyl, N-(methylsulfonyl)carbamoyl, and the like.

As the phosphino group, an unsubstituted or substituted phosphino group having 2 to 30 carbon atoms is preferable. Examples of the substituent include those similar to the substituents for the case where the above-mentioned alkyl group may have further substituents. Examples of the phosphino group may include dimethylphosphino, diphenylphosphino, methylphenoxyphosphino, and the like.

As the phosphinyl group, an unsubstituted or substituted phosphinyl group having 2 to 30 carbon atoms is preferable. Examples of the substituent include those similar to the substituents for the case where the above-mentioned alkyl group may have further substituents. Examples of the phosphinyl group may include phosphinyl, dioctyloxyphosphinyl, diethoxyphosphinyl, and the like.

As the phosphinyloxy group, an unsubstituted or substituted phosphinyloxy group having 2 to 30 carbon atoms is preferable. Examples of the substituent include those similar to the substituents for the case where the above-mentioned alkyl group may have further substituents. Examples of the phosphinyloxy group may include diphenoxyphosphinyloxy, dioctyloxyphosphinyloxy, and the like.

As the phosphinylamino group, an unsubstituted or substituted phosphinylamino group having 2 to 30 carbon atoms is preferable. Examples of the substituent include those similar to the substituents for the case where the above-mentioned alkyl group may have further substituents. Examples of the phosphinylamino group may include dimethoxyphosphinylamino, dimethylaminophosphinylamino, and the like.

As the silyl group, an unsubstituted or substituted silyl group having 3 to 30 carbon atoms is preferable. Examples of the substituent include those similar to the substituents for the case where the above-mentioned alkyl group may have further substituents. Examples of the silyl group may include trimethylsilyl, t-butyldimethylsilyl, phenyldimethylsilyl, and the like.

The azo group may include phenylazo, 4-methoxyphenylazo, 4-pivaloylaminophenylazo, 2-hydroxy-4-propanoylphenylazo, and the like.

The imide group may include N-succinimide, N-phthalimide, and the like.

As $R^1$ and $R^2$, an unsubstituted or substituted alkyl group having C1-C12 carbon atoms in total, an unsubstituted or substituted aryl group having C6-C18 carbon atoms in total, and an unsubstituted or substituted heterocyclic group having C4-C12 carbon atoms in total are preferable, of which a linear or branched alkyl group having C1-C8 carbon atoms in total is preferable, secondary or tertiary alkyl groups are particularly preferable, and t-butyl group is the most preferable.

As $R^3$ and $R^4$, a hydrogen atom, an unsubstituted or substituted alkyl group having C1-C12 carbon atoms in total, an unsubstituted or substituted aryl group having C6-C18 carbon atoms in total, and an unsubstituted or substituted heterocyclic group having C4-C12 carbon atoms in total are preferable, of which a hydrogen atom and a linear or branched alkyl group having C1-C8 carbon atoms in total are preferable, a hydrogen atom and a C1-C8 alkyl group are particularly preferable, and a hydrogen atom is the most preferable.

As $R^5$, an unsubstituted or substituted alkyl group having C1-C12 carbon atoms in total, an unsubstituted or substituted aryl group having C6-C18 carbon atoms in total, an unsubstituted or substituted heterocyclic group having C4-C12 carbon atoms in total, a halogen atom, an aryl group, a hydroxyl group, an amino group, an alkyloxy group, an aryloxy group, an acyloxy group, a carbamoyloxy group, a silyloxy group, an ionic hydrophilic group (for example, a carboxyl group, a sulfo group, a phosphono group and a quaternary ammonium group) are preferable, of which a hydroxyl group, an alkyloxy group, an aryloxy group, an acyloxy group and a carbamoyloxy group are preferable, a hydroxyl group, an alkyloxy group and an aryloxy group are particularly preferable, and an alkyloxy group is the most preferable.

As $Y^1$ and $Y^2$, a hydroxyl group and an amino group are preferable, and an amino group is more preferable.

In the formula (I), $Z^1$ and $Z^2$ are each preferably a hydrogen atom, an unsubstituted or substituted alkyl group, an unsubstituted or substituted cycloalkyl group, an unsubstituted or substituted alkenyl group, an unsubstituted or substituted alkynyl group, an unsubstituted or substituted aralkyl group, an unsubstituted or substituted aryl group, or an unsubstituted or substituted heterocyclic group. Particularly preferable substituents are a substituted aryl group and a substituent heterocyclic group, of which a substituted aryl group is particularly preferable.

In the formula (I), $X^1$ and $X^2$ are each independently a monovalent electron-withdrawing group having a Hammett's σp value of 0.20 or more.

Specifically, the electron-withdrawing group as used herein is an electron-withdrawing group having a Hammett's substituent constant σp value of 0.20 or more, more preferably an electron-withdrawing group having a σp value of 0.30 or more. The upper limit of the σp value for the electron-withdrawing group is 1.0 or less.

The Hammett's substituent constant σp value as used in the present specification is briefly described here. The Hammett's law is an empirical rule that was suggested by L. P. Hammett in 1935 so as to quantitatively discuss the effect of substituents on the reaction or equilibrium of benzene derivatives, and its reasonability is now broadly recognized. The substituent constants obtained in the Hammett's law are the σp and σm values, and these values may be found in many general publications. For example, these values are described in detail in J. A. Dean ed., "Lange's Handbook of Chemistry", 12$^{th}$ edition, 1979 (McGraw-Hill) and "Kagaku no Ryouiki (Journal of Japanese Chemistry)", extra number, Vol. 122, pp. 96-103, 1979 (published by Nankodo Co., Ltd.). Although the substituents in the invention are limited and described by the Hammett's substituent constant σp, this does not mean that the substituents are not limited to those having known values that may be found in the above-mentioned publications, and it is obvious that the substituents also encompasses substituents that would be encompassed in the range of the value measured based on the Hammett's law even if the value is not known from publications. Although the compound represented by the formula (I) used in the invention is not a benzene derivative, the σp value is used as a measure for showing the electron effect of the substituents, regardless of the positions of substitution. In the invention, the σp value is hereinafter used for such meaning.

Specific examples of the monovalent electron-withdrawing group having a σp value of 0.20 or more for $X^1$ and $X^2$ include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing group having a σp value of 0.20 or more, a heterocyclic group, a halogen atom, an azo group and a selenocyanate group.

Preferable examples of $X^1$ and $X^2$ may include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkyloxy group having 1 to 12 carbon atoms, a halogenated alkylthio group having 1 to 12 carbon atoms, a halogenated aryloxy group having 7 to 18 carbon atoms, an aryl group having 7 to 18 carbon atoms substituted by two or more other electron-withdrawing groups having σp of 0.20 or more, and a 5- to 8-membered heterocyclic group having 1 to 18 carbon atoms and a nitrogen atom, an oxygen atom or a sulfur atom.

Further preferable examples include a cyano group, an alkylsulfonyl group having 1 to 12 carbon atoms, an arylsulfonyl group having 6 to 18 carbon atoms and a sulfamoyl group having 0 to 12 carbon atoms.

Particularly preferable examples of $X^1$ and $X^2$ include a cyano group, an alkylsulfonyl group having 1 to 12 carbon atoms and a sulfamoyl group having 0 to 12 carbon atoms, and the most preferable examples include a cyano group and an alkylsulfonyl group having 1 to 12 carbon atoms.

Examples of the combination of the substituents for the compound represented by the formula (I) include, a compound having the preferable group above as at least 1 of the various substituent groups is preferable, a compound having the preferable group above as more of the various substituent groups is more preferable, and a compound having the preferable group above as all of the substituent groups is most preferable.

Furthermore, it is more preferable that the compound represented by the formula (I) is the compound represented by the following formula (I-1). Hereinafter the formula (I-1) is described in detail.

In the formula (I-1), $R^5$ to $R^8$ are each independently preferably a halogen atom, a carboxyl group, an acylamino group (an amide group), an aminocarbonylamino group (an ureido group), alkoxycarbonylamino group, an aryloxycarbonylamino group, a sulfamoylamino group, an alkylsulfonylamino group, an arylsulfonylamino group, a sulfamoyl group, an alkylsulfinyl group, an arylsulfinyl group, an alkylsulfonyl group, an arylsulfonyl group, an aryloxycarbonyl group, an alkoxycarbonyl group or a carbamoyl group; further preferably a carboxyl group, an alkylsulfinyl group, an arylsulfinyl group, an alkylsulfonyl group, an arylsulfonyl group, an aryloxycarbonyl group, an alkoxycarbonyl group or a carbamoyl group; particularly preferably a carboxyl group, an aryloxycarbonyl group and an alkoxycarbonyl group; and the most preferably an alkoxycarbonyl group. Alternatively, they are each preferably a group having an ester structure from the viewpoint that excellent oil-solubility and light fastness may be readily obtained.

In the formula (I-1), $Y^1$ and $Y^2$ are as defined by $Y^1$ and $Y^2$ in the above-mentioned formula (I), and the preferable ranges therefor are the same.

In the formula (I-1), preferable examples of W include a hydrogen atom, an unsubstituted or substituted alkyl group having C1-C12 carbon atoms in total, an unsubstituted or substituted aryl group having C6-C18 carbon atoms in total, an unsubstituted or substituted heterocyclic group having C4-C12 carbon atoms in total, an acyl group, a carbamoyl group and a silyl group, of which a hydrogen atom, an unsubstituted or substituted alkyl group having C1-C12 carbon atoms in total and an unsubstituted or substituted aryl group having C6-C18 carbon atoms in total are preferable, a hydrogen atom and an unsubstituted or substituted alkyl group having C1-C12 carbon atoms in total are particularly preferable, and an unsubstituted or substituted alkyl group having C1-C12 carbon atoms in total is the most preferable.

In the formula (I-1), $X^1$ and $X^2$ are each independently a monovalent electron-withdrawing group and as defined by $X^1$ and $X^2$ in the above-mentioned formula (I), and the preferable ranges therefor are the same.

Examples of the combination of the preferable substituents for the compound represented by the formula (I-1) include, a compound having the preferable group above as at least 1 of

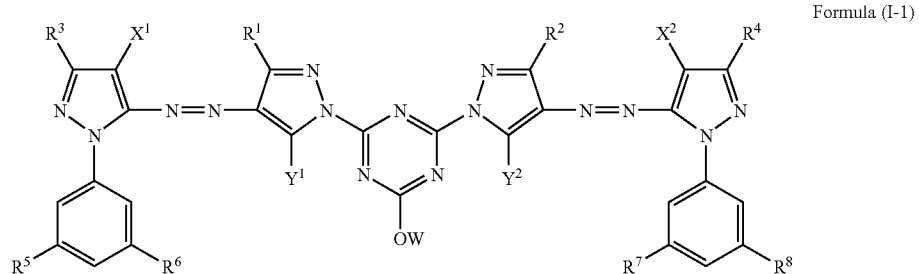

Formula (I-1)

In the formula (I-1), W, $Y^1$, $Y^2$ and $R^1$ to $R^8$ are each independently a hydrogen atom or a monovalent substituent.

In the formula (I-1), $R^1$ and $R^2$ are as defined by $R^1$ and $R^2$ in the above-mentioned formula (I), and the preferable ranges therefor are the same.

In the formula (I-1), $R^3$ and $R^4$ are as defined by $R^3$ and $R^4$ in the above-mentioned formula (I), and the preferable ranges therefor are the same.

the various substituent groups is preferable, a compound having the preferable group above as more of the various substituent groups is more preferable, and a compound having the preferable group above as all of the substituent groups is most preferable.

Hereinafter the specific examples of the dyes represented by the formulas (I) and (I-1) (exemplified dyes DYE-A1 to DYE-A22) are shown, but the oil-soluble dye used in the invention is not limited by the following examples.

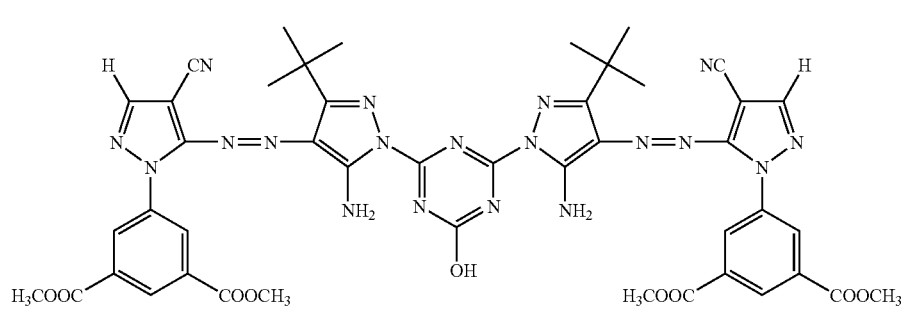
DYE-A1
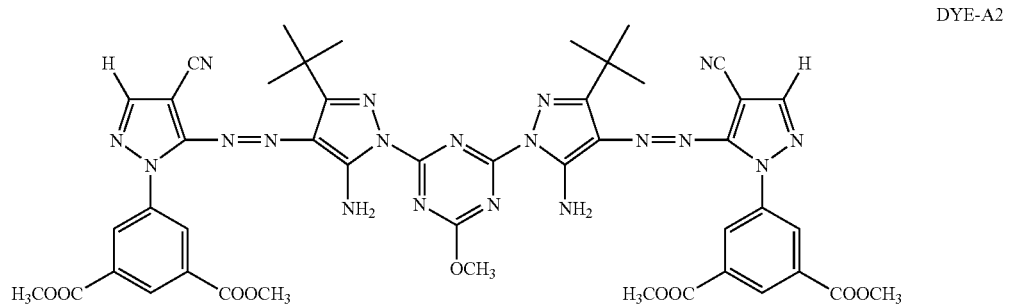
DYE-A2
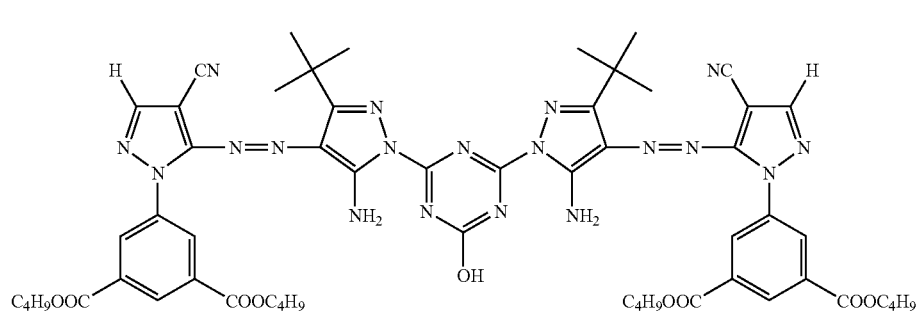
DYE-A3
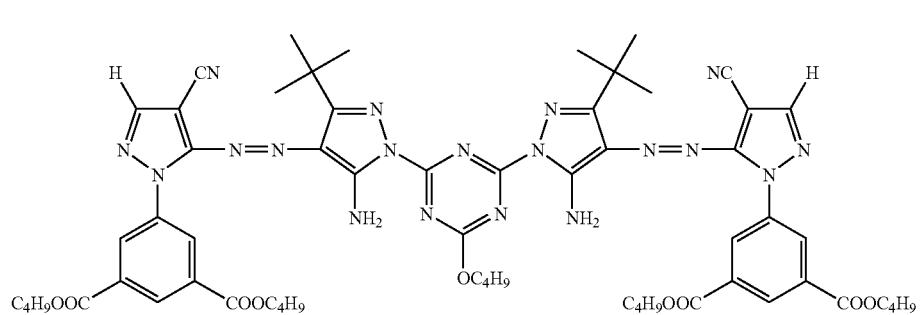
DYE-A4
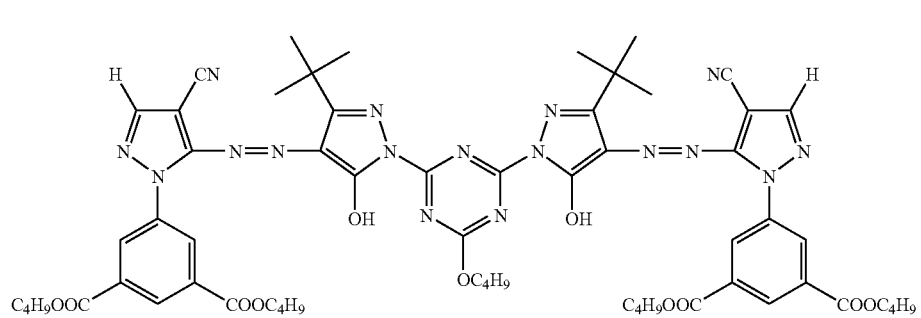
DYE-A5

-continued
DYE-A6
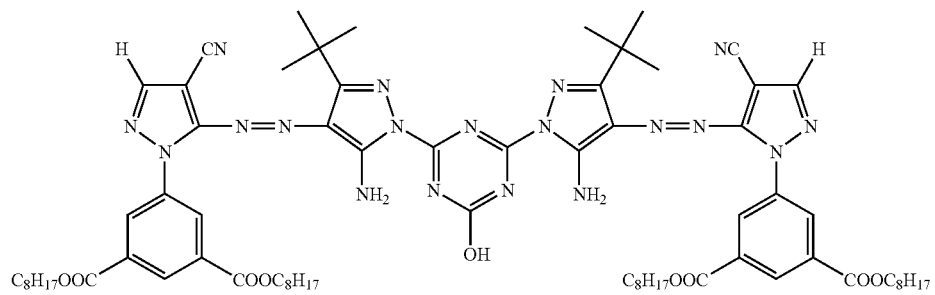
DYE-A7
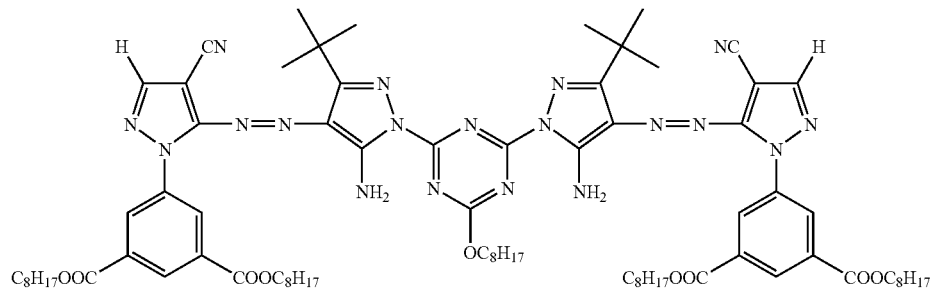
DYE-A8
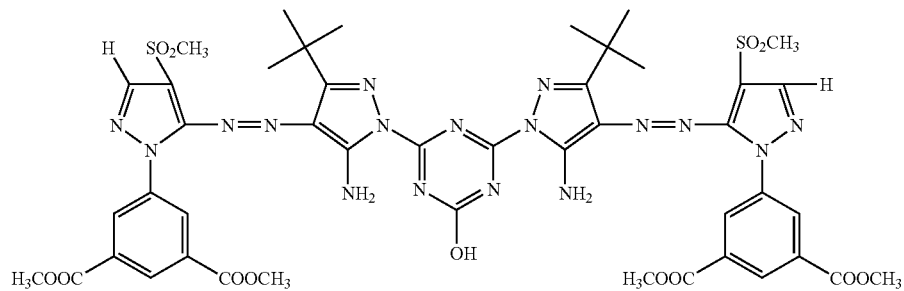
DYE-A9
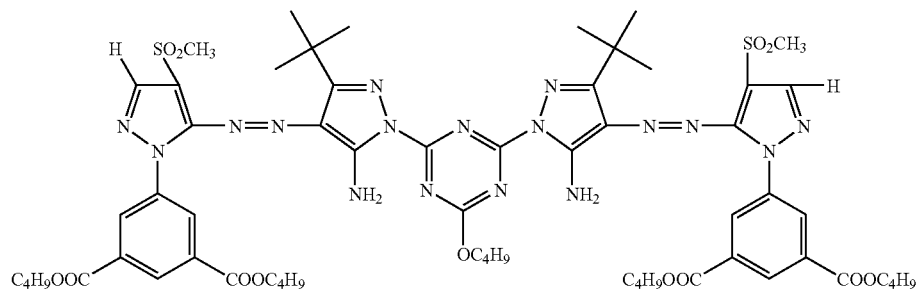
DYE-A10
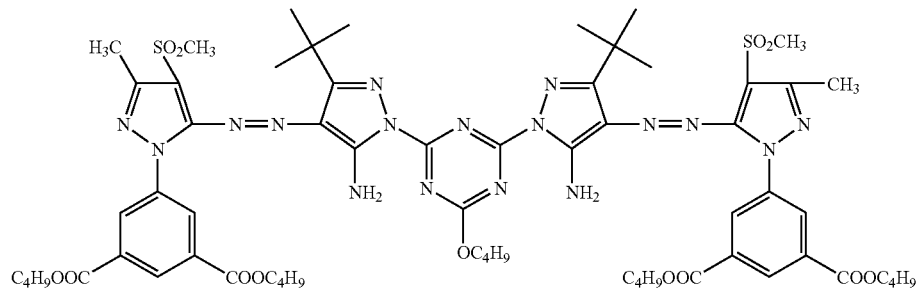

-continued
DYE-A11
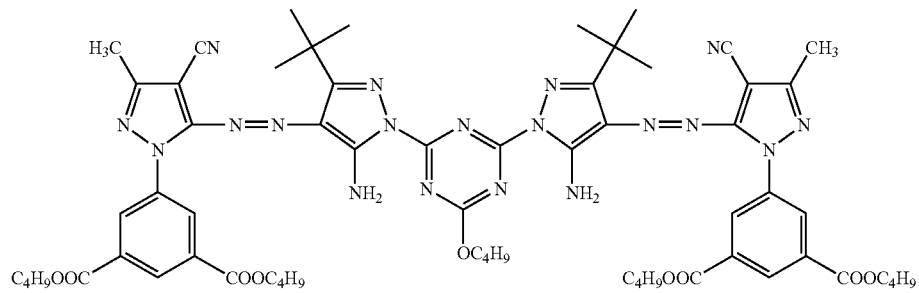
DYE-A12
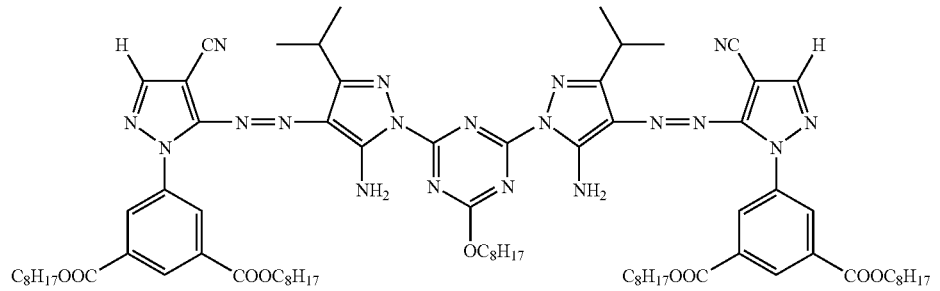
DYE-A13
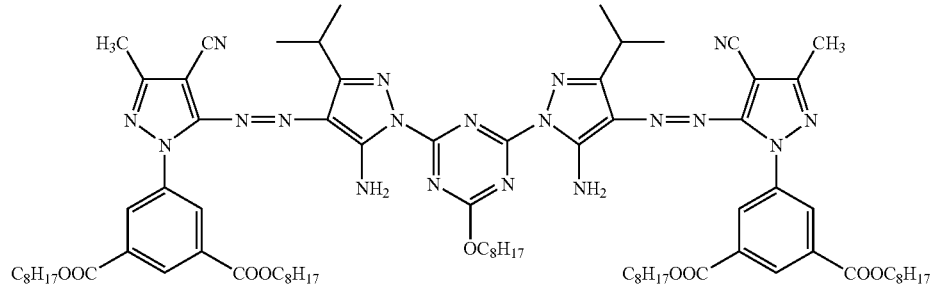
DYE-A14
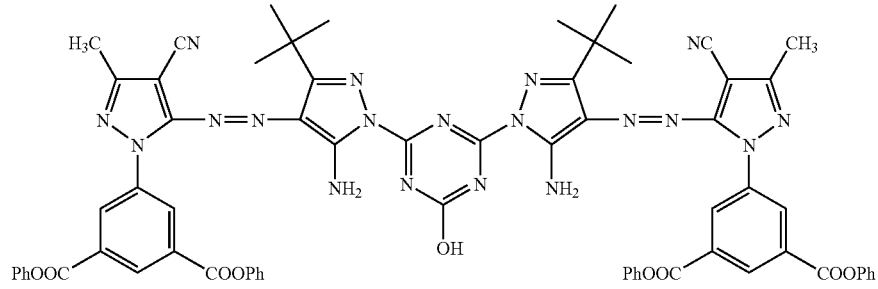
DYE-A15
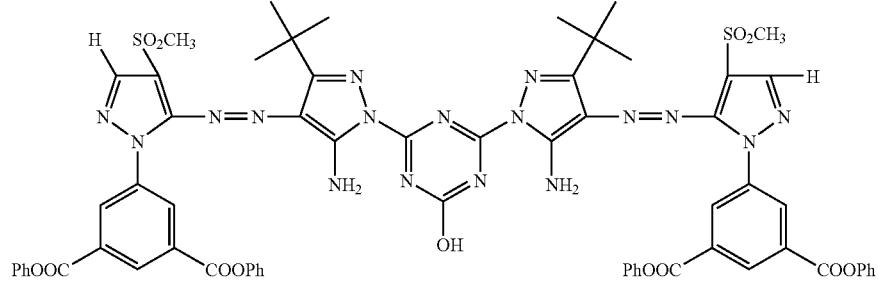

-continued
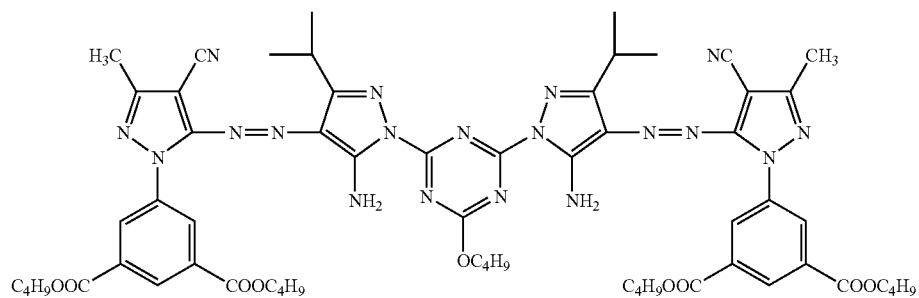
DYE-A16
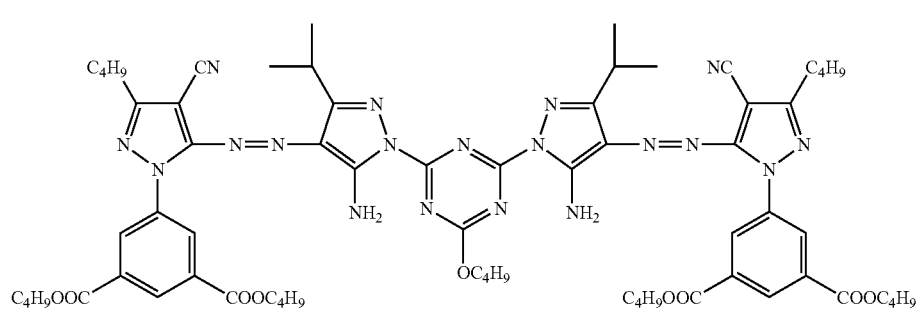
DYE-A17
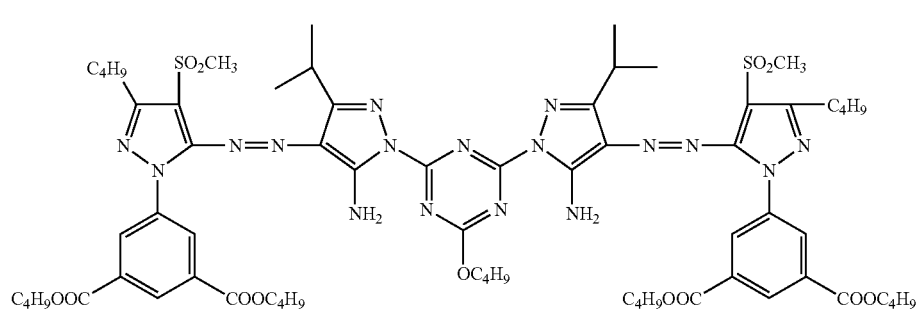
DYE-A18
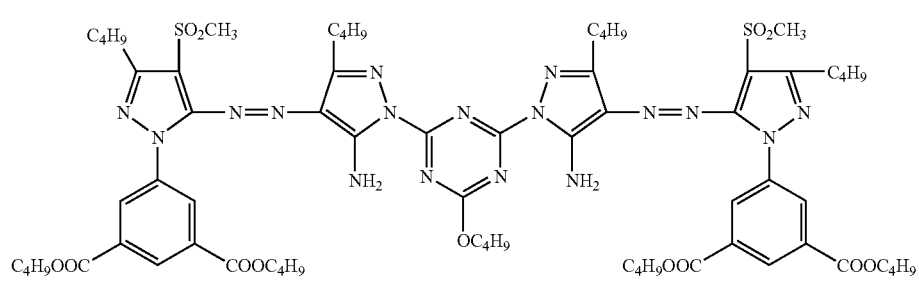
DYE-A19
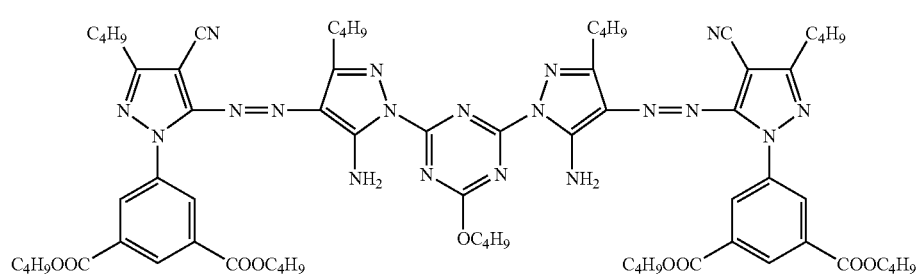
DYE-A20

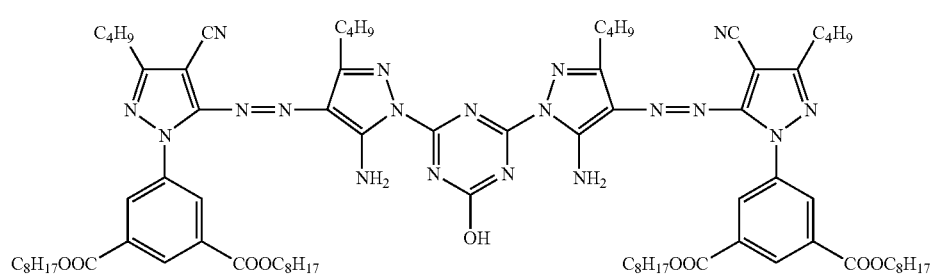

DYE-A21

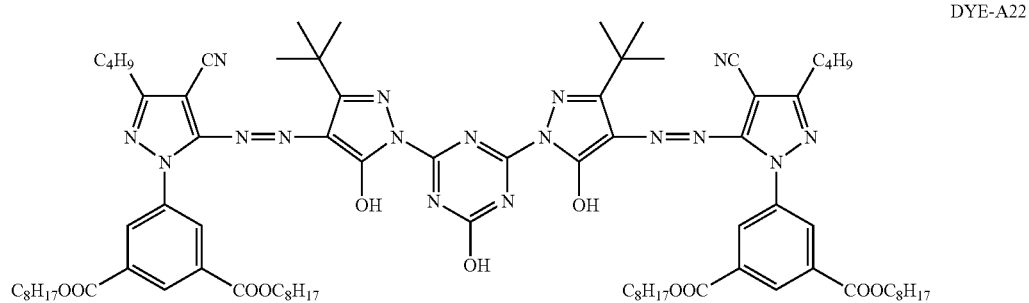

DYE-A22

Among the specific examples DYE-A1 to DYE-A22, DYE-A1 to DYE-A7, DYE-A11 to DYE-A14, DYE-A16 and DYE-A17 are more preferable, and DYE-A2 to DYE-A4, DYE-A6, DYE-A7 and DYE-A11 are further preferable, in view of the solubility in the polymerizable compound.

Next, the compound represented by the formula (II) is described.

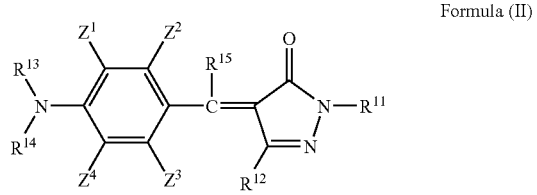

Formula (II)

In the formula (II), $R^{11}$, $R^{13}$ and $R^{14}$ are each independently an unsubstituted or substituted alkyl group, an unsubstituted or substituted aryl group or an unsubstituted or substituted heteroaryl group, $R^{12}$ and $R^{15}$ are each independently a hydrogen atom or a monovalent substituent, wherein $R^{13}$ and $R^{14}$ may be linked to each other to form a 5- or 6-membered hetero ring. $Z^1$, $Z^2$, $Z^3$ and $Z^4$ are each independently a hydrogen atom or a monovalent substituent, wherein $Z^1$ and $Z^2$, and $Z^3$ and $Z^4$ may be linked to each other to form a 5- or 6-membered ring.

The monovalent substituents represented by $R^{12}$, $R^{15}$, $Z^1$, $Z^2$, $Z^3$ and $Z^4$ are as defined for the monovalent substituents represented by $R^1$ to $R^4$, and the preferable ranges therefor are the same.

In the formula (II), preferable examples of $R^{11}$ include an unsubstituted alkyl group having 1 to 12 carbon atoms in total, an unsubstituted or substituted aryl group having 6 to 18 carbon atoms in total and an unsubstituted or substituted heterocyclic group having 4 to 12 carbon atoms in total, in view of solubility and color tone, of which an unsubstituted or substituted aryl group having 6 to 18 carbon atoms in total and an unsubstituted or substituted heterocyclic group having 4 to 12 carbon atoms in total are preferable, and an unsubstituted or substituted benzene ring is particularly preferable.

In the formula (II), among the monovalent substituents for $R^{12}$, electron-withdrawing groups are preferable in view of color tone and molar absorbance. Specifically, the electron-withdrawing group as used herein is preferably an electron-withdrawing group having a Hammett's substituent constant σp value of 0.20 or more. The upper limit of the σp value for the electron-withdrawing group is 1.0 or less. Specific examples of the electron-withdrawing group having a σp value of 0.20 or more include the substituents as exemplified for $X^1$ and $X^2$ in the formula (I).

In the formula (II), preferable examples of $R^{12}$ may include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkyloxy group having 1 to 12 carbon atoms, a halogenated alkylthio group having 1 to 12 carbon atoms, a halogenated aryloxy group having 7 to 18 carbon atoms, an aryl group having 7 to 18 carbon atoms substituted by two or more of other electron-withdrawing groups having σp values of 0.20 or more, and a 5- to 8-membered heterocyclic group having 1 to 18 carbon atoms and a nitrogen atom, an oxygen atom or a sulfur atom.

In the formula (II), more preferable examples of $R^{12}$ include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, and a halogenated alkyloxy group having 1 to 12 carbon atoms.

In the formula (II), particularly preferable examples of $R^{12}$ include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, an alkylsulfonyl group having 1 to 12 carbon atoms, an arylsulfonyl group having 6 to 18 carbon atoms and a sulfamoyl group having 0 to 12 carbon atoms, and the most preferable examples include an alkyloxycarbonyl group having 2 to 12 carbon atoms and an aryloxycarbonyl group having 7 to 18 carbon atoms.

In the formula (II), it is preferable that $R^{13}$ and $R^{14}$ are each independently an unsubstituted or substituted alkyl group, an unsubstituted or substituted alkenyl group, an unsubstituted or substituted aryl group or an unsubstituted or substituted heterocyclic group, in view of the availability of the systhetic raw materials, color tone and light fastness.

Alternatively, $R^{13}$ and $R^{14}$ may be linked to each other to form a 5- or 6-membered hetero ring. Examples of the 5- or 6-membered hetero ring to be formed include pyrrolidine, piperidine, piperazine, morpholine, and the like.

In the formula (II), preferable examples of $R^{15}$ include a hydrogen atom and an unsubstituted or substituted alkyl group having 1 to 12 carbon atoms in total in view of the availability of the systhetic raw materials and light fastness, of which a hydrogen atom, a linear alkyl group having 1 to 8 carbon atoms in total and a branched alkyl group having 1 to 8 carbon atoms in total are preferable, and a hydrogen atom is the most preferable.

In the formula (II), $Z^1$, $Z^2$, $Z^3$ and $Z^4$ are preferably each independently a hydrogen atom, an unsubstituted or substituted alkyl group having 1 to 12 carbon atoms in total, an unsubstituted or substituted aryl group having 6 to 18 carbon atoms in total or an unsubstituted or substituted heterocyclic group having 4 to 12 carbon atoms in total, in view of the availability of the systhetic raw materials and light fastness, of which a hydrogen atom or a linear alkyl group having 1 to 8 carbon atoms in total and a branched alkyl group having 1 to 8 carbon atoms in total are preferable, and a hydrogen atom is particularly preferable.

Alternatively, $Z^1$ and $Z^2$, and $Z^3$ and $Z^4$ may be linked to each other to form a 5- or 6-membered ring. Examples of the 5-membered ring or 6-membered ring to be formed include naphthalene, benzothiazole, quinoline, isoquinoline, and the like.

Examples of the preferable combination of $R^{11}$ to $R^{15}$ and $Z^1$ to $Z^4$ for the compound represented by the formula (II) include, preferably a compound having $R^{11}$ to $R^{15}$ and $Z^1$ to $Z^4$ in which at least one substituent is the above-mentioned preferable substituent, more preferably a compound having $R^{11}$ to $R^{15}$ and $Z^1$ to $Z^4$ in which more substituents are the above-mentioned preferable groups, and the most preferably a compound having $R^{11}$ to $R^{15}$ and $Z^1$ to $Z^4$ in which all substituents are the above-mentioned preferable groups.

Hereinafter the specific examples of the dyes represented by the formula (II) (exemplified dyes DYE-B1 to DYE-B25) are shown, but the oil-soluble dye used in the invention is not limited by the following examples.

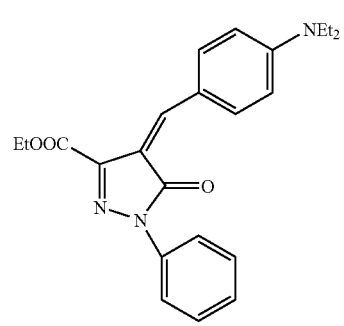

DYE-B1

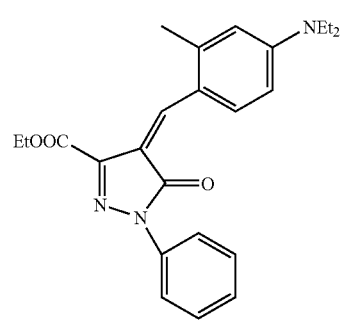

DYE-B2

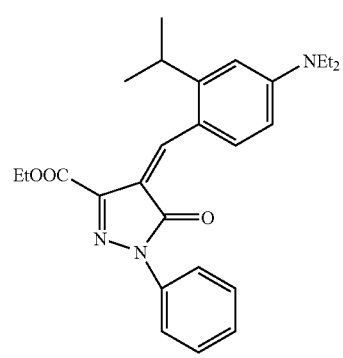

DYE-B3

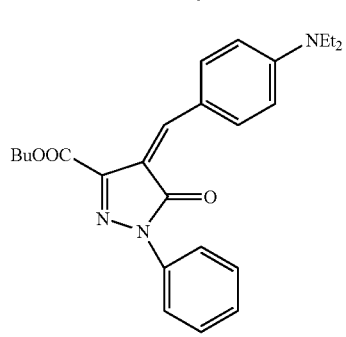

DYE-B4

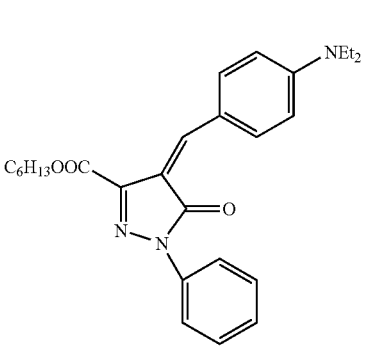

DYE-B5

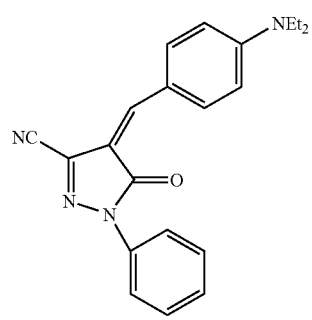 DYE-B6
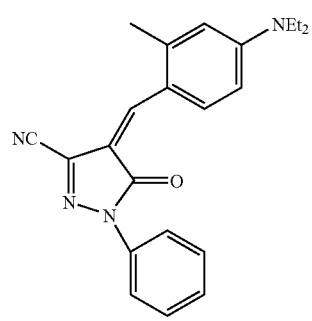 DYE-B7
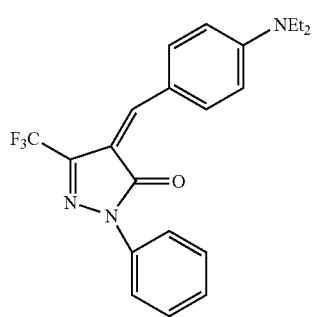 DYE-B8
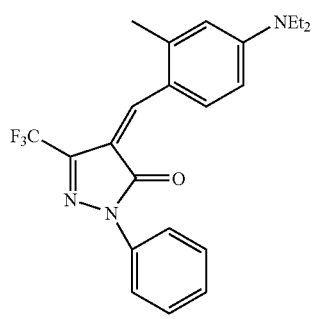 DYE-B9
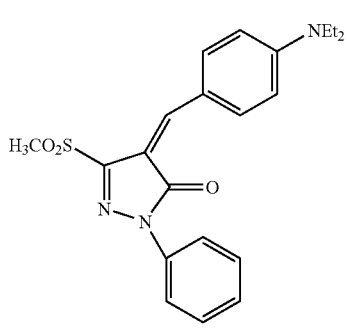 DYE-B10
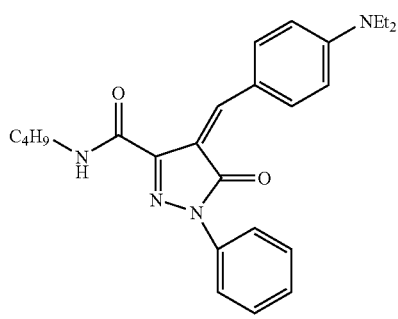 DYE-B11
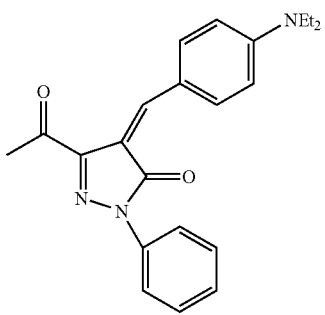 DYE-B12
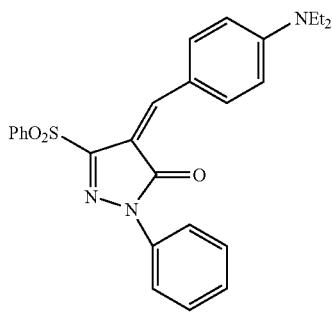 DYE-B13
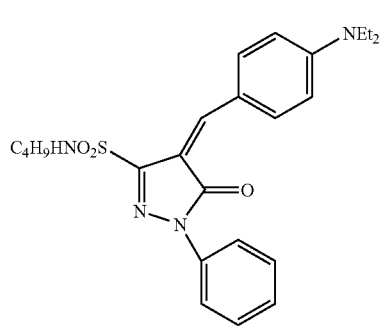 DYE-B14
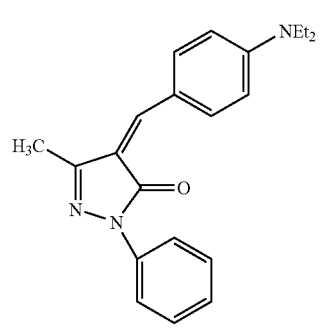 DYE-B15

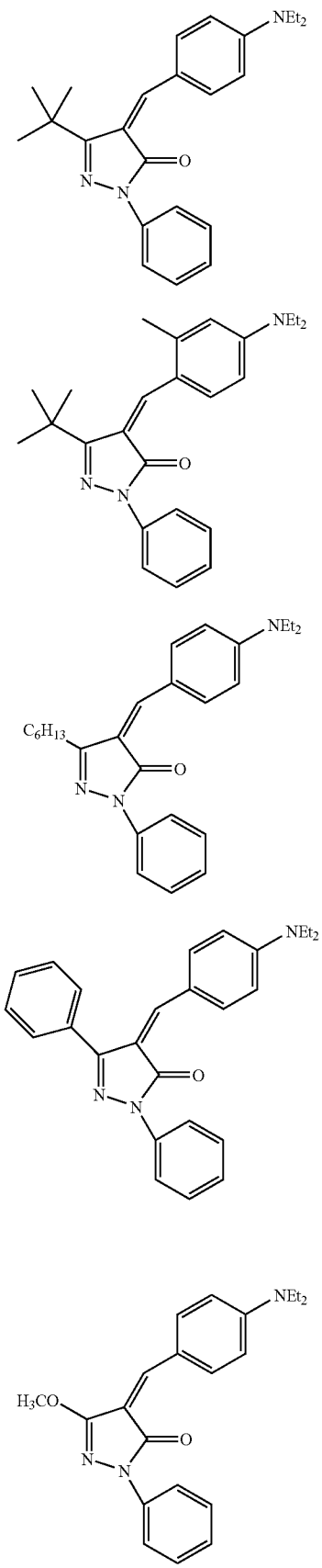
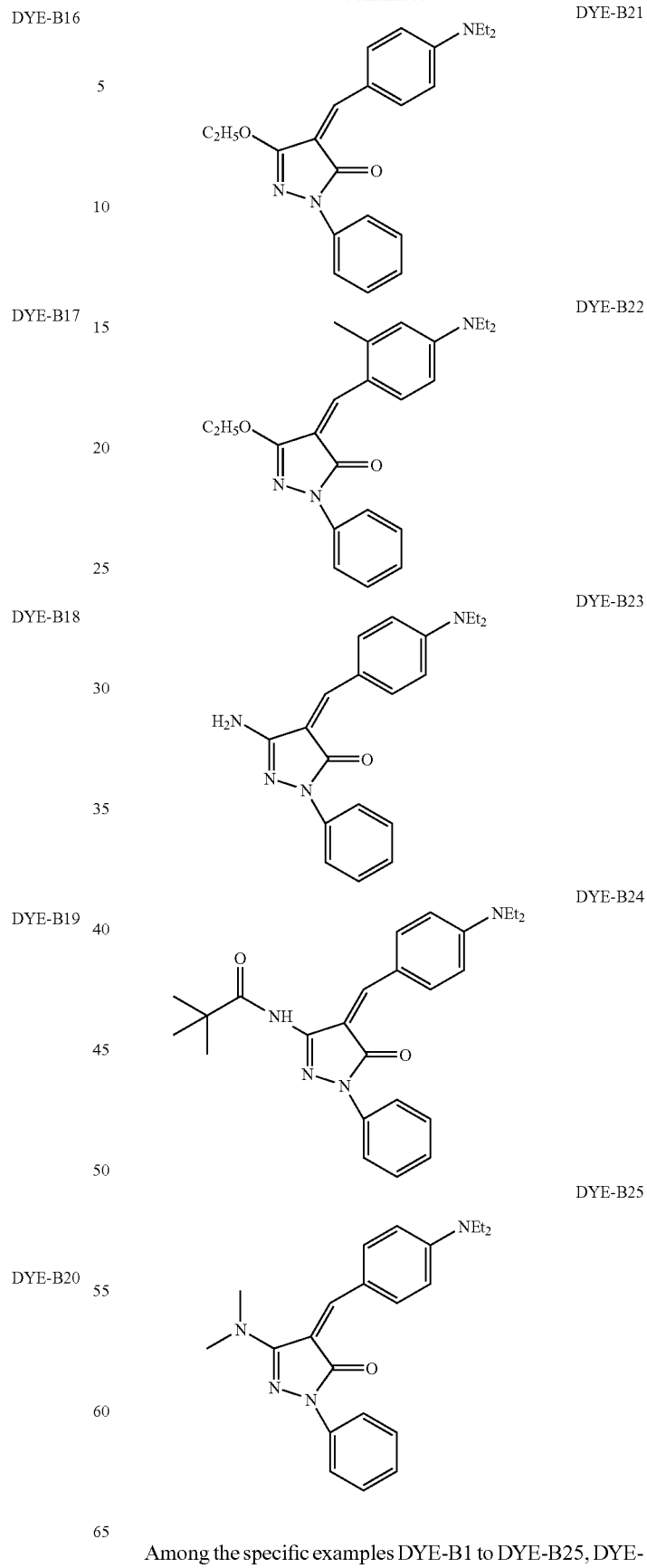
Among the specific examples DYE-B1 to DYE-B25, DYE-B1, DYE-B2, DYE-B6, DYE-B7, DYE-B11, DYE-B12, DYE-B20 and DYE-B22 are more preferable, DYE-B22 is more preferable, and DYE-B1, DYE-B2 and DYE-B12 are further preferable, in view of the solubility in the polymerizable compound.

[Compound Represented by the Formula (III)]

Next, the formula (III) is described.

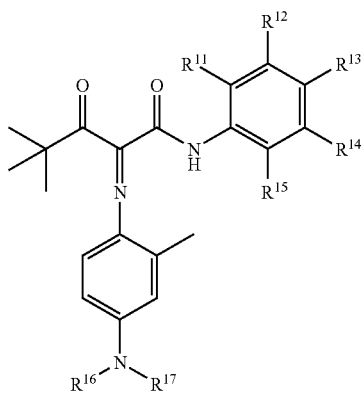

Formula (III)

In the formula (III), $R^{11}$, $R^{12}$, $R^{13}$, $R^{14}$ and $R^{15}$ are each independently a hydrogen atom or a monovalent substituent. $R^{16}$ and $R^{17}$ are each independently an unsubstituted or substituted alkyl group, an unsubstituted or substituted aryl group or an unsubstituted or substituted heteroaryl group, or may be linked to each other to form a ring.

In the formula (III), the monovalent substituents represented by $R^{11}$, $R^{12}$, $R^{13}$, $R^{14}$ and $R^{15}$ are those similar to the substituents exemplified for $Z^1$ to $Z^4$ in the formula (II). Furthermore, the substituents represented by $R^{16}$ and $R^{17}$ are those similar to the substituents exemplified for $R^{13}$ and $R^{14}$ in the formula (II).

In the formula (III), examples of the monovalent substituents represented by $R^{11}$, $R^{12}$, $R^{13}$, $R^{14}$ and $R^{15}$ include the substituents exemplified for $Y^1$ and $Y^2$ in the formula (I).

In the formula (III), examples of the substituted or unsubstituted alkyl group represented by $R^{16}$ and $R^{17}$ include a linear alkyl group having 1 to 30 carbon atoms, a branched alkyl group having 3 to 30 carbon atoms and a cyclic alkyl group having 3 to 30 carbon atoms, more preferably a linear alkyl group having 2 to 20 carbon atoms, a branched alkyl group having 3 to 20 carbon atoms and a cyclic alkyl group having 3 to 20 carbon atoms, and further preferably a linear alkyl group having 2 to 12 carbon atoms, a branched alkyl group having 3 to 12 carbon atoms and a cyclic alkyl group having 3 to 12 carbon atoms.

Specific examples include methyl, ethyl, propyl, isopropyl, sec-butyl, t-butyl, hexyl, octyl, 2-ethylhexyl, dodecyl, cyclopentyl, cyclohexyl and cyclodecyl, of which ethyl, isopropyl, sec-butyl, t-butyl, hexyl, 2-ethylhexyl and cyclohexyl are more preferable, and ethyl, isopropyl, t-butyl, hexyl, 2-ethylhexyl and cyclohexyl are further preferable.

The above-mentioned alkyl group may further have substituents, and examples of the substituents that may be introduced include the substituents exemplified for $Y^1$ and $Y^2$ in the formula (I).

In the formula (III), examples of the aryl group represented by $R^{16}$ and $R^{17}$ include an aryl group having 6 to 30 carbon atoms, more preferably an aryl group having 6 to 18 carbon atoms, and further preferably an aryl group having 6 to 12 carbon atoms.

Examples of the number of the member include from 6 to 14, preferably from 6 to 10, and further preferably 6. Examples of the number of ring include from 1 to 5, more preferably from 1 to 3, and further preferably 1 or 2. Either a monocycle or a fused ring may be used.

The above-mentioned aryl group may further have substituents, and examples of the substituents that may be introduced include the substituents exemplified for $Y^1$ and $Y^2$ in the formula (I).

In the formula (III), examples of the heteroaryl group represented by $R^{16}$ and $R^{17}$ include a heteroaryl group having 5 to 30 carbon atoms, more preferably 6 to 18 carbon atoms, and further preferably 6 to 12 carbon atoms.

Examples of the number of the member include from 5 to 14, preferably from 6 to 10, and further preferably 6. Examples of the number of ring include from 1 to 5, more preferably from 1 to 3, and further preferably 1 or 2. Either a monocycle or a fused ring may be used.

Examples of the heteroatom include an oxygen atom, a nitrogen atom and a sulfur atom.

Specific examples include nitrogen-containing aromatic ring groups such as a triazole residue, an imidazolyl residue and a pyridinyl residue, a sulfur-containing aromatic ring groups such as a thiophene residue and a thiazole residue, oxygen-containing aromatic ring groups such as a furan residue and an oxazole residue, and the like.

The above-mentioned heteroaryl group may further have substituents, and examples of the substituents that may be introduced include the substituents exemplified for $Y^1$ and $Y^2$ in the formula (I).

In the formula (III), $R^{16}$ and $R^{17}$ may be linked to each other to form a ring. In this case, the ring that may be formed is preferably a 5- or 6-membered ring.

The preferable combination of the substituents in the formula (III) is a combination in which $R^{11}$ to $R^{15}$ are each a halogen atom, an alkyl group, a carbamoyloxy group, an alkoxycarbonyloxy group, an aryloxycarbonyloxy group, an acylamino group (an amide group), an aminocarbonylamino group (an ureido group), an alkoxycarbonylamino group, an aryloxycarbonylamino group, a sulfamoylamino group, an alkylsulfonylamino group, an arylsulfonylamino group, a sulfamoyl group, an alkylsulfinyl group, an arylsulfinyl group, an alkylsulfonyl group, an arylsulfonyl group, an aryloxycarbonyl group, an alkoxycarbonyl group or a carbamoyl group, and $R^{16}$ and $R^{17}$ are each an alkyl group, an alkenyl group, an aryl group or a heterocyclic group.

Furthermore, the Log P value of the compound represented by the formula (III) is preferably 6 or more, and particularly preferably 8 or more, in view of solubility.

Hereinafter the specific examples of the dyes represented by the formula (III) (exemplified dyes DYE-C1 to DYE-C26) are shown, but the oil-soluble dye used in the invention is not limited by the following examples.

DYE-C1
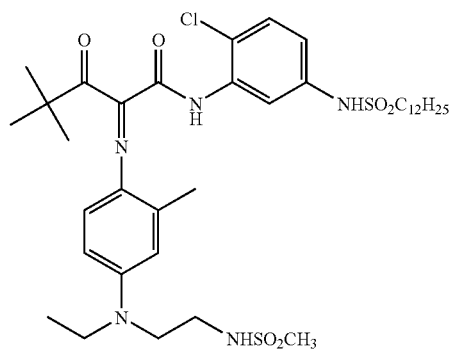
DYE-C5
DYE-C2
DYE-C6
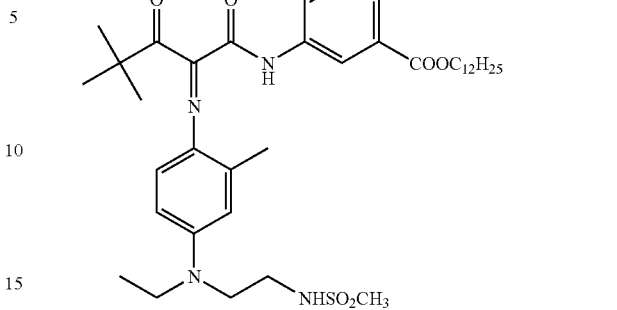
DYE-C3
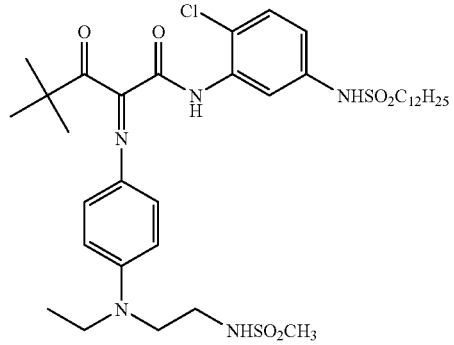
DYE-C7
DYE-C4
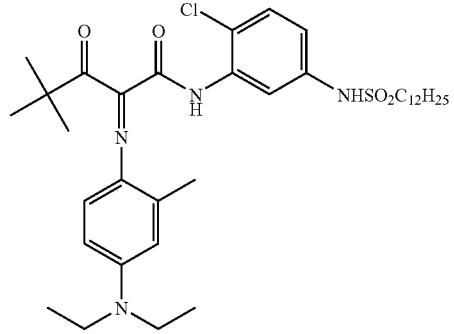
DYE-C8
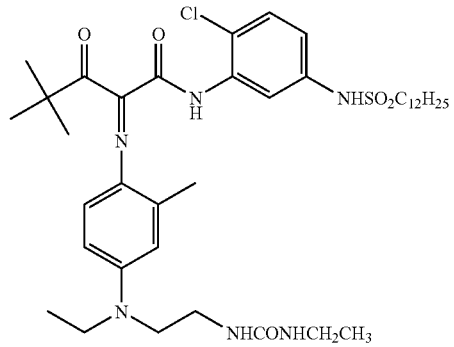

-continued
DYE-C9
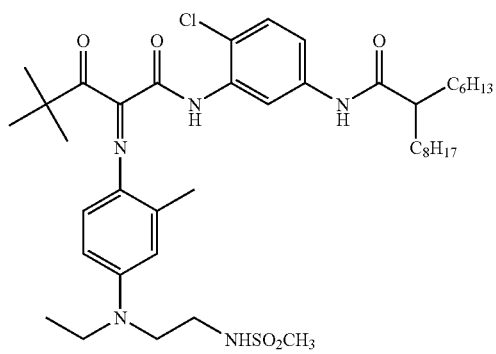
DYE-C10
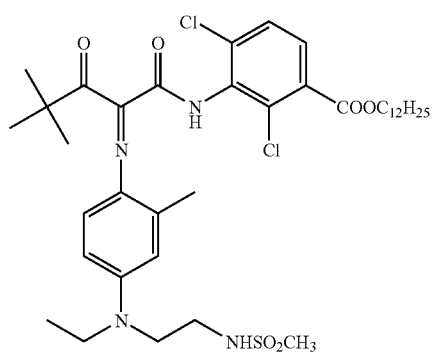
DYE-C11
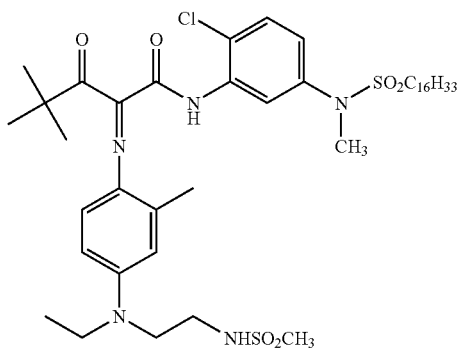
DYE-C12
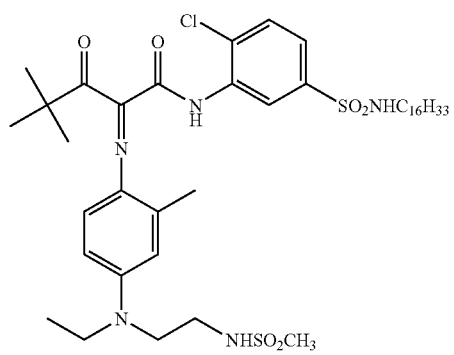
-continued
DYE-C13
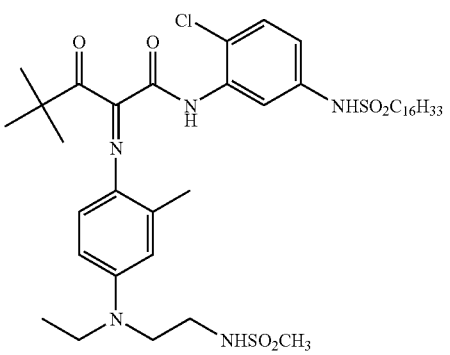
DYE-C14
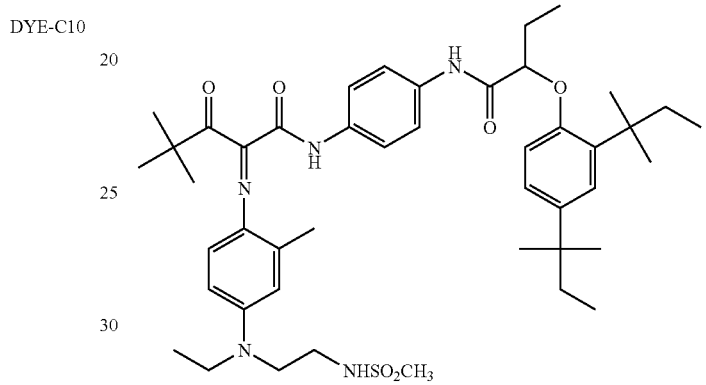
DYE-C15
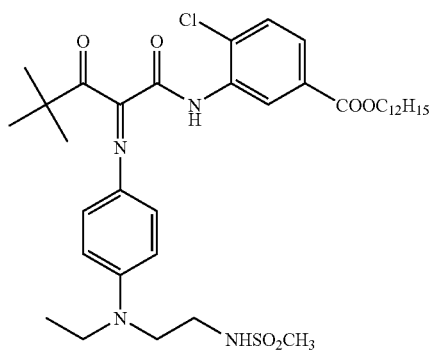
DYE-C16
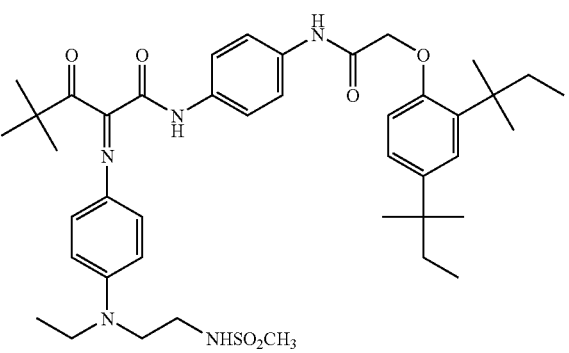

-continued
DYE-C17
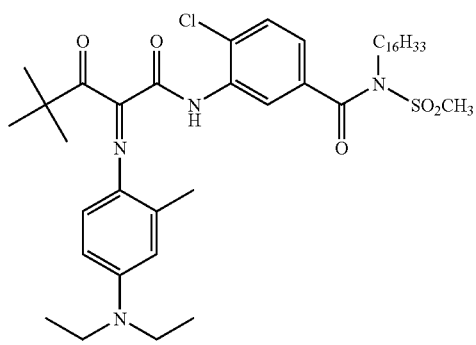
DYE-C21
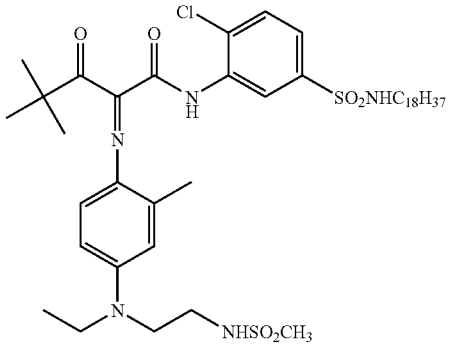
DYE-C18
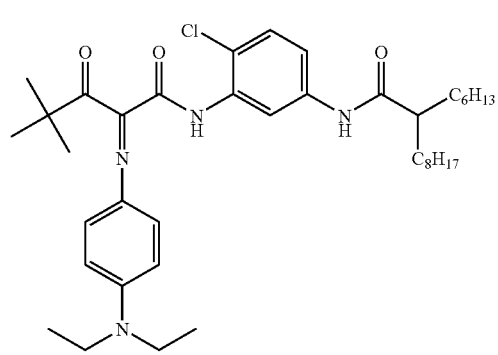
DYE-C22
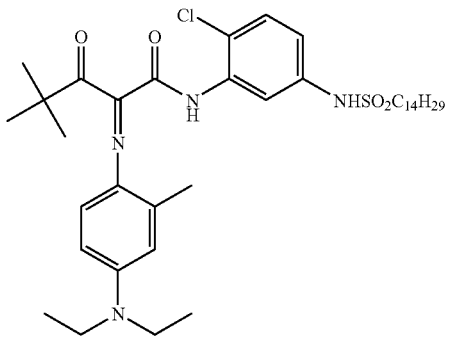
DYE-C19
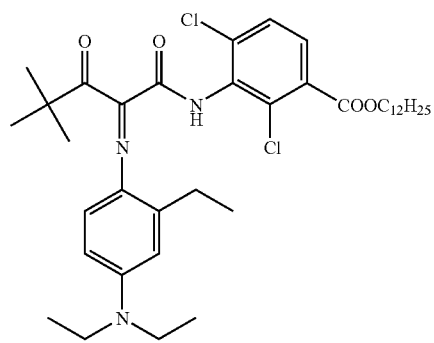
DYE-C23
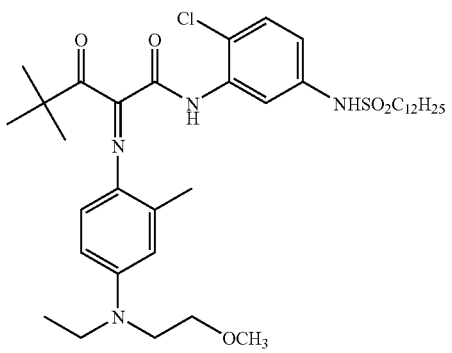
DYE-C20
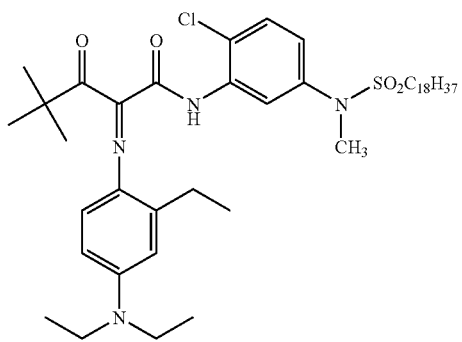
DYE-C24
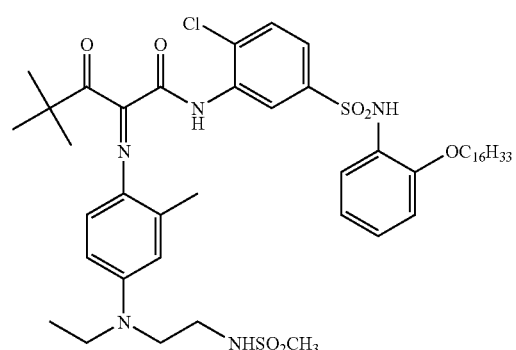

DYE-C25

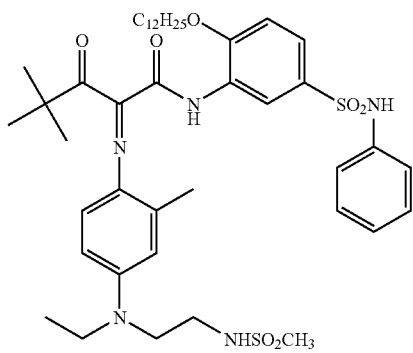

DYE-C26

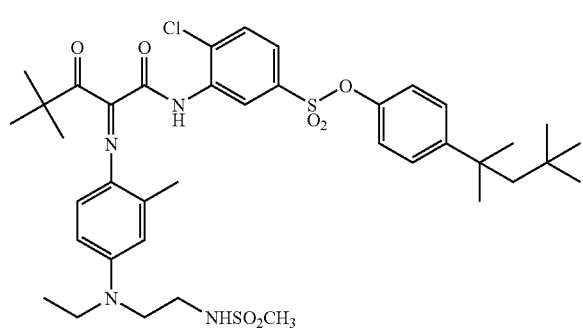

Among the specific examples DYE-C1 to DYE-C26, DYE-C1, DYE-C3, DYE-C6, DYE-C8, DYE-C10, DYE-C13, DYE-C17 and DYE-C24 are preferable, and DYE-C1, DYE-C6 and DYE-C10 are more preferable, in view of the light resistance and solubility in the polymerizable compound.

In the ink composition of the invention, among the above-mentioned compounds represented by the formulas (I) to (III), the compound represented by the formula (I) is preferable as the particular yellow dye in view of sensitivity and light resistance.

—Magenta Dye—

Examples of the oil-soluble dye having an L*a*b* value in which 30≤L*≤64, 55≤a*≤105 and −40≤b*≤10 (magenta dye) include arylazo or heterylazo dyes having a coupling component such as phenols, naphthols and anilines; azomethine dyes having a coupling component such as pyrazolones and pyrazolotriazoles; methine dyes such as arylidene dyes, styryl dyes, merocyanine dyes and oxonole dyes; carbonium dyes such as diphenylmethane dyes, triphenylmethane dyes and xanthene dyes; quinone dyes such as naphthoquinone, anthraquinone and anthrapyridone; condensed polycyclic dyes such as dioxazine dyes; and the like. Among these, the arylazo or heterylazo dyes, azomethine dyes, methine dyes and condensed polycyclic dyes are preferable, and dyes comprising the compound represented by the following formula (IV) are more preferable, in view of the solubility, light resistance, easy adjustment of the absorbed wavelength by changing the substituents, and the like. Hereinafter the compound represented by the following formula (IV) is also referred to as "particular magenta dye".

Hereinafter the formula (IV) is described in detail.

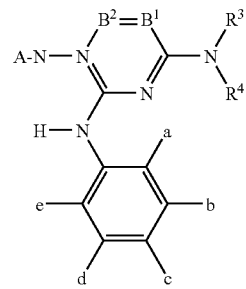

Formula (IV)

In the above-mentioned formula (IV), A is a residue of a 5-membered heterocyclic diazo component A-NH$_2$. B$^1$ is a nitrogen atom or —CR$^1$=, and B$^2$ is a nitrogen atom or —CR$^2$=, provided that B$^1$ and B$^2$ are not simultaneously nitrogen atoms, wherein R$^1$ and R$^2$ are each independently a hydrogen atom, a halogen atom or a monovalent substituent.

R$^3$ and R$^4$ are each independently a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Each group may further have substituents.

In the formula (IV), examples of the monovalent substituents represented by R$^1$ and R$^2$ include the substituents exemplified for Y$^1$ and Y$^2$ in the formula (I).

Each group may further have substituents.

Alternatively, R$^1$ and R$^3$, and R$^3$ and R$^4$ may be linked to each other to form a 5- or 6-membered ring.

The a and e each independently represents an alkyl group, an alkoxy group or a halogen atom, and where a and e are both alkyl groups, the number of the carbon atoms that constitute the alkyl groups is 2 or more in total, and the alkyl groups may further have substituents.

The b, c and d are each independently as defined in R$^1$ in B$^1$ and R$^2$ in B$^2$, and a and b or e and d may be linked to each other to form a condensed ring structure.

In the formula (IV), A is a residue of a 5-membered heterocyclic diazo component A-NH$_2$. Examples of the heteroatoms for the 5-membered hetero ring may include N, O and S. Preferable example includes a nitrogen-containing 5-membered hetero ring, and the hetero ring may be fused to an aliphatic ring, an aromatic ring or other hetero ring.

Preferable examples of the hetero ring for A may include a pyrazole ring, an imidazole ring, a triazole ring, a thiazole ring, an isothiazole ring, a thiadiazole ring, a benzothiazole ring, a benzoxazole ring and a benzoisothiazole ring. Each heterocyclic group may further have substituents. Among these, the pyrazole ring, imidazole ring, isothiazole ring, thiadiazole ring, benzothiazole ring and triazole ring represented by the following formulas (a) to (f) are preferable.

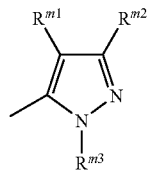

(a)

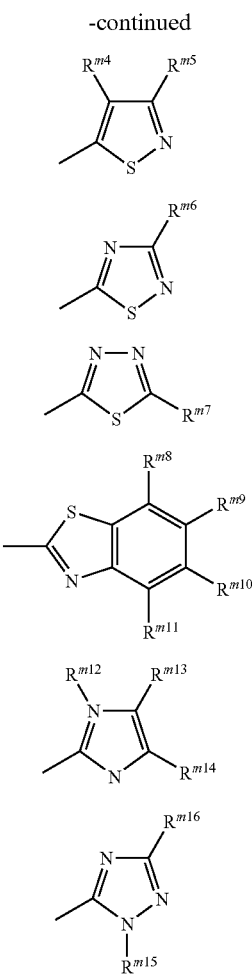

(b)

(c)

(d)

(e)

(f)

(g)

In the above-mentioned formulas (a) to (g), $R^{m1}$ to $R^{m16}$ have the same meaning as $R^1$ and $R^2$ in the formula (IV).

In the formula (IV), $R^3$ and $R^4$ are each independently a hydrogen atom, an aliphatic group (an alkyl group, an alkenyl group, an alkynyl group, and the like), an aromatic group (a phenyl group, a naphthyl group, and the like), a heterocyclic group, an acyl group, an alkoxycarbonyl group, an aryloxycarbonyl group, a carbamoyl group, a sulfonyl group (an alkylsulfonyl group, an arylsulfonyl group) or a sulfamoyl group. Preferable examples are a hydrogen atom, an alkyl group, a cycloalkyl group, an aralkyl group, an alkenyl group, an aryl group, a heterocyclic group, a sulfonyl group, an acyl group and a carbamoyl group. In the formula (IV), the above-mentioned groups represented by $R^3$ and $R^4$ have the same meaning as the groups described as the substituents for the formula (I). The above-mentioned groups may further have substituents, and the substituents have the same meaning as those described as the substituents for $Y^1$ and $Y^2$ in the formula (I).

$B^1$ is a nitrogen atom or —$CR^1$=, and $B^2$ is a nitrogen atom or —$CR^2$=, provided that $B^1$ and $B^2$ are not simultaneously nitrogen atoms. The case where $B^1$ is —$CR^1$= and $B^2$ is —$CR^2$= is preferable since more excellent performance may be exhibited in view of the increase of the oxidation potential of the dye due to formation of a pyridine coupler backbone.

$R^1$ for $B^1$ and $R^2$ for $B^2$ are each independently a hydrogen atom, a halogen atom, an alkyl group, an aralkyl group, an alkenyl group, alkynyl group, a cycloalkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocycleoxy group, an alkoxycarbonyloxy group, an aryloxycarbonyloxy group, an amino group (an alkylamino group and an arylamino group), a heterocycleamino group, an acylamino group, an aminocarbonylamino group (an ureido group), a sulfamoylamino group, an alkoxycarbonylamino group, an aryloxycarbonylamino group, an alkylsulfonylamino or arylsulfonylamino group, an aryloxycarbonylamino group, a nitro group, an alkylthio or arylthio group, an alkylsulfonyl or arylsulfonyl group, an alkylsulfinyl or arylsulfinyl group, a sulfamoyl group, a sulfo group or a heterocyclethio group. Each group may further have substituents. Alternatively, $R^1$ and $R^3$ or $R^3$ and $R^4$ may be linked to each other to form a 5- or 6-membered ring. Specifics of the substituents have the same meaning as those of the substituents exemplified for $Y^1$ and $Y^2$ in the formula (I).

The a and e each independently represents an alkyl group, an alkoxy group or a halogen atom, and where a and e are both alkyl groups, the number of the carbon atoms that constitute the alkyl groups is 2 or more in total, and the alkyl groups may further have substituents. The b, c and d are each independently as defined in $R^1$ in $B^1$ and $R^2$ in $B^2$, and a and b or e and d may be linked to each other to form a condensed ring structure.

For the formula (IV), a preferable combination of the substituents is as follows. The preferable combination is one wherein A is a pyrazole ring, an imidazole ring, an isothiazole ring, a thiadiazole ring or a benzothiazole ring (of these, a pyrazole ring is preferable); $B^1$ is an unsubstituted carbon atom; $B^2$ is an unsubstituted or alkyl-substituted carbon atom; $R^3$ and $R^4$ are each a hydrogen atom, an alkyl group, an aralkyl group, an aryl group, a heterocyclic group, a sulfonyl group or an acyl group; a and e are each preferably an alkyl group or a halogen atom, or where a and e are both alkyl groups, they are unsubstituted alkyl groups and the total number of carbon atoms of a and e is 3 or more (preferably 5 or less); and b, c and d are each a hydrogen atom, a halogen atom or an alkyl group (preferably each a hydrogen atom or an alkyl group having 1 to 4 carbon atoms).

In the preferable aspect of the invention, the compound represented by the formula (IV) is a compound represented by the following formula (IV-1).

Hereinafter, the compound represented by the following formula (IV-1) is described.

Formula (IV-1)

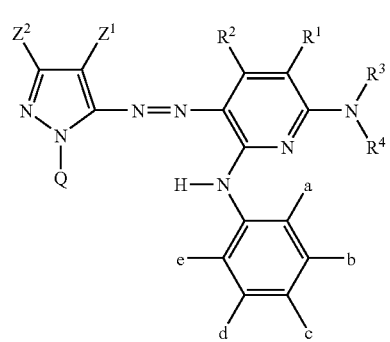

In the formula (IV-1), $Z^1$ is an electron-withdrawing group having a Hammett's substituent constant σp value of 0.20 or more; $Z^2$ is a hydrogen atom, an aliphatic group, an aromatic group or a heterocyclic group; $R^1$, $R^2$, $R^3$, $R^4$, a, b, c, d and e are each as defined in the formula (IV); and Q is a hydrogen atom, an aliphatic group, an aromatic group or a heterocyclic group. Each group of $Z^1$, $Z^2$ and Q may further have substituents.

In the formula (IV-1), $Z^1$ is an electron-withdrawing group having a Hammett's substituent constant σp value of 0.20 or more, preferably an electron-withdrawing group having a σp value of 0.30 or more. The upper limit of the σp value is preferably 1.0 or less. Specific examples include substituents similar to those exemplified for $X^1$ and $X^2$ in the formula (I).

$Z^1$ is preferably a cyano group, a nitro group or a halogen atom, more preferably a halogen atom or a cyano group, and the most preferably a cyano group.

$Z^2$ is preferably a hydrogen atom, an alkyl group, a cycloalkyl group, an aralkyl group, an aryl group, a heterocyclic group or an acyl group, and more preferably an alkyl group. Each substituent may further have substituents.

However, $R^3$ and $R^4$ are not simultaneously hydrogen atoms.

Q is preferably an alkyl group, a cycloalkyl group, an aralkyl group, an alkenyl group, an aryl group or a heterocyclic group, and each substituent may further have substituents. Specifics of the substituents have the same meaning as those for $R^1$ and $R^2$ mentioned above.

Q is preferably an aryl group or a heterocyclic group substituted by an electron-withdrawing group.

The above-mentioned electron-withdrawing group for Q is an electron-withdrawing group having a Hammett's substituent constant σp value of 0.20 or more, preferably 0.30 or more. The upper limit of the σp value is preferably 1.0 or less. Specific examples include the substituents as exemplified for $X^1$ and $X^2$ in the formula (I).

For the formula (IV-1), a preferable combination of the substituents is a combination wherein $Z^1$ is a cyano group; $Z^2$ is an isopropyl group, a t-butyl group or a phenyl group (preferably a t-butyl group); $R^1$ is a hydrogen atom; $R^2$ is a hydrogen atom or an alkyl group having 1 to 4 carbon atoms (preferably a methyl group); $R^3$ and $R^4$ are each a hydrogen atom, an alkyl group, an aralkyl group, an aryl group, a heterocyclic group, a sulfonyl group or an acyl group, preferably a hydrogen atom, a hetero ring (preferably a benzoxazole ring or a benzothiazole ring) group or an alkyl-substituted phenyl group; a and e are each an alkyl group which may be substituted, wherein the number of carbon atoms of a+e is 2 or more (preferably 5 or less), and preferably each an unsubstituted alkyl group, wherein the number of carbon atoms of a+e is 4 or more and 5 or less; b, c and d are each independently a hydrogen atom, a halogen atom or an alkyl group; and Q is a hetero ring (preferably a benzoxazole or benzothiazole ring (preferably a sulfamoyl-substituted benzoxazole or benzothiazole ring)) group.

The solubility is particularly high where the compound of the formula (IV-1) wherein $Z^1$ is a cyano group; $Z^2$ is an isopropyl group or a t-butyl group; $R^1$ is a hydrogen atom; $R^2$ is an alkyl group having 1 to 4 carbon atoms; $R^3$ and $R^4$ are each independently an alkyl group, an aryl group, a heterocyclic group, a sulfonyl group or an acyl group; a and e are each an alkyl group which may be substituted, wherein the number of carbon atoms of a+e is 2 or more (preferably 5 or less); b, c and d are each independently a hydrogen atom, a halogen atom or an alkyl group; Q is a heterocyclic group, or the like, is used. More preferably, an even ink composition may be obtained where the compound of the formula (IV-1) wherein $Z^1$ is a cyano group; $Z^2$ is a t-butyl group; $R^1$ is a hydrogen atom; $R^2$ is a methyl group or an ethyl group; $R^3$ and $R^4$ are each independently a benzoxazole group, a benzothiazole group or an alkyl-substituted phenyl group; a and e are each a methyl group, an ethyl group or an isopropyl group; b, c and d are each independently a hydrogen atom or an alkyl group; and Q is a benzoxazole ring or a benzothiazole ring group, is used.

Hereinafter the preferable specific examples of the particular magenta dye [the compounds represented by the formulas (IV) and (IV-1)] (exemplified dyes DYE-D1 to DYE-D32) are shown, but the invention is not limited by the following examples.

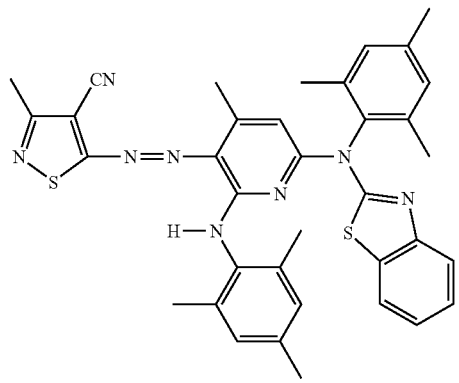

DYE-D1

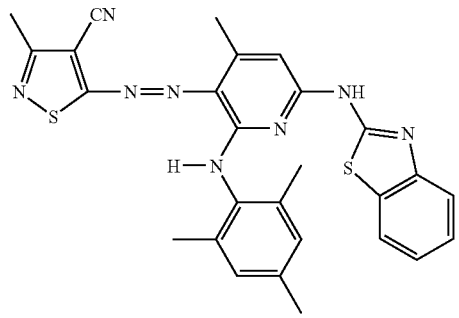

DYE-D2

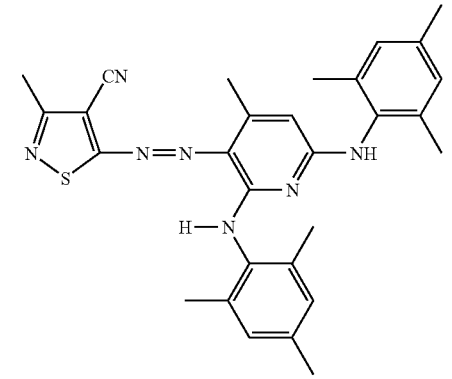

DYE-D3

DYE-D4
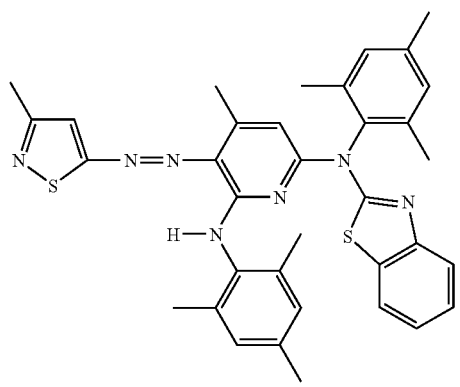
DYE-D5
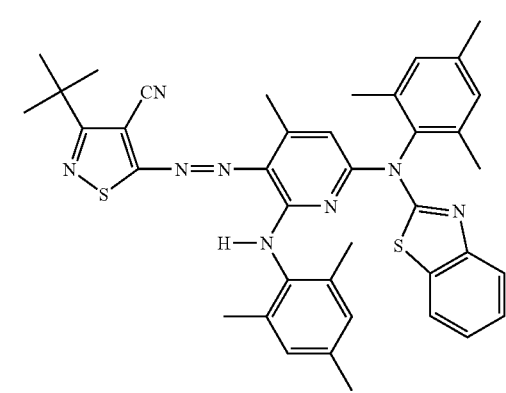
DYE-D6
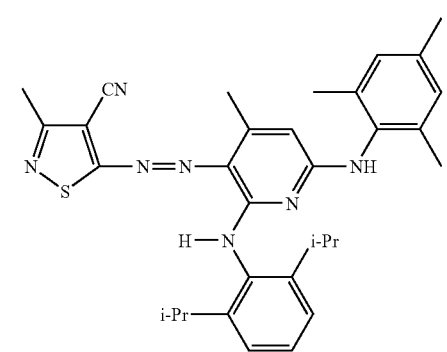
DYE-D7
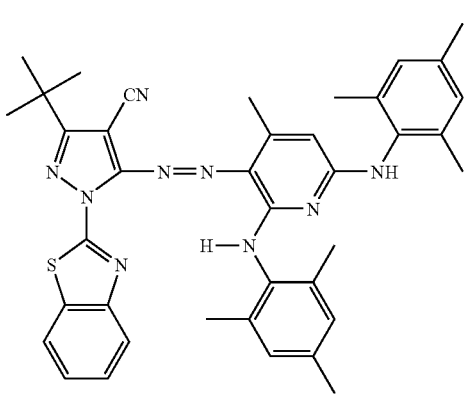
DYE-D8
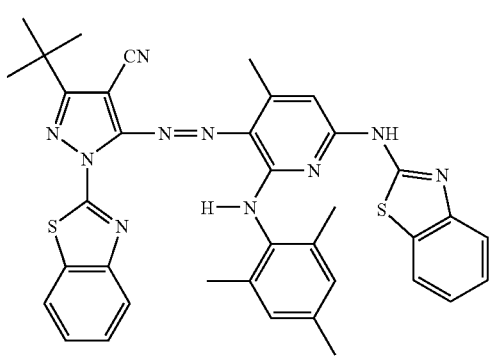
DYE-D9
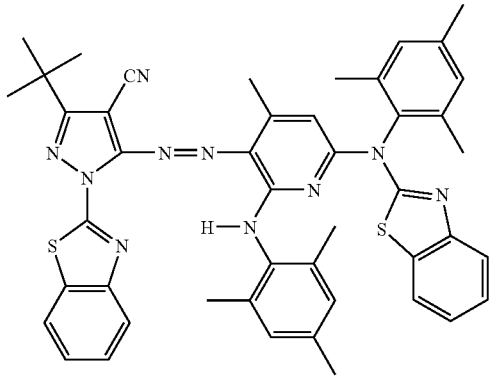
DYE-D10
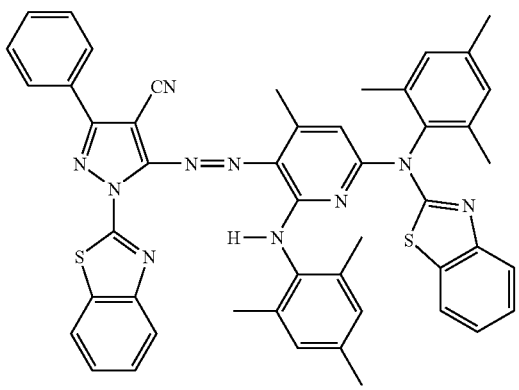
DYE-D11
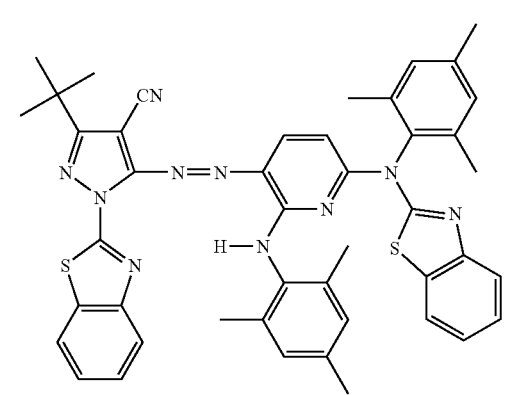

DYE-D12
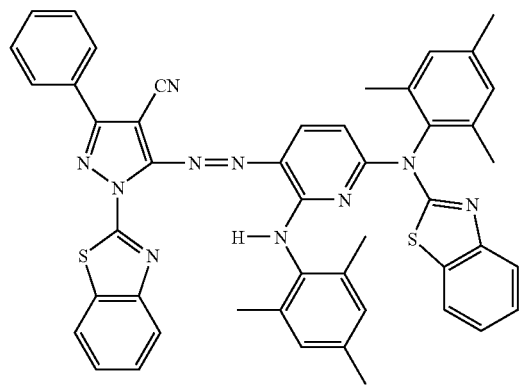
DYE-D13
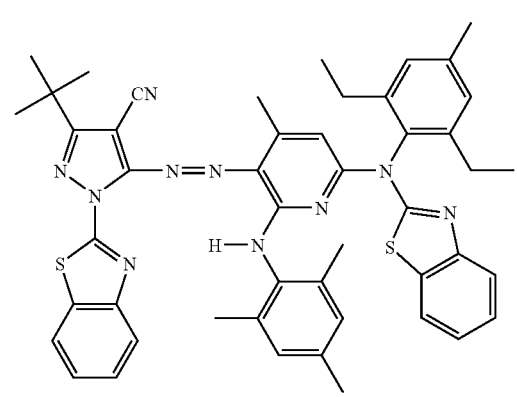
DYE-D14
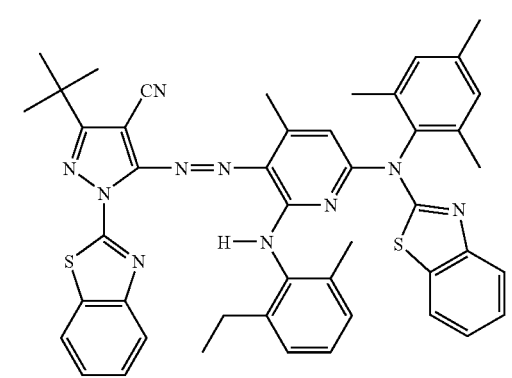
DYE-D15
DYE-D16
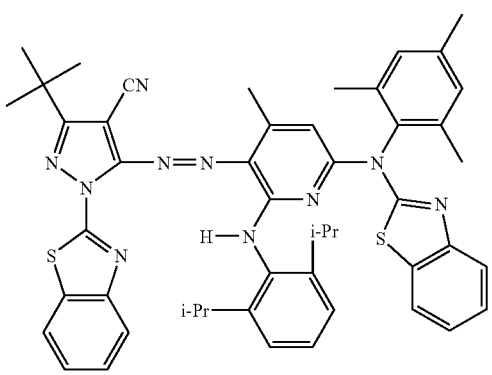
DYE-D17
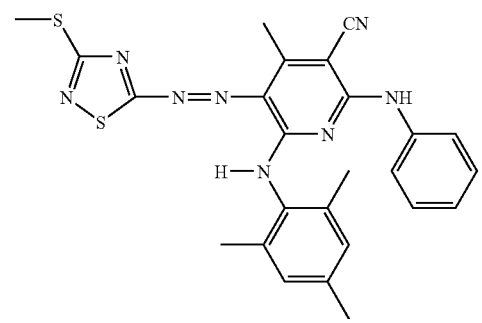
DYE-D18
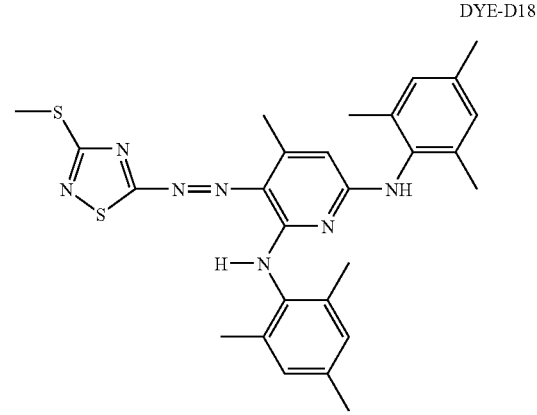
DYE-D19
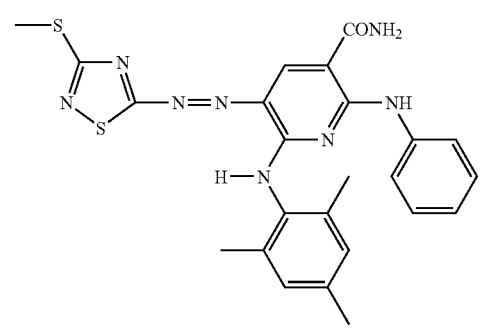

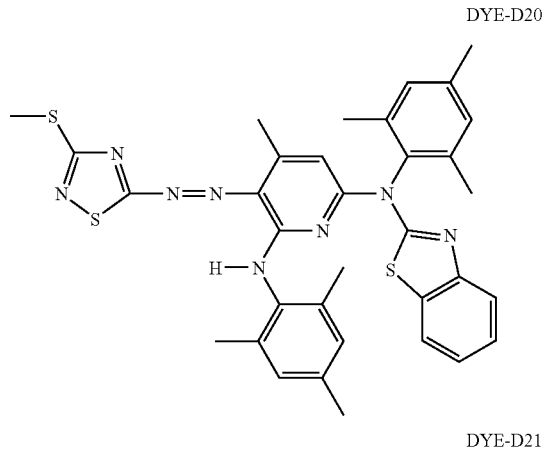
DYE-D20
DYE-D21
DYE-D22
DYE-D23
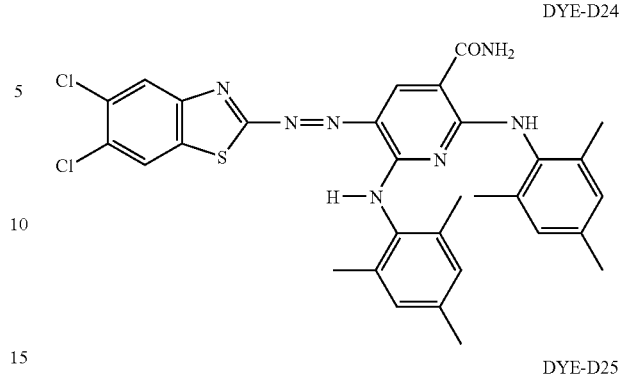
DYE-D24
DYE-D25
DYE-D26
DYE-D27

-continued

DYE-D28

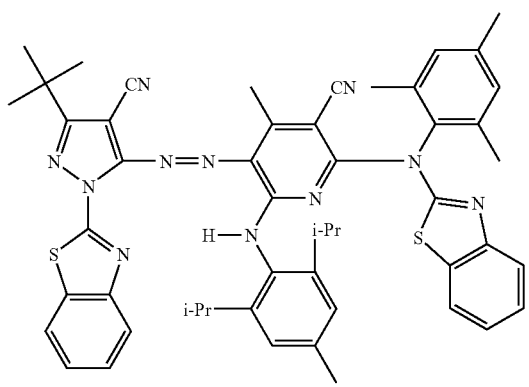

DYE-D29

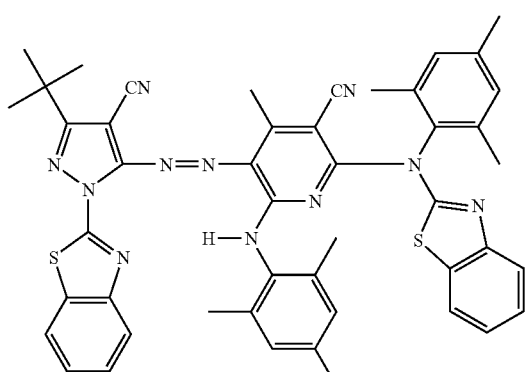

DYE-D30

DYE-D31

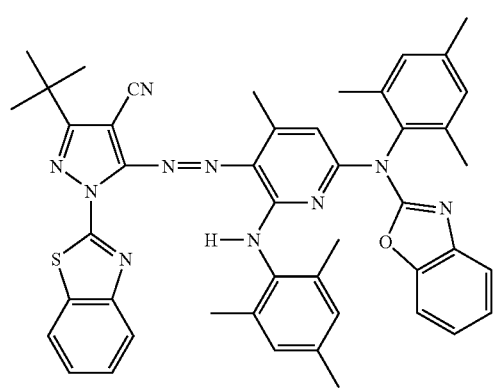

-continued

DYE-D32

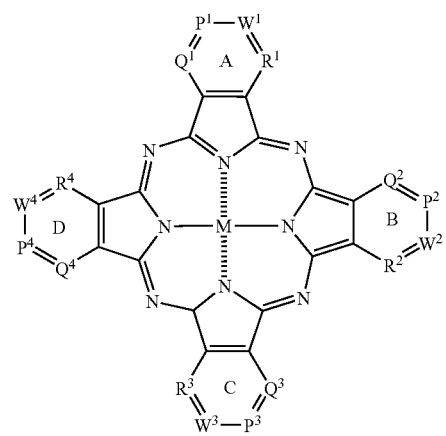

Among the dyes as exemplified above, DYE-D5, DYE-D9, DYE-D13, DYE-D14, DYE-D15, DYE-D16, DYE-D20, DYE-D21, DYE-D26, DYE-D28 and DYE-D29 are more preferable, and DYE-D9, DYE-D16 and DYE-D29 are further preferable, in view of the light resistance and solubility in the polymerizable compound.

—Cyan Dye—

Examples of the oil-soluble dye having an L*a*b* value in which $35 \leq L^* \leq 69$, $-60 \leq a^* \leq -10$ and $-70 \leq b^* \leq -20$ (cyan dye) include indoaniline dyes, indophenol dyes or azomethine dyes having a coupling component such as pyrrolotriazoles; polymethine dyes such as cyanine dyes, oxonole dyes and merocyanine dyes; carbonium dyes such as diphenylmethane dyes, triphenylmethane dyes and xanthene dyes; phthalocyanine dyes; anthraquinone dyes; arylazo or heterylazo dyes having a coupling component such as phenols, naphthols and anilines; and indigo and thioindigo dyes.

Among these, the phthalocyanine dyes are preferable in view of solubility, light resistance, easy adjustment of the absorbed wavelength by changing the substituents, and the like, and dyes comprising at least one compound from the compounds represented by the following formulas (V) and (VI) are more preferable. Hereinafter the compound represented by the following formula (V) or (VI) is also referred to as "particular cyan dye".

Formula (V)

-continued

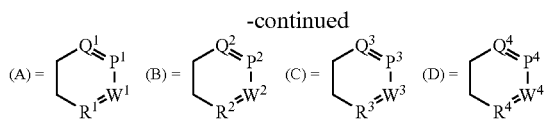

In the formula (V), $Q^1$ to $Q^4$, $P^1$ to $P^4$, $W^1$ to $W^4$, and $R^1$ to $R^4$ are each independently (=C($J_1$)- and/or —N=), (=C($J_2$)- and/or —N=), (=C($J_3$)- and/or —N=) and (=C($J_4$)- and/or —N=), and $J_1$ to $J_4$ are each independently a hydrogen atom and/or a substituent, provided that the four rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} are not simultaneously aromatic rings. However, where all of the four rings are simultaneously pyridine rings, a pyridine ring in which one of $Q^1$ and $R^1$ is a nitrogen atom, a pyridine ring in which one of $Q^2$ and $R^2$ is a nitrogen atom, a pyridine ring in which one of $Q^3$ and $R^3$ is a nitrogen atom, and a pyridine ring in which one of $Q^4$ and $R^4$ is a nitrogen atom are excluded. Furthermore, the case where all of the four rings are simultaneously pyrazine rings is excluded.

Where $J_1$ to $J_4$ are each a substituent, the substituent may further have substituents, and at least one of $J_1$ to $J_4$ or at least one of the substituents possessed by $J_1$ to $J_4$ have a substituent having 2 or more carbon atoms, and the total number of carbon atoms of the substituents for $J_1$ to $J_4$ is 8 or more, and ionic hydrophilic groups are not included in the molecules. M is a hydrogen atom, a metal atom, a metal oxide, a metal hydroxide or a metal halide.

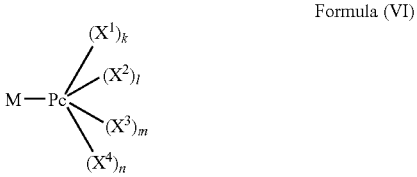

Formula (VI)

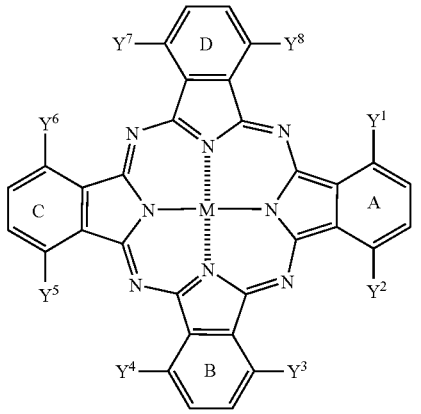

Formula (VII)

In the formulas (VI) and (VII), M is a hydrogen atom, a metal atom, a metal oxide, a metal hydroxide or a metal halide; Pc is a phthalocyanine nucleus represented by the formula (VII) having a valency of (k+l+m+n); $X^1$, $X^2$, $X^3$ and $X^4$ are each independently —SO—$R^1$, —SO$_2$—$R^1$, —SO$_2$NR$^2$R$^3$, —CONR$^2$R$^3$, —CO$_2$—$R^1$ or CO—$R^1$, and at least one or more of which exists on each of the four benzene rings {A, B, C and D in the formula (VII)} in the phthalocyanine nucleus, provided that $X^1$, $X^2$, $X^3$ and $X^4$ are not all the same, at least one of $X^1$, $X^2$, $X^3$ and $X^4$ is a substituent having 2 or more carbon atoms, the total number of carbon atoms of the substituents represented by $X^1$, $X^2$, $X^3$ and $X^4$ is 8 or more, and ionic hydrophilic groups are not included in the molecules. $R^1$ is an unsubstituted or substituted alkyl group, an unsubstituted or substituted aryl group or an unsubstituted or substituted heterocyclic group. $R^2$ is a hydrogen atom, an unsubstituted or substituted alkyl group, an unsubstituted or substituted aryl group or an unsubstituted or substituted heterocyclic group. $R^3$ is an unsubstituted or substituted alkyl group, an unsubstituted or substituted aryl group or an unsubstituted or substituted heterocyclic group. The k, l, m and n are each an integer satisfying 0<k<8, an integer satisfying 0<l<8, an integer satisfying 0≤m<8 and an integer satisfying 0≤n<8, provided that k, l, m and n are numbers that satisfy 4≤k+l+m+n≤8.

$Y^1$, $Y^2$, $Y^3$, $Y^4$, $Y^5$, $Y^6$, $Y^7$ and $Y^8$ are each independently a hydrogen atom or a monovalent substituent, and each of the monovalent substituent may further have substituents.

[Compound Represented by the Formula (V)]

First, the compound represented by the formula (V) is described.

In the formula (V), $Q^1$ to $Q^4$, $P^1$ to $P^4$, $W^1$ to $W^4$, and $R^1$ to $R^4$ are each independently (=C($J_1$)- and/or —N=), (=C($J_2$)- and/or —N=), (=C($J_3$)- and/or —N=) and (=C($J_4$)- and/or —N=).

M is a hydrogen atom, a metal element, a metal oxide, a metal hydroxide or a metal halide.

M is preferably a hydrogen atom or a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, of which Cu, Ni, Zn and Al are particularly preferable, and Cu is the most preferable.

Preferable examples of the metal oxide include VO, GeO, and the like. Preferable examples of the metal hydroxide include Si(OH)$_2$, Cr(OH)$_2$, Sn(OH)$_2$, and the like. Examples of the metal halide include AlCl, SiCl$_2$, VCl, VCl$_2$, VOCl, FeCl$_2$, GaCl, ZnCl, and the like.

$J_1$ to $J_4$ are each independently a hydrogen atom or a substituent.

Where $J_1$ to $J_4$ are each a substituent, the substituent may further have substituents, and at least one of $J_1$ to $J_4$ or at least one of the substituents possessed by $J_1$ to $J_4$ have a lipophilic group having 2 or more carbon atoms as a substituent.

The four rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} are not simultaneously aromatic rings.

However, where all of the four rings, ring A: (A), ring B: (B), ring C: (C) and ring D: (D) are simultaneously pyridine rings, and a pyridine ring in which one of ($Q_1$ and $R_1$) is a nitrogen atom, a pyridine ring in which one of ($Q_2$ and $R_2$) is a nitrogen atom, a pyridine ring in which one of ($Q_3$ and $R_3$) is a nitrogen atom, and a pyridine ring in which one of ($Q_4$ and $R^4$) is a nitrogen atom are excluded.

Furthermore, the case where all of the four rings, ring A: (A), ring B: (B), ring C: (C) and ring D: (D), are simultaneously pyrazine rings is excluded.

It is preferable that at least one of the rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} is a nitrogen-containing hetero ring.

It is more preferable that at least one (preferably at least two) of the rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} is an aromatic ring and at least one is a pyridine ring or a pyrazine ring.

It is further preferable that at least one (preferably at least two) of the rings each consisting of $(Q^1, P^1, W^1$ and $R^1)$, $(Q^2, P^2, W^2$ and $R^2)$, $(Q^3, P^3, W^3$ and $R^3)$ and $(Q^4, P^4, W^4$ and $R^4)$ {ring A: (A), ring B: (B), ring C: (C) and ring D: (D)} is an aromatic ring represented by the following formula (V-1).

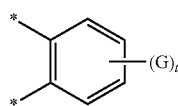

Formula (V-1)

In the formula (V-1), G is —SO—$Z^1$, —SO$_2$—$Z^1$, —SO$_2$N$Z^1Z^2$, —CON$Z^1Z^2$, —CO$_2Z^1$ or —CO$Z^1$.

Specifically, G is preferably —SO$_2$—$Z^1$, —SO$_2$N$Z^1Z^2$ or —CON$Z^1Z^2$, of which —SO$_2$—$Z^1$ or —SO$_2$N$Z^1Z^2$ is preferable, and —SO$_2$—$Z^1$ is the most preferable.

$Z^1$ may be the same or different, and is preferably an unsubstituted or substituted alkyl group having 1 to 20 carbon atoms in total, an unsubstituted or substituted cycloalkyl group having 3 to 20 carbon atoms in total, an unsubstituted or substituted alkenyl group having 2 to 20 carbon atoms in total, an unsubstituted or substituted alkynyl group having 2 to 12 carbon atoms in total, an unsubstituted or substituted aralkyl group having 7 to 20 carbon atoms in total, an unsubstituted or substituted aryl group having 6 to 20 carbon atoms in total, or an unsubstituted or substituted heterocyclic group having 4 to 20 carbon atoms in total, of which an unsubstituted or substituted alkyl group having 1 to 12 carbon atoms in total, an unsubstituted or substituted aryl group having 6 to 18 carbon atoms in total or an unsubstituted or substituted heterocyclic group having 4 to 12 carbon atoms in total is preferable, and a substituted alkyl group having 1 to 12 carbon atoms in total is the most preferable.

$Z^2$ may be the same or different, and is preferably a hydrogen atom, an unsubstituted or substituted alkyl group having 1 to 20 carbon atoms in total, an unsubstituted or substituted cycloalkyl group having 3 to 20 carbon atoms in total, an unsubstituted or substituted alkenyl group having 2 to 20 carbon atoms in total, an unsubstituted or substituted alkynyl group having 2 to 12 carbon atoms in total, an unsubstituted or substituted aralkyl group having 7 to 20 carbon atoms in total, an unsubstituted or substituted aryl group having 6 to 20 carbon atoms in total or an unsubstituted or substituted heterocyclic group having 4 to 20 carbon atoms in total, of which a hydrogen atom, an unsubstituted or substituted alkyl group having 1 to 12 carbon atoms in total, an unsubstituted or substituted aryl group having 6 to 18 carbon atoms in total or an unsubstituted or substituted heterocyclic group having 4 to 12 carbon atoms in total is preferable, a hydrogen atom or a substituted alkyl group having 1 to 12 carbon atoms in total is more preferable, and a hydrogen atom is the most preferable.

$Z^1$ and/or $Z^2$ may further have substituents. Preferable examples of such substituents include a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocycleoxy group, an azo group, an acyloxy group, a carbamoyloxy group, a silyloxy group, an aryloxycarbonyl group, an aryloxycarbonylamino group, an imide group, a heterocyclethio group, a sulfinyl group, a phosphoryl group and an acyl group. These substituents may further have substituents.

Among these, a halogen atom, an alkyl group, a cycloalkyl group, an alkenyl group, an aralkyl group, an aryl group, a heterocyclic group, a cyano group, an alkoxy group, an amide group, an ureido group, a sulfonamide group, a carbamoyl group, a sulfamoyl group, a sulfonyl group and an alkoxycarbonyl group are preferable, a halogen atom, an alkyl group, a cycloalkyl group, an alkenyl group, an aralkyl group, an aryl group, a heterocyclic group, a cyano group, a carbamoyl group, a sulfamoyl group, a sulfonyl group and alkoxycarbonyl group are particularly preferable, and a sulfamoyl group and sulfonyl group are the most preferable.

It is preferable that at least one of $Z^1$ and/or $Z^2$ is a substituent having 2 or more carbon atoms (preferably 50 or less, more preferably 30 or less carbon atoms) and the total number of the carbon atoms of the substituents represented by $Z^1$ and/or $Z^2$ is 8 or more (preferably 200 or less, more preferably 120 or less carbon atoms). It is particularly preferably that at least one of $Z^1$ and/or $Z^2$ is a substituent having 2 or more carbon atoms (preferably 50 or less carbon atoms, more preferably 30 or less) and the total number of the carbon atoms of the substituents represented by $Z^1$ and/or $Z^2$ is 10 or more (preferably 200 or less, more preferably 120 or less carbon atoms). It is the most preferable that at least one of $Z^1$ and/or $Z^2$ is a substituent having 2 or more carbon atoms (preferably 50 or less, more preferably 30 or less carbon atoms) and the total number of the carbon atoms of the substituents represented by $Z^1$ and/or $Z^2$ is 10 or more (preferably 120 or less carbon atoms, more preferably 100 or less carbon atoms).

The t is an integer satisfying 0 to 4, particularly preferably 1 or 2, and the most preferably 1.

Among the above-mentioned aromatic rings represented by the formula (V-1), the aromatic ring represented by the following formula (V-2) is particularly preferable.

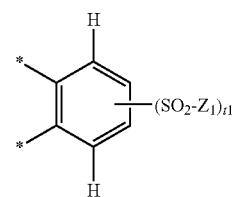

Formula (V-2)

In the formula (V-2), $Z^1$ is as defined for $Z^1$ in the above-mentioned formula (V-1), and preferable examples thereof are the same. The t1 is an integer satisfying 0 to 2, and * shows the positions to which the phthalocyanine backbone is attached.

Particularly preferable combinations of the phthalocyanine compound represented by the formula (V) are as follows.

(a) A phthalocyanine compound wherein at least one of the rings each consisting of $(Q^1, P^1, W^1$ and $R^1)$, $(Q^2, P^2, W^2$ and $R^2)$, $(Q^3, P^3, W^3$ and $R^3)$ and $(Q^4, P^4, W^4$ and $R^4)$ {ring A: (A), ring B: (B), ring C: (C) and ring D: (D)} is a hetero ring is preferable.

(b) A phthalocyanine compound wherein at least one of the rings each consisting of $(Q^1, P^1, W^1$ and $R^1)$, $(Q^2, P^2, W^2$ and $R^2)$, $(Q^3, P^3, W^3$ and $R^3)$ and $(Q^4, P^4, W^4$ and $R^4)$ {ring A: (A), ring B: (B), ring C: (C) and ring D: (D)} is a nitrogen-containing 6-membered hetero ring is preferable. However, where all of the four rings, ring A: (A), ring B: (B), ring C: (C) and ring D: (D), are simultaneously pyridine rings, a pyridine ring in which one of ($Q_1$ and $R_1$) is a nitrogen atom, a pyridine ring in which one of ($Q_2$ and $R_2$) is a nitrogen atom, a pyridine ring in which one of ($Q_3$ and $R_3$) is a nitrogen atom, and a pyridine ring in which one of ($Q_4$ and $R_4$) is a nitrogen atom are excluded. Furthermore, the case where all of the four rings, ring A: (A), ring B: (B), ring C: (C) and ring D: (D), are simultaneously pyrazine rings is excluded.

(c) A compound wherein at least one of the rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} is an aromatic ring and at least one is a pyridine ring and/or a pyrazine ring, of which a phthalocyanine compound wherein at least one of the rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} is an aromatic ring that is substituted by a sulfinyl group, a sulfonyl group or a sulfamoyl group and has a substituent having 2 or more carbon atoms, is particularly preferable, a phthalocyanine compound wherein at least one of the rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} is an aromatic ring substituted by a sulfonyl group or a sulfamoyl group, which has a substituent having 2 or more carbon atoms, is further preferable, and a phthalocyanine compound wherein at least one of the rings each consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} is an aromatic ring that is substituted by a sulfonyl group and has a substituent having 2 or more carbon atoms, is the most preferable.

(d) M is preferably a hydrogen atom, a metal atom or an oxide, a hydroxide, or a halide thereof, of which Cu, Ni, Zn, Al and the like are preferable, and Cu is the most preferable.

(e) It is preferable that the phthalocyanine compound represented by the formula (V) has at least one lipophilic group having 2 or more (preferably 60 or less, more preferably 30 or less) carbon atoms in one molecule. It is preferable that the compound has at least one lipophilic group having 3 or more carbon atoms, of which a lipophilic group having 8 or more (preferably 240 or less, more preferably 120 or less) carbon atoms in total is more preferable, and among these, a lipophilic group having 10 or more (preferably 120 or less, more preferably 100 or less) carbon atoms in total is particularly preferable.

In the formula (V-2), it is preferable that $Z^1$ are each independently a group represented by -$A^1$-L-$A^2$-Q.

$A^1$ and $A^2$ are each independently an unsubstituted or substituted alkylene, an unsubstituted or substituted phenylene, an unsubstituted or substituted naphthylene or an unsubstituted or substituted heterocyclic group, preferably an unsubstituted or substituted alkylene, or an unsubstituted or substituted phenylene, of which an unsubstituted or substituted alkylene is particularly preferable.

More specifically, a linear or branched alkylene group {for example, a linear alkylene —($CH_2$)n- (wherein n is an integer satisfying 1 to 18)} having 1 to 18 carbon atoms is preferable, and a linear or branched alkylene group having 1 to 8 carbon atoms is particularly preferable, of which a linear or branched alkylene group having 2 to 6 carbon atoms is preferable.

L is a divalent linking group, preferably an oxy group (—O—), a thio group (—S—), a carbonyl group (—CO—), a sulfonyl group (—$SO_2$—), an imino group (—NR—), a sulfamoyl group (—$SO_2$NR—), a carbamoyl group (—CONR—), an alkoxycarbonyl group (—$CO_2$—), acylamino group (—NRCO—) or a sulfonamide group (—NR$SO_2$—). Among these, an oxy group (—O—), a sulfa- moyl group (—$SO_2$NR—), a carbamoyl group (—CONR—) and an alkoxycarbonyl group (—$CO_2$—) are preferable, and a sulfamoyl group (—$SO_2$NR—) and an alkoxycarbonyl group (—$CO_2$—) are particularly preferable.

In the above-mentioned formulas showing the specific examples of the linking group for L, R is a hydrogen atom, an alkyl group, an aryl group or a heterocyclic group, preferably a hydrogen atom or an alkyl group, and particularly preferably a hydrogen atom.

Q is a hydrogen atom or a substituent. Preferable examples of the substituent have the same meaning as those exemplified as the substituents that the above-mentioned $Z^1$ and $Z^2$ may have, and the preferable ranges therefor are the same.

More specifically, an alkyloxy group (for example, groups such as methoxy, ethoxy, 2-methoxyethoxy, 3-isopropyloxy and 2-methanesulfonylethoxy) and an aryloxy group (for example, groups such as phenoxy, 2-methylphenoxy, 4-t-butylphenoxy, 4-methoxyphenoxy and 3-t-butyloxycarbamoylphenoxy) are preferable. Specifically, a linear or branched alkyloxy group having 1 to 18 carbon atoms is the most preferable, of which a linear or branched alkyloxy group having 1 to 8 carbon atoms is the most preferable.

The particularly preferable substituent $Z^1$ represented by the formula (V-2) is a group represented by -$A^1$-L-$A^2$-Q. It is preferable that the formula (VI) has at least one (preferably one) —$SO_2$—$Z^1$.

The above-mentioned $A^1$ and $A^2$ are each independently an unsubstituted or substituted alkylene, an unsubstituted or substituted phenylene, an unsubstituted or substituted naphthylene, or an unsubstituted or substituted heterocyclic group, preferably an unsubstituted or substituted alkylene or an unsubstituted or substituted phenylene, of which a linear or branched alkylene group having 1 to 18 carbon atoms {for example, a linear alkylene —($CH_2$)n- (wherein n is an integer satisfying 1 to 18)} is preferable, and a linear or branched alkylene group having 1 to 8 carbon atoms is particularly preferable, of which a linear or branched alkylene group having 2 to 6 carbon atoms is preferable.

The above-mentioned L is a divalent linking group. Preferable examples include an oxy group (—O—), a thio group (—S—), a carbonyl group (—CO—), a sulfonyl group (—$SO_2$—), an imino group (—NR—), a sulfamoyl group (—$SO_2$NR—), a carbamoyl group (—CONR—), an alkoxycarbonyl group (—$CO_2$—), an acylamino group (—NRCO—) and a sulfonamide group (—NR$SO_2$—), of which an oxy group (—O—), a sulfamoyl group (—$SO_2$NR—), a carbamoyl group (—CONR—) and an alkoxycarbonyl group (—$CO_2$—) are preferable, and a sulfamoyl group (—$SO_2$NR—) and an alkoxycarbonyl group (—$CO_2$—) are particularly preferable.

In the above-mentioned formulas for representing the specific examples of the linking group for describing L, R is a hydrogen atom, an alkyl group, an aryl group or a heterocyclic group, preferably a hydrogen atom or an alkyl group, and particularly preferably a hydrogen atom.

The above-mentioned Q is a hydrogen atom or a substituent. Preferable examples include an alkyloxy group (for example, groups such as methoxy, ethoxy, 2-methoxyethoxy and 3-isopropyloxy), and an aryloxy group (for example, groups such as phenoxy, 2-methylphenoxy, 4-t-butylphenoxy and 4-methoxyphenoxy), of which a linear or branched alkyloxy group having 1 to 18 carbon atoms is particularly preferable, of which a linear or branched alkyloxy group having 1 to 8 carbon atoms is the most preferable.

Examples of the combination of the substituents for the compound represented by the formula (V) include, a compound having the preferable group above as at least 1 of the various substituent groups is preferable, a compound having the preferable group above as more of the various substituent groups is more preferable, and a compound having the preferable group above as all of the substituent groups is most preferable.

Specific examples of the compound represented by the formula (V) may include the compounds described in JP-A No. 2006-28321.

Among the compounds, 101, 102, 103, 107, 112 and 117 are preferable, and 101, 102, 103 and 107 are more preferable.

[Compound Represented by the Formula (VI)]

Next, the compound represented by the formula (VI) is described.

In the formulas (VI) and (VII), M is a hydrogen atom, a metal atom, a metal oxide, a metal hydroxide or a metal halide.

Pc is a phthalocyanine nucleus represented by the formula (VII) having a valency of (k+l+m+n).

In the formula (VI), $X^1$, $X^2$, $X^3$ and $X^4$ are each independently a substituent selected from —SO—$R^1$, —$SO_2$—$R^1$, —$SO_2NR^2R^3$, —$CONR^2R^3$, —$CO_2$—$R^1$ and CO—$R^1$, and the four benzene rings {A, B, C and D in the formula (VII)} in the phthalocyanine nucleus each has at least one of the substituents. The compound of the invention is a dye mixture comprising dyes having a plurality of different substituents. The center metals of the phthalocyanine nuclei are not different between the dyes.

As the substituent, a substituent selected from —SO—$R^1$, —$SO_2$—$R^1$ and —$SO_2NR^2R^3$ is preferable, a combination of —$SO_2$—$R^1$ and —$SO_2$—$R^2$, or —$SO_2$—$R^1$ and —$SO_2NR^2R^3$ is more preferable, and a combination of —$SO_2$—$R^1$ and —$SO_2$—$R^2$ is particularly preferable.

However, $X^1$, $X^2$, $X^3$ and $X^4$ are not all the same, and their similarity (namely, number of $X^1$ to $X^4$ that represent the same substituent) may be suitably varied according to the solubility, associating property, and the like.

Furthermore, at least one of $X^1$, $X^2$, $X^3$ and $X^4$ is a substituent having 2 or more carbon atoms (preferably 50 or less, more preferably 30 or less carbon atoms), and the total number of carbon atoms of the substituents represented by $X^1$, $X^2$, $X^3$ and $X^4$ is 8 or more (preferably 200 or less carbon atoms, more preferably 120 or less carbon atoms), and ionic hydrophilic groups are not included in the molecules.

$R^1$ is preferably an unsubstituted or substituted alkyl group, an unsubstituted or substituted aryl group or an unsubstituted or substituted heterocyclic group, of which a substituted alkyl group, a substituted aryl group or a substituted heterocyclic group is the most preferable.

$R^2$ is a hydrogen atom, an unsubstituted or substituted alkyl group, an unsubstituted or substituted aryl group or an unsubstituted or substituted heterocyclic group, of which a hydrogen atom, a substituted alkyl group, a substituted aryl group or a substituted heterocyclic group is the most preferable.

$R^3$ is preferably an unsubstituted or substituted alkyl group, an unsubstituted or substituted aryl group or an unsubstituted or substituted heterocyclic group, of which a substituted alkyl group, a substituted aryl group or a substituted heterocyclic group is the most preferable.

The unsubstituted or substituted alkyl group represented by $R^1$, $R^2$ and $R^3$ is preferably an alkyl group having 1 to 12 carbon atoms. Specifically, a branched alkyl group is preferable, of which one having an asymmetric carbon (use in the form of a racemate) is particularly preferable, since the solubility and ink stability of the dye are increased.

Examples of the substituent include those similar to the substituent in the case where $R^1$, $R^2$ and $R^3$ mentioned below may further have substituents. Among these, a hydroxyl group, an ether group, an ester group, a cyano group, an amide group and a sulfonamide group are particularly preferable for improvement in fastness of the dye by the increased association. The substituents may further have halogen atoms.

The unsubstituted or substituted cycloalkyl group represented by $R^1$, $R^2$ and $R^3$ is preferably a cycloalkyl group having 5 to 12 carbon atoms. Specifically, one having an asymmetric carbon (use in the form of a racemate) is particularly preferable since the solubility of the dye and the stability of the ink are increased.

Examples of the substituent include those similar to the substituent in the case where $R^1$, $R^2$ and $R^3$ mentioned below may further have substituents. Among these, a hydroxyl group, an ether group, an ester group, a cyano group, an amide group and a sulfonamide group are particularly preferable since the association property is increased and the fastness is improved in the dye. The substituents may further have halogen atoms.

The unsubstituted or substituted alkenyl group represented by $R^1$, $R^2$ and $R^3$ is preferably an alkenyl group having 2 to 12 carbon atoms. Specifically, a branched alkenyl group is preferable, of which one having an asymmetric carbon (use in the form of a racemate) is particularly preferable, for improvement in fastness of the dye by the increased association.

Examples of the substituent include those similar to the substituent in the case where $R^1$, $R^2$ and $R^3$ mentioned below may further have substituents. Among these, a hydroxyl group, an ether group, an ester group, a cyano group, an amide group and a sulfonamide group are particularly preferable for improvement in fastness of the dye by the increased association. The substituents may further have halogen atoms.

The unsubstituted or substituted aralkyl group represented by $R^1$, $R^2$ and $R^3$ is preferably an aralkyl group having 7 to 18 carbon atoms. Specifically, a branched aralkyl group is preferable, of which one having an asymmetric carbon (use in the form of a racemate) is particularly preferable, since the solubility and ink stability of the dye are increased.

Examples of the substituent include those similar to the substituent in the case where $R^1$, $R^2$ and $R^3$ mentioned below may further have substituents. Among these, a hydroxyl group, an ether group, an ester group, a cyano group, an amide group and a sulfonamide group are particularly preferable for improvement in fastness of the dye by the increased association. The substituents may further have halogen atoms.

Additionally, the unsubstituted or substituted aryl group represented by $R^1$, $R^2$ and $R^3$ is preferably an aryl group having 6 to 12 carbon atoms.

Examples of the substituent include those similar to the substituents in the case where $R^1$, $R^2$ and $R^3$ mentioned below may further have substituents. Among these, an electron-withdrawing group is particularly preferable since it increases the oxidation potential of the dye and improves the fastness. Among these, a halogen atom, a heterocyclic group, a cyano group, a carboxyl group, an acylamino group, a sulfonamide group, a sulfamoyl group, a carbamoyl group, a sulfonyl group, an imide group, an acyl group, a sulfo group and a quaternary ammonium group are preferable, and a cyano group, a carboxyl group, a sulfamoyl group, a carbamoyl group, a sulfonyl group, an imide group, an acyl group, a sulfo group and a quaternary ammonium group are further preferable.

The heterocyclic group represented by $R^1$, $R^2$ and $R^3$ is preferably a 5- or 6-membered ring, and the ring may be further fused. The heterocyclic group may be an aromatic heterocyclic group or a non-aromatic heterocyclic group.

Hereinafter the heterocyclic group represented by $R^1$, $R^2$ and $R^3$ is exemplified as a form of a hetero ring with omitting the position of substitution. However, the position of substitution is not limited, and for example, pyridine may be substituted at 2-, 3- and 4-positions. Examples includes pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like.

Among these, aromatic hetero groups are preferable, and the preferable examples thereof that are exemplified in a manner similar to the above-mentioned examples include pyridine, pyrazine, pyrimidine, pyridazine, triazine, pyrazole, imidazole, benzimidazole, triazole, thiazole, benzothiazole, isothiazole, benzisothiazole and thiadiazole.

These groups may have substituents, and examples of the substituents include those similar to the substituents in the case where $R^1$, $R^2$ and $R^3$ mentioned below may further have substituents.

Examples of the preferable substituents have the same meaning as the substituents for the aryl group, and examples of the further preferable substituents have the same meaning as the further preferable substituents for the aryl group.

Where $R^1$, $R^2$ and $R^3$ are each a group that may further have substituents, the group may further have the substituents those exemplified as the substituents for $Y^1$ and $Y^2$ in the formula (I).

In the formula (VI), k, l, m and n are each an integer satisfying $0<k<8$, an integer satisfying $0<l<8$, an integer satisfying $0≤m<8$ and an integer satisfying $0≤n<8$.

k, l, m and n are numbers that satisfy $4≤k+l+m+n≤8$.

Furthermore, k, l, m and n are preferably each an integer satisfying $0<k<8$, an integer satisfying $0<l<8$, an integer satisfying $0≤m<8$ and $n=0$, particularly preferably an integer satisfying $0<k<8$, an integer satisfying $0<l<8$ and $m=n=0$, and the most preferably an integer satisfying $0<k<4$, an integer satisfying $0<l<4$ (a number that satisfies $k+l=4$) and $m=n=0$.

In the formula (VII), $Y^1$, $Y^2$, $Y^3$, $Y^4$, $Y^5$, $Y^6$, $Y^7$ and $Y^8$ are each independently a hydrogen atom or a monovalent substituent. Examples of the monovalent substituent specifically include the substituents exemplified for $Y^1$ and $Y^2$ in the formula (I), and the like.

Among these, particularly preferable examples include a hydrogen atom, a halogen atom, an alkyl group, an aryl group, a cyano group, an alkoxy group, an amide group, an ureido group, a sulfonamide group, a carbamoyl group, a sulfamoyl group and an alkoxycarbonyl group, of which a hydrogen atom, a halogen atom and a cyano group are particularly preferable, and a hydrogen atom is the most preferable. The number of the carbon atoms for the monovalent substituent is preferably 2 or more.

$Y^1$ to $Y^8$ may further have substituents, and examples of the substituent include the above-mentioned substituents that are exemplified for the case where $R^1$, $R^2$ and $R^3$ each further has substituents.

The particularly preferable combinations as the mixtures represented by the formulas (VI) and (VII) are as follows:

(a) $X^1$, $X^2$, $X^3$ and $X^4$ are preferably each independently —SO—$R^1$, —SO$_2$—$R^1$, —SO$_2$NR$^2$R$^3$, —CONR$^2$R$^3$, —CO$_2$—$R^1$ or CO—$R^1$, further preferably —SO$_2$—$R^1$, —SO$_2$NR$^2$R$^3$, —CONR$^2$R$^3$, —CO$_2$—$R^1$ or CO—$R^1$, particularly preferably —SO$_2$—$R^1$ or SO$_2$NR$^2$R$^3$, and the most preferably —SO$_2$—$R^1$.

(b) $R^1$ is preferably an unsubstituted or substituted alkyl group, an unsubstituted or substituted aryl group or an unsubstituted or substituted heterocyclic group, further preferably a substituted alkyl group, a substituted aryl group or a substituted heterocyclic group, of which a substituted alkyl group having a hydroxyl group as a substituent is the most preferable.

(c) $R^2$ is preferably a hydrogen atom, an unsubstituted or substituted alkyl group, an unsubstituted or substituted aryl group or an unsubstituted or substituted heterocyclic group, more preferably a hydrogen atom, a substituted alkyl group, a substituted aryl group or a substituted heterocyclic group, of which a hydrogen atom is the most preferable.

(d) $R^3$ is preferably an unsubstituted or substituted alkyl group, an unsubstituted or substituted aryl group or an unsubstituted or substituted heterocyclic group, more preferably a substituted alkyl group, a substituted aryl group or a substituted heterocyclic group, of which a substituted alkyl group having a hydroxyl group as a substituent is the most preferable.

(e) $Y^1$ to $Y^8$ are each independently preferably a hydrogen atom, a halogen atom, an alkyl group, an aryl group, a cyano group, an alkoxy group, an amide group, an ureido group, a sulfonamide group, a carbamoyl group, a sulfamoyl group or an alkoxycarbonyl group, more preferably a hydrogen atom or a halogen atom. Specifically, a hydrogen atom is the most preferable.

(f) M is preferably Cu, Ni, Zn, Al, or the like, of which Cu is the most preferable.

The dye mixture represented by the formula (VI) is preferably one having at least one or more substituents each having 2 or more (preferably 50 or less, more preferably 30 or less) carbon atoms per one unit of phthalocyanine nucleus, one having 8 or more (preferably 200 or less, and more preferably 120 or less) carbon atoms in total for the substituent per one unit of phthalocyanine nucleus, of which one having 10 or more (preferably 200 or less, and more preferably 120 or less) carbon atoms in total for the substituent per one unit of phthalocyanine nucleus is the most preferable. However, ionic hydrophilic groups are not included.

Since the dye mixture represented by the formula (VI) has substituents each having at least 2 or more carbon atoms per one unit of phthalocyanine nucleus, the solubility and dispersing property in the oil medium are favorable.

Examples of the combination of the preferable substituents for the dye mixture represented by the formula (VI) include, a compound having the preferable group above as at least 1 of the various substituent groups is preferable, a compound having the preferable group above as more of the various substituent groups is more preferable, and a compound having the preferable group above as all of the substituent groups is most preferable.

Specific examples of the compounds represented by the formulas (VI) and (VII) may include the compounds described in JP-A No. 2006-28450.

Among these, the exemplified compounds Nos. 101, 102, 104, 110, 114 and 120 described in JP-A No. 2006-28450 are preferable, of which the exemplified compounds Nos. 101, 104 and 114 are more preferable.

The content of the oil-soluble dye used in the invention is preferably from 0.05 to 10% by mass, more preferably from 0.1 to 6% by mass, and further preferably from 0.2 to 3% by mass, with respect to the total amount of the ink composition.

<Pigment>

The pigment that may be used for the invention is not specifically limited as long as it has the L*a*b* values within the same range as the range of the L*a*b* values of the oil-soluble dye included in the ink composition.

Where the yellow dye is used as the oil-soluble dye, a pigment having an L*a*b* values in which 70≤L*≤104, −40≤a*≤10 and 70≤b*≤120 (hereinafter also referred to as "yellow pigment") must be used. The more preferable range and particularly preferable range of the L*a*b* values of the yellow pigment are the same as the preferable range and particularly preferable range of the L*a*b* values of the yellow dye, respectively.

Where the magenta dye is used as the oil-soluble dye, a pigment having an L*a*b* values of 30≤L*≤64, 55≤a*≤105 and −40≤b*≤10 (hereinafter also referred to as "magenta pigment") must be used. The more preferable range and particularly preferable range of the L*a*b* values of the magenta pigment are the same as the preferable range and particularly preferable range of the L*a*b* values of the magenta dye, respectively.

Where the cyan dye is used as the oil-soluble dye, a pigment having an L*a*b* values of 35≤L*≤69, −60≤a*≤−10 and −70≤b*≤−20 (hereinafter also referred to as "cyan pigment") must be used. The more preferable range and particularly preferable range of the L*a*b* values of the cyan pigment are the same as the preferable range and particularly preferable range of the L*a*b* values of the cyan dye, respectively.

As such pigment, for example, the organic or inorganic pigments of the following numbers as described in the Color Index may be used.

Examples of the red or magenta pigment include Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257, Pigment Violet 3, 19, 23, 29, 30, 37, 50 and 88, Pigment Orange 13, 16, 20 and 36, and the like.

Examples of the blue or cyan pigment include Pigment Blue 1, 15, 15:1, 15:2, 15:3, 15:4, 15:6, 16, 17-1, 22, 27, 28, 29, 36 and 60, and the like.

Examples of the green pigment include Pigment Green 7, 26, 36 and 50, and the like.

Examples of the yellow pigment include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185 and 193, and the like.

Examples of the black pigment include Pigment Black 7, 28 and 26, and the like.

Examples of the white color pigment include Pigment White 6, 18 and 21, and the like.

These pigments may be suitably selected and used so that the pigment used in the ink composition of the invention becomes a pigment having an L*a*b* values that corresponds to that of the above-mentioned oil-soluble dye.

The content of the pigment used in the invention is preferably from 0.5% by mass to 12% by mass, and more preferably from 0.8% by mass to 8% by mass, with respect to the total amount of the ink.

The total content of the pigment and oil-soluble dye as color materials is preferably from 0.6% by mass to 15% by mass, and more preferably from 1% by mass to 10% by mass, with respect to the total amount of the ink.

The content ratio of the pigment to the oil-soluble dye in the ink composition is from 95:5 to 50:50, more preferably from 90:10 to 55:45, and further preferably from 85:15 to 60:40.

In the ink composition of the invention, the preferable combinations of the pigment and the oil-soluble dye are as follows.

Namely, where the ink composition of the invention is used for a yellow ink, a combination of the yellow pigment and the particular yellow dye is preferable, a combination wherein the yellow pigment is any of Pigment Yellow 74, 93, 97, 110, 120, 138, 139, 154, 155, 180 and 185, and the particular yellow dye is any of the formulas (I) to (III) is more preferable, and a combination wherein the yellow pigment is any of Pigment Yellow 120, 155 and 180, and the particular yellow dye is any of DYE-A2 to DYE-A4, DYE-A6, DYE-A7 and DYE-A11 represented by the formula (I), DYE-B1, DYE-B2 and DYE-B12 represented by the formula (II), and DYE-C1, DYE-C6 and DYE-C10 represented by the formula (III) is further preferable.

Where the ink composition of the invention is used for a magenta ink, a combination of the magenta pigment and the particular magenta dye is preferable.

More preferable combination are a combination wherein the magenta pigment is any of Pigment Red 3, 5, 19, 22, 31, 38, 43, 48:1, 48:2, 48:3, 48:4, 48:5, 49:2, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 202, 208, 216, 226 and 257 and Pigment Violet 19 and 23, and the particular magenta dye is the dye represented by the formula (IV), and a combination wherein the magenta pigment is any of Pigment Red 202 and Pigment Violet 19, and the particular magenta dye is any of DYE-D9, DYE-D16 and DYE-D29 of the formula (IV) is more preferable.

Where the ink composition of the invention is used for a cyan ink, a combination of the cyan pigment and the particular cyan dye is preferable. More preferably, it is a combination wherein the cyan pigment is any of Pigment Blue 1, 15, 15:1, 15:2, 15:3, 15:4, 15:6, 16, 17-1, 22, 27, 28, 29, 36 and 60, and the particular cyan dye is any of the dyes represented by the formulas (V) to (VII).

More preferably, a combination wherein the cyan pigment is Pigment Blue 15:3, and the particular cyan dye is any of the compound represented by the formula (V), the exemplified compounds No. 101, 102, 103 and 107 described in JP-A No. 2006-28321, the compound represented by the formula (VI), the compound represented by the formula (VII), and the exemplified compounds No. 101, 104 and 114 described in JP-A No. 2006-28450.

<Polymerizable Compound>

It is essential that the ink composition of the invention comprise a polymerizable compound such as a cation polymerizable compound and a radical polymerizable compound.

—Cation Polymerizable Compound—

As the cation polymerizable compound that may be used in the invention, a compound that initiates polymerization reaction by an acid generated from the below-mentioned compound that generates an acid upon irradiation with radiation ray and cures is preferable, and various known cation polymerizable monomers known as light cation polymerizable compounds may be used. Examples of the cation polymerizable compound may include the epoxy compounds, vinyl ether compounds, oxetane compounds, and the like described in various publications such as JP-A Nos. 6-9714, 2001-31892, 2001-40068, 2001-55507, 2001-310938, 2001-310937 and 2001-220526, and the like.

The epoxy compounds include aromatic epoxides, alicyclic epoxides, and the like.

The aromatic epoxides are, for example, di- or poly-glycidyl ethers prepared in reaction of a polyvalent phenol having at least one aromatic ring or the alkyleneoxide adduct thereof with epichlorohydrin, and example thereof include di- or poly-glycidyl ethers of bisphenol A or the alkyleneoxide adduct thereof, di- or poly-glycidyl ethers of a hydrogenated bisphenol A or the alkyleneoxide adduct thereof, novolak epoxy resins, and the like. The alkyleneoxide is ethyleneoxide, propyleneoxide, or the like.

The alicyclic epoxide is preferably, for example, a compound containing cylcohexeneoxide or cyclopenteneoxide obtained by epoxidizing a compound having at least one cycloalkane ring such as cyclohexene or cyclopentene with an oxidizing agent such as hydrogen peroxide or a peracid.

Examples of the aliphatic epoxides include di- or polyglycidyl ethers of an aliphatic polyvalent alcohol or the alkyleneoxide adduct thereof, and typical examples thereof include alkylene glycol diglycidyl ethers such as ethylene glycol diglycidyl ether, propylene glycol diglycidyl ether and 1,6-hexanediol diglycidyl ether; polyvalent alcohol polyglycidyl ethers such as di- or tri-glycidyl ethers of glycerol or the alkyleneoxides adduct thereof, polyalkylene glycol diglycidyl ethers such as diglycidyl ether of polyethylene glycol or the alkyleneoxide adduct thereof and diglycidyl ether of a polypropylene glycol or the alkyleneoxide adducts thereof, and the like. The alkyleneoxide is ethyleneoxide, propyleneoxide, or the like.

The monofunctional and polyfunctional epoxy compounds for use in the invention will be described below.

Examples of the monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cylcohexeneoxide, 3-methacryloyloxymethylcylcohexeneoxide, 3-acryloyloxymethylcylcohexeneoxide, 3-vinylcylcohexeneoxide, and the like.

Examples of the multifunctional epoxy compounds include bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcylcohexeneoxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

Among these epoxy compounds, the aromatic epoxides and alicyclic epoxides are preferable, and alicyclic epoxides are particularly preferable, in view of excellent curing velocity.

Examples of the vinyl ether compounds include di- or tri-vinyl ether compounds such as ethylene glycol divinylether, diethylene glycol divinylether, triethylene glycol divinylether, propylene glycol divinylether, dipropylene glycol divinylether, butanediol divinylether, hexanediol divinylether, cyclohexanedimethanol divinylether, and trimethylolpropane trivinylether; monovinylether compounds such as ethyl vinylether, n-butyl vinylether, isobutyl vinylether, octadecyl vinylether, cyclohexyl vinylether, hydroxybutyl vinylether, 2-ethylhexyl vinylether, cyclohexanedimethanol monovinylether, n-propyl vinylether, isopropyl vinylether, isopropenylether-O-propylene carbonate, dodecyl vinylether, diethylene glycol monovinylether, and octadecyl vinylether; and the like.

Hereinafter, the monofunctional and multifunctional vinyl ethers will be described.

Examples of the monofunctional vinylethers include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinylether, methoxyethyl vinylether, ethoxyethyl vinylether, butoxyethyl vinylether, methoxyethoxyethyl vinylether, ethoxyethoxyethyl vinylether, methoxypolyethylene glycol vinylether, tetrahydrofurfuryl vinylether, 2-hydroxyethyl vinylether, 2-hydroxypropyl vinylether, 4-hydroxybutyl vinylether, 4-hydroxymethylcyclohexylmethyl vinylether, diethylene glycol monovinylether, polyethylene glycol vinylether, chloroethyl vinylether, chlorobutyl vinylether, chloroethoxyethyl vinylether, phenylethyl vinylether, phenoxypolyethylene glycol vinylether, and the like.

Examples of the multifunctional vinylethers include divinyl ethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylethers, and bisphenol F alkyleneoxide divinylethers; multifunctional vinyl ethers such as trimethylolethane trivinylether, trimethylolpropane trivinylether, ditrimethyrollpropane tetravinylether, glycerol trivinylether, pentaerythritol tetravinylether, dipentaerythritol pentavinylether, dipentaerythritol hexavinylether, ethyleneoxide adducts of trimethylolpropane trivinylether, propyleneoxide adducts of trimethylolpropane trivinylether, ethyleneoxide adducts of ditrimethyrollpropane tetravinylether, propyleneoxide adducts of ditrimethyrollpropane tetravinylether, ethyleneoxide adducts of pentaerythritol tetravinylether, propyleneoxide adducts of pentaerythritol tetravinylether, ethyleneoxide adducts of dipentaerythritol hexavinylether, and propyleneoxide adducts of dipentaerythritol hexavinylether, and the like.

Di- or tri-vinylether compounds are prefereble as the vinyl ether compounds, form the viewpoints of curing efficiency, adhesiveness to recording medium, and the surface hardness of formed image; and divinylether compounds are particularly preferable.

The oxetane compound that may be used for the invention may be selected from known oxetane compounds such as those described in JP-A Nos. 2001-220526, 2001-310937 and 2003-341217. As the compound having an oxetane ring that may be used for the ink composition of the invention, a compound having 1 to 4 oxetane rings in its structure is preferable. By using such compound, the viscosity of the composition is readily maintained within the range at which the handling property is favorable.

Examples of the compound having 1 or 2 oxetane rings in a molecule used for the ink composition of the invention include the compounds represented by the following formulas (1) to (3), and the like.

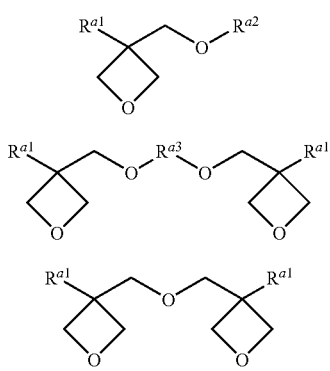

$R^{a1}$ represents a hydrogen atom, an alkyl group having 1 to 6 carbon atoms, a fluoroalkyl group having 1 to 6 carbon atoms, an allyl group, an aryl group, a furyl group or a thienyl group. If there are two $R^{a1}$ groups in a molecule, they may be the same as or different from each other.

Examples of the alkyl groups include methyl, ethyl, propyl, and butyl group, and the like; and favorable examples of the fluoroalkyl groups include the alkyl groups above of which any one or more of the hydrogen atoms are substituted with fluorine atoms.

$R^{a2}$ represents a hydrogen atom, an alkyl group having 1 to 6 carbon atoms, an alkenyl group having 2 to 6 carbon atoms, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl group include methyl, ethyl, propyl, and butyl group, and the like; and examples of the alkenyl groups include 1-propenyl, 2-propenyl, 2-methyl-1-propenyl, 2-methyl-2-propenyl, 1-butenyl, 2-butenyl, and 3-butenyl groups, and the like; and examples of the groups having an aromatic ring include phenyl, benzyl, fluorobenzyl, methoxybenzyl, and phenoxyethyl groups and the like. Examples of the alkylcarbonyl groups include ethylcarbonyl, propylcarbonyl, and butylcarbonyl groups and the like; examples of the alkoxycarbonyl groups include ethoxycarbonyl, propoxycarbonyl, and butoxycarbonyl groups and the like; and examples of the N-alkylcarbamoyl groups include ethylcarbamoyl, propylcarbamoyl, butylcarbamoyl, and pentylcarbamoyl groups and the like. In addition, $R^{a2}$ may have a substituent group; and examples of the substituent groups include alkyl groups having 1 to 6 carbon atoms and a fluorine atom.

$R^{a3}$ represents a linear or branched alkylene group having 1 to 15 carbons, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or a group shown below. Examples of the alkylene groups include ethylene, propylene, and butylene groups and the like; and examples of the poly(alkyleneoxy) groups include poly(ethyleneoxy) and poly(propyleneoxy) groups and the like. Examples of the unsaturated hydrocarbon groups include propenylene, methylpropenylene, and butenylene groups, and the like.

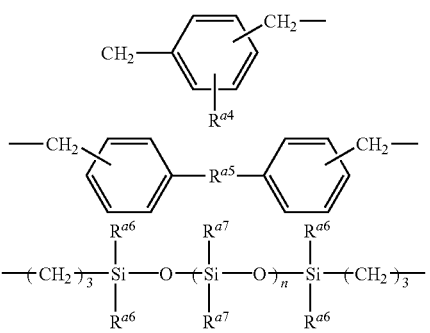

When $R^{a3}$ is one of the polyvalent group, $R^{a4}$ represents a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ represents an oxygen or sulfur atom, a methylene group, NH, SO, $SO_2$, $C(CF_3)_2$, or $C(CH_3)_2$. $R^{a6}$ represents an alkyl group having 1 to 4 carbons or an aryl group; and n represents an integer satisfying 0 to 2,000. $R^{a7}$ represents an alkyl group having 1 to 4 carbons, an aryl group, or a monovalent group having the following structure. In the formula below, $R^{a8}$ represents an alkyl group having 1 to 4 carbons or an aryl group; and m is an integer satisfying 0 to 100.

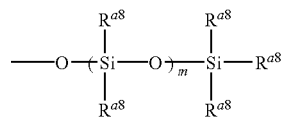

Examples of the compounds represented by the formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compounds represented by the formula (2) include 1,4-bis[(3-ethyl-3-oxetanylmethoxy)methyl]benzene (OXT-121: Toagosei Co., Ltd. In addition, examples of the compounds represented by the formula (3) include bis(3-ethyl-3-oxetanylmethyl)ether (OXT-221: Toagosei Co., Ltd.).

Examples of the compounds having 3 or 4 oxetane rings include the compounds represented by the following formula (4).

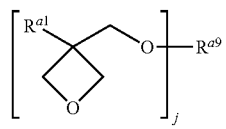

In formula (4), $R^{a1}$ is the same as that in formula (1) above. Examples of the polyvalent connecting group $R^{a9}$ include branched alkylene group having 1 to 12 carbon atoms such as the groups represented by the following groups A to C, branched poly(alkyleneoxy) groups such as the groups represented by the following group D, and branched polysiloxy groups such as the group represented by the following group E, and the like. j is 3 or 4.

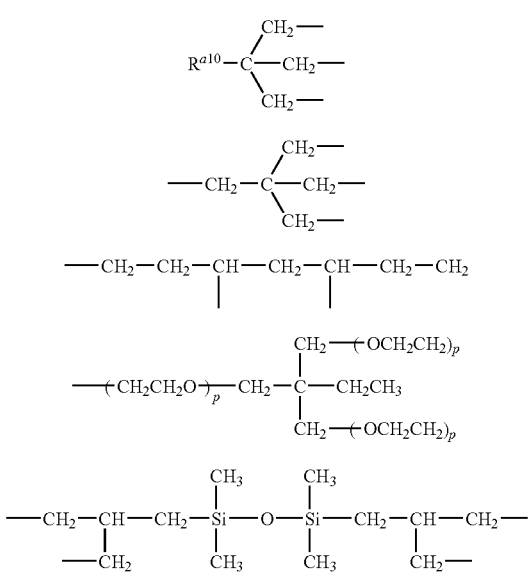

In the group A, $R^{a10}$ represents a methyl, ethyl or propyl group. In the group D, p is an integer satisfying 1 to 10.

Other examples of the oxetane compounds favorably used in the invention include compounds represented by the following formula (5) having oxetane rings on the side chains.

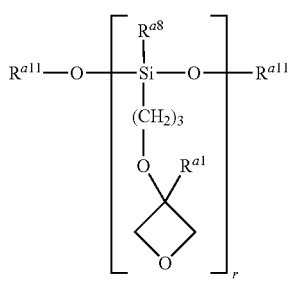

In the formula (5), $R^{a1}$ is as defined in the formula (1), and $R^{a8}$ is an alkyl group having 1 to 4 carbon atoms or an aryl group. $R^{a11}$ is an alkyl group having 1 to 4 carbon atoms such as methyl group, ethyl group, propyl group and butyl group or a trialkylsilyl group, and r is 1 to 4.

Such compounds having an oxetane ring is described in detail in the paragraphs [0021] to [0084] of JP-A No. 2003-341217, and the compound described therein may also be preferably used in the invention.

The oxetane compounds described in JP-A No. 2004-91556 may also be used in combination in the invention. The compounds are described in detail in the paragraphs [0022] to [0058] of the same publication.

Among the other oxetane compounds used in combination in the invention, the compounds having one oxetane ring are preferably used in view of the viscosity and tackiness of the composition.

Where the cation polymerizable compound is used in the ink composition of the invention, it is contained by preferably 60% by mass or more, and more preferably 70% by mass or more, with respect to the total solid content of the ink composition. The upper limit of the amount of the cation polymerizable compound to be added is preferably 95% by mass or less.

Furthermore, the cation polymerizable compound contains a cation polymerizable monofunctional monomer, preferably by 50% by mass or more, and more preferably by 60% by mass or more. Where the cation polymerizable monofunctional monomer is contained by the above-mentioned range, an effect that the softness of the cured film is increased may be obtained.

—Radical Polymerizable Compound—

The radical polymerizable compound that may be used in the ink composition of the invention is a compound having a radical polymerizable ethylenically unsaturated bond, which may be any compound having at least one radical polymerizable ethylenically unsaturated bond in a molecule, and examples include those having a chemical form such as monomer, oligomer and polymer. The radical polymerizable compound may be used alone, or in combination of two or more kinds in any ratio in order to improve the objective property. It is preferably to use in combination of two or more kinds for controlling the performances such as reaction property and physical property.

Examples of the polymerizable compound having a radical polymerizable ethylenically unsaturated bond include unsaturated carboxylic acids such as acrylic acid, methacrylic acid, itaconic acid, crotonic acid, isocrotonic acid and maleic acid, and salts thereof, anhydrides having an ethylenically unsaturated group, acrylonitrile, styrene, additionally radical polymerizable compounds such as various unsaturated polyesters, unsaturated polyethers, unsaturated polyamides and unsaturated urethanes.

Specific examples include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylolacrylamide, diacetoneacrylamide and epoxy acrylate; methacrylate derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate and 2,2-bis(4-methacryloxypolyethoxyphenyl)propane; and allyl compound derivatives such as allyl glycidyl ether, diallyl phthalate and triallyl trimellitate. More specifically, commercial products and radical polymerizable or crosslinkable monomers, oligomers and polymers known in the art such as those described in Shinzo Yamashita ed., "Crosslinking Agent Handbook" (1981, published by Taiseisha); Kiyomi Kato ed., "UV and EB Curing Handbook (raw material)" (1985, published by Koubunshi Kankokai); RadTech Japan ed., "Applications and Markets of UV and EB Curing Technologies", p. 79 (1989, published by CMC); and Eiichiro Takiyama ed., "Polymer Resin Handbook" (1988, published by Nikkan Kogyo Shimbun, Ltd.) may be used.

As the radical polymerizable compound, for example, the light curable polymerizable compound materials used for the light polymerizable compositions described in JP-A No. 7-159983, Japanese Patent Publication (JP-B) No. 7-31399, JP-A Nos. 8-224982, 10-863 and 9-134011, and the like, and these may also applied for the ink composition of the invention.

Furthermore, as the radical polymerizable compound, vinyl ether compounds are also preferably used. Examples of the vinyl ether compound that is preferably used include di- or tri-vinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexane dimethanol divinyl ether, hydroxyethyl monovinyl ether, hydroxynonyl monovinyl ether and trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether O-propylenecarbonate, dodecyl vinyl ether, diethylene glycol monovinyl ether and octadecyl vinyl ether; and the like.

Among these vinyl ether compounds, divinyl ether compounds and trivinyl ether compounds are preferable, specifically, divinyl ether compounds are preferable, in view of curing property, adhesiveness and surface hardness. The vinyl ether compound may be used alone or suitably in combination of two or more kinds.

Where the radical polymerizable compound is used for the ink composition of the invention, the radical polymerizable compound is included preferably by 60% by mass or more, more preferably by 70% by mass or more, with respect to the total solid content of the ink composition. The upper limit of the amount of the radical polymerizable compound to be added is preferably 95% by mass or less.

<Polymerization Initiator>

The ink composition of the invention essentially comprises a polymerization initiator.

The polymerization initiator to be used may be a compound that produces a polymerization initiating species by absorbing external energy, and may be suitably selected in accordance with the kind of the polymerizable compound to be used in combination.

Examples of the polymerization initiator that may be used in the ink composition of the invention include a photopolymerization initiator for photo-cationic polymerization, a photopolymerization initiator for photo-radical polymerization, a photo-decolorant for dyes, a photo-alterant, or a compound generating an acid upon irradiation with ray used for microresists and the like (ultraviolet ray of 400 to 200 nm, far ultraviolet ray, particularly preferably g ray, h ray, i ray and a KrF excimer laser), ArF excimer laser, electron beam, X-ray, molecular beam, ion beam, or the like.

—Compound Generating Acid Upon Irradiation with Radiation Ray—

In the invention, for example, where a cation polymerizable compound is used as a polymerizable compound, the polymerization initiator is preferably a compound generating an acid upon irradiation with radiation ray. By using the compound, the polymerization reaction of the cation polymerizable compound is initiated by the acid generated upon irradiation with radiation ray, and the compound is cured.

Examples of the polymerization initiator include onium salt compounds such as diazonium salts, phosphonium salts, sulfonium salts and iodonium salts; sulfonate compounds such as imide sulfonates, oxime sulfonates, diazodisulfones, disulfones and o-nitrobenzylsulfonates that may be thermally decomposed to generate acid upon exposure to radiation, and the like.

Other examples of the compounds that generates an acid by irradiation with radiation ray or other activated light (photo acid generating agents) used in the invention include the diazonium salts described in S. I. Schlesinger, Photogr. Sci. Eng., 18, 387 (1974), T. S. Bal et al., Polymer, 21, 423 (1980), and others; the ammonium salts described in U.S. Pat. Nos. 4,069,055, 4,069,056, and Re27,992, JP-A No. 3-140,140, and others; the phosphonium salts described in D. C. Necker et al., Macromolecules, 17, 2468 (1984), C. S. Wen et al, Teh. Proc. Conf. Rad. Curing ASIA, p. 478 Tokyo, October (1988), U.S. Pat. Nos. 4,069,055 and 4,069,056, and others; the iodonium salts described in J. V. Crivello et al., Macromolecules, 10(6), 1307 (1977), Chem. & Eng. News, November 28, p. 31 (1988), EP Nos. 104,143, 339,049, and 410,201, JP-A Nos. 2-150,848 and 2-296,514, and others;

the sulfonium salts described in J. V. Crivello et al., Polymer J. 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al., Macromolecules, 14(5), 1141 (1981), J. V. Crivello et al., J. Polymer Sci., Polymer Chem. Ed., 17, 2877 (1979), EP Nos. 370,693, 161, 811, 410,201, 339,049, 233,567, 297,443, and 297,442, U.S. Pat. Nos. 3,902,114, 4,933,377, 4,760,013, 4,734,444, and 2,833,827, German Patent Nos. 2,904,626, 3,604,580, and 3,604,581, JP-A Nos. 7-28237 and 8-27102, and others;

the selenonium salts described in J. V. Crivello et al., Macromolecules, 10(6), 1307 (1977), J. V. Crivello et al., J. Polymersci., Polymer Chem. Ed., 17, 1047 (1979), and others; the onium salts such as arsonium salts described in C. S. Wen et al., Teh, Proc. Conf. Rad. Curing ASIA, p. 478 Tokyo, October (1988), and others; the organic halogen compounds described in U.S. Pat. No. 3,905,815, JP-B No. 46-4605, JP-A Nos. 48-36281, 55-32070, 60-239736, 61-169835, 61-169837, 62-58241, 62-212401, 63-70243, and 63-298339, and others; the organic metals/organic halides described in K. Meier et al., J. Rad. Curing, 13(4), 26 (1986), T. P. Gill et al., Inorg. Chem., 19, 3007 (1980), D. Astruc, Acc. Chem. Res., 19 (12), 377 (1896), JP-A No. 2-161445, and others;

Polymerization initiators having an O-nitrobenzyl type protective group described in S. Hayase et al, J. Polymer Sci., 25, 753 (1987), E. Reichmanis et al, J. Polymer Sci., Polymer Chem. Ed., 23, 1 (1985), Q. Q. Zhu et al, J. Photochem., 36, 85, 39, 317 (1987), B. Amit et al, Tetrahedron Lett., (24) 2205 (1973), D. H. R. Barton et al, J. Chem. Soc., 3571 (1965), P. M. Collins et al, J. Chem. Soc., Perkin I, 1695 (1975), M. Rudinstein et al, Tetrahedron Lett., (17), 1445 (1975), J. W. Walker et al, J. Am. Chem. Soc., 110, 7170 (1988), S. C. Busman et al, J. Imaging Technol., 11 (4), 191 (1985), H. M. Houlihan et al, Macromolecules, 21, 2001 (1988), P. M. Collins et al, J. Chem. Soc., Chem. Commun., 532 (1972), S. Hayase et al, Macromolecules, 18, 1799 (1985), E. Reichmanis et al., J. Electrochem. Soc., Solid State Sci. Technol., 130(6), F. M. Houlihan et al, Macromolcules, 21, 2001 (1988), European Patent Nos. 0290,750, 046,083, 156,535, 271,851 and 0,388,343, U.S. Pat. Nos. 3,901,710 and 4,181, 531, JP-A Nos. 60-198538 and 53-133022, and the like, the sulfone compounds that photodecompose and generate acid such as iminosulfonates described in M. TUNOOKA et al., Polymer Preprints Japan, 35 (8), G. Bemer et al., J. Rad. Curing, 13 (4), W. J. Mijs et al., Coating Technol., 55 (697), 45 (1983), Akzo, H. Adachi et al., Polymer Preprints Japan, 37(3), EP Nos. 0199,672, 84515, 044,115, 618,564, and 0101,122, U.S. Pat. Nos. 4,371,605 and 4,431,774, JP-A Nos. 64-18143, 2-245756, and 3-140109, and others; the disulfonated compounds described in JP-A Nos. 61-166544 and 2-71270, and others; and the diazoketosulfone and diazodisulfone compounds described in JP-A Nos. 3-103854, 3-103856, and 4-210960 and others.

Furthermore, compounds in which these groups or compounds that generate an acid upon irradiation with light are introduced into the main chain or side chain of polymers, for example, the compounds described in M. E. Woodhouse et al, J. Am. Chem. Soc., 104, 5586 (1982), S. P. Pappas et al, J. Imaging Sci., 30 (5), 218 (1986), S. Kondo et al, Makromol. Chem., Rapid Commun., 9, 625 (1988), Y. Yamada et al, Makromol. Chem., 152, 153, 163 (1972), J. V. Crivello et al, J. Polymer Sci., Polymer Chem. Ed., 17, 3845 (1979), U.S. Pat. No. 3,849,137, German Patent No. 3,914,407, JP-A Nos. 63-26653, 55-164824, 62-69263, 63-146038, 63-163452, 62-153853 and 63-146029, and the like may be used. Examples thereof may include onium salts such as diazonium salts, ammonium salts, phosphonium salts, iodonium salts, sulfonium salts, selenonium salts and arsonium salt, organic halogen compounds, organic metal/organic halides, polymerization initiators having an o-nitrobenzyl type protective group, compounds that generate sulfonic acid by photodegredation such as iminosulfonate, disulfone compounds, diazoketosulfone compounds and diazodisulfone compounds.

Furthermore, the compounds that generate an acid by light as described in V. N. R. Pillai, Synthesis, (1), 1 (1980), A. Abad et al, Tetrahedron Lett., (47) 4555 (1971), D. H. R. Barton et al, J. Chem. Soc., (C), 329 (1970), U.S. Pat. No. 3,779,778, European Patent No. 126,712, and the like.

Examples of the preferable compounds that may be used as a polymerization initiator in the invention may include the compounds represented by the following formulas (b1), (b2) and (b3).

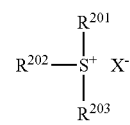

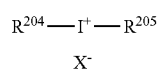

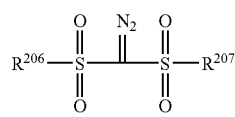

In the above-mentioned formulas (b1) to (b3), $R^{201}$, $R^{202}$ and $R^{203}$ are each independently an organic group, and $R^{204}$, $R^{205}$, $R^{206}$ and $R^{207}$ are each independently an aryl group, an alkyl group or a cycloalkyl group.

$X^-$ is a non-nucleophilic anion, and preferable examples include sulfonic acid anion, carboxylic acid anion, bis(alkylsulfonyl)amide anion, tris(alkylsulfonyl)methide anion, $BF_4^-$, $PF_6^-$, $SbF_6^-$ and the groups described below, of which organic anions having carbon atoms are preferable.

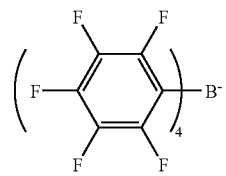

Examples of preferable organic anion include the organic anions shown by the following formulas.

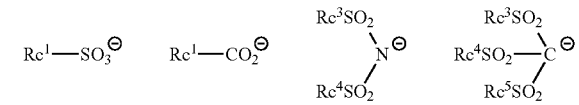

$Rc^1$ represents an organic group.

The organic group of $Rc^1$ is, for example, a group having 1 to 30 carbon atoms, and preferably an alkyl group, a cycloalkyl group, an aryl group, or a group wherein two or more of these groups are bound to each other via a connecting group such as single bond, —O—, —$CO_2$—, —S—, —$SO_3$—, or —$SO_2N(Rd^1)$-.

$Rd^1$ represents a hydrogen atom or an alkyl group. $Rc^3$, $Rc^4$, and $Rc^5$ each independently represent an organic group.

The organic group of $Rc^3$, $Rc^4$, or $Rc^5$ is preferably the same as the organic group favorable as $Rc^1$ and particularly preferably a perfluoroalkyl group having 1 to 4 carbon atoms.

$Rc^3$ and $Rc^4$ may bind to each other, forming a ring.

The group formed by binding between $Rc^3$ and $Rc^4$ is, for example, an alkylene group or an arylene group, but preferably a perfluoroalkylene group having 2 to 4 carbon atoms.

The organic group of $Rc^1$ or $Rc^3$ to $Rc^5$ is most preferably an alkyl group of which the hydrogen at 1 position is replaced with a fluorine atom or a fluoroalkyl group or a phenyl group substituted with a fluorine atom or a fluoroalkyl group. Presence of a fluorine atom or a fluoroalkyl group is effective in increasing the acidity of the acid generated by photoirradiation and improving the sensitivity.

The organic group of $R^{201}$, $R^{202}$ or $R^{203}$ is generally a group having 1 to 30 carbon atoms, preferably 1 to 20 carbon atoms, and two groups of $R^{201}$ to $R^{203}$ may bind to each other, forming a ring structure, which may contain an oxygen or sulfur atom or an ester, amide or carbonyl group. The group formed by binding between two groups of $R^{201}$ to $R^{203}$ is, for example, an alkylene group (e.g., butylene or pentylene).

Specific example of the organic groups of $R^{201}$, $R^{202}$ and $R^{203}$ include the groups corresponding to the compounds (b1-1), (b1-2), and (b1-3) described below.

The photo acid generating agent may be a compound having multiple groups in the structure represented by the formula (b1). For example, it may be a compound having a structure wherein at least one of $R^{201}$ to $R^{203}$ in the compound represented by the formula (b1) is bound, directly or via a connecting group, to at least one of $R^{201}$ to $R^{203}$ in the other compound represented by the formula (b1).

Still more preferable components (b1) include the compounds (b1-1), (b1-2), and (b1-3) described below.

The compound (b1-1) is an arylsulfonium compound wherein at least one of $R^{201}$ to $R^{203}$ in formula (b1) is an aryl group, i.e., a compound having an arylsulfonium ion as its cation.

All of $R^{201}$ to $R^{203}$ in the arylsulfonium compound may be aryl groups; or alternatively, one or two of $R^{201}$ to $R^{203}$ may be aryl groups and the other is an alkyl or cycloalkyl group.

Examples of the arylsulfonium compounds include triarylsulfonium compounds, diarylalkylsulfonium compounds, aryldialkylsulfonium compounds, diarylcycloalkylsulfonium compounds, aryldicycloalkylsulfonium compounds, and the like.

The aryl group in the arylsulfonium compounds is preferably an aryl group such as phenyl or naphthyl, or a heteroaryl group such as indole or pyrrole, and more preferably a phenyl or indole residue. When the arylsulfonium compound has two or more aryl groups, the two or more aryl groups may be the same as or different from each other.

The alkyl group that the arylsulfonium compound may have as needed is preferably a linear or branched alkyl group having 1 to 15 carbons, and examples thereof include methyl, ethyl, propyl, n-butyl, sec-butyl, and t-butyl groups and the like.

The cycloalkyl group that the arylsulfonium compound may have as needed is preferably a cycloalkyl group having 3 to 15 carbons, and examples thereof include cyclopropyl, cyclobutyl, and cyclohexyl groups, and the like.

The aryl, alkyl, or cycloalkyl group of $R^{201}$ to $R^{203}$ may have an alkyl group (e.g., that having 1 to 15 carbon atoms), a cycloalkyl group (e.g., that having 3 to 15 carbon atoms), an aryl group (e.g., that having 6 to 14 carbon atoms), an alkoxy group (e.g., that having 1 to 15 carbon atoms), a halogen atom, a hydroxyl group, or a phenylthio group as the substituent group. Preferable examples of the substituent groups include linear or branched alkyl groups having 1 to 12 carbons, cycloalkyl groups having 3 to 12 carbons, and linear, branched or cyclic alkoxy groups having 1 to 12 carbons; and most preferable are alkyl groups having 1 to 4 carbons and alkoxy groups having 1 to 4 carbons. All or any one of the three $R^{201}$ to $R^{203}$ may have a substituent group. In addition, when any one of $R^{201}$ to $R^{203}$ is an aryl group, the substituent group is preferably substituted at the p-position in the aryl group.

Hereinafter, the compound (b1-2) will be described.

The compound (b1-2) is a compound represented by the formula (b1), wherein $R^{201}$ to $R^{203}$ each independently represent a non-aromatic ring-containing organic group. The aromatic rings include aromatic rings containing a heteroatom.

The non-aromatic ring-containing organic group of $R^{201}$ to $R^{203}$ generally has 1 to 30 carbon atoms and preferably 1 to 20 carbon atoms.

$R^{201}$ to $R^{203}$ each independently, preferably represent an alkyl, cycloalkyl, allyl, or vinyl group, more preferably a linear, branched, or cyclic 2-oxoalkyl group or an alkoxycarbonylmethyl group, and particularly preferably a linear or branched 2-oxoalkyl group.

The alkyl group of $R^{201}$ to $R^{203}$ may be a straight-chain or branched group, and is preferably, for example, a straight-chain or branched alkyl group having 1 to 10 carbon atoms (such as methyl, ethyl, propyl, butyl, or pentyl), and a straight-chain, branched 2-oxoalkyl group and an alkoxycarbonylmethyl group are more preferable.

The cycloalkyl group of $R^{201}$ to $R^{203}$ is preferably, for example, a cycloalkyl group having 3 to 10 carbons (e.g., cyclopentyl, cyclohexyl, or norbomyl); and a cyclic 2-oxoalkyl group is more preferable.

Preferable examples of the linear, branched, and cyclic 2-oxoalkyl groups of $R^{201}$ to $R^{203}$ include the alkyl and cycloalkyl groups described above having >C=O at the 2 position.

The alkoxy group in the alkoxycarbonylmethyl group of $R^{201}$ to $R^{203}$ is preferably, for example, an alkoxy group having 1 to 5 carbons (e.g., methoxy, ethoxy, propoxy, butoxy, or pentoxy).

$R^{201}$ to $R^{203}$ may be substituted with a halogen atom, an alkoxy group (e.g., that having 1 to 5 carbon atoms), a hydroxyl group, a cyano group, or a nitro group additionally.

The compound (b1-3) refers to a compound represented by the following the formula (b1-3), which is a compound having a phenacylsulfonium salt structure.

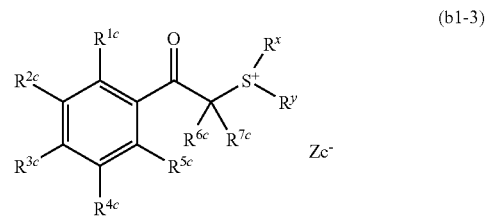

(b1-3)

In formula (b1-3), $R^{1c}$ to $R^{5c}$ each independently represent a hydrogen or an alkyl, cycloalkyl, or alkoxy group.

$R^{6c}$ and $R^{7c}$ each independently represent a hydrogen atom or an alkyl or cycloalkyl group.

$R^x$ and $R^y$ each independently represent an alkyl, cycloalkyl, allyl, or vinyl group. Any two or more of $R^{1c}$ to $R^{5c}$, $R^{6c}$ and $R^{7c}$, or $R^x$ and $R^y$ may bind to each other, forming a ring structure.

$Zc^-$ represents a non-nucleophilic anion, and is the same as the non-nucleophilic anion $X^-$ in formula (b1).

The alkyl group of $R^{1c}$ to $R^{7c}$ may be a straight-chain or branching group, and examples thereof include linear or branched alkyl groups having 1 to 20 carbon atoms, preferably having 1 to 12 carbon atoms, (e.g., methyl, ethyl, linear or branched propyl, linear or branched butyl, and linear or branched pentyl).

The cycloalkyl group of $R^{1c}$ to $R^{7c}$ is preferably, for example, a cycloalkyl group having 3 to 8 carbon atoms (e.g., cyclopentyl or cyclohexyl).

The alkoxy group of $R^{1c}$ to $R^{5c}$ may be a straight-chain, branched, or cyclic group, and examples thereof include alkoxy groups having 1 to 10 carbons, preferably, straight-chain and branched alkoxy groups having 1 to 5 carbons (e.g., methoxy, ethoxy, straight-chain or branched propoxy, straight-chain or branched butoxy, and straight-chain or branched pentoxy groups), and cyclic alkoxy groups having 3 to 8 carbons (e.g., cyclopentyloxy and cyclohexyloxy groups).

Examples of the groups formed by binding of any two or more of $R^{1c}$ to $R^{5c}$, $R^{6c}$ and $R^{7c}$, or $R^x$ and $R^y$ include butylene and pentylene groups and the like. The ring structure may contain an oxygen or sulfur atom or an ester or amide bond.

Preferably, part of the $R^{1c}$ to $R^{5c}$ are linear or branched alkyl groups, cycloalkyl groups, or linear, branched, or cyclic alkoxy groups; and more preferably, the total number of carbons in groups $R^{1c}$ to $R^{5c}$ is 2 to 15. Under such a condition, the acid generator is more soluble in solvent, suppressing generation of particles during storage.

The alkyl and cycloalkyl groups of $R^x$ and $R^y$ include the alkyl and cycloalkyl groups of $R^{1c}$ to $R^{7c}$.

Each of $R^x$ and $R^y$ is preferably a 2-oxoalkyl or alkoxycarbonylmethyl group.

The 2-oxoalkyl group is, for example, the alkyl or cycloalkyl group of $R^{1c}$ to $R^{5c}$ having >C=O group at the 2 position.

Examples of the alkoxy group in the alkoxycarbonylmethyl group are the same as those for the alkyl group of $R^{1c}$ to $R^{5c}$.

Each of $R^x$ and $R^y$ is preferably an alkyl or cycloalkyl group having 4 or more carbon atoms, more preferably the alkyl or cycloalkyl group having 6 or more carbon atoms and still more preferably 8 or more.

In formula (b2) and (b3), $R^{204}$ to $R^{207}$ each independently represent an aryl, alkyl or cycloalkyl group. $X^-$ represents a non-nucleophilic anion, and is the same as the non-nucleophilic anion $X^-$ in formula (b1).

The aryl group of $R^{204}$ to $R^{207}$ is preferably a phenyl or naphthyl group and more preferably a phenyl group.

The alkyl group of $R^{204}$ to $R^{207}$ may be a linear or branched group, and is preferably, for example, a linear or branched alkyl group having 1 to 10 carbons (e.g., methyl, ethyl, propyl, butyl, or pentyl). The cycloalkyl group of $R^{204}$ to $R^{207}$ is preferably, for example, a cycloalkyl group having 3 to 10 carbons (e.g., cyclopentyl, cyclohexyl, or norbornyl).

Examples of the substituent groups that $R^{204}$ to $R^{207}$ may have include alkyl groups (e.g., those having 1 to 15 carbon atoms), cycloalkyl groups (e.g., those having 3 to 15 carbon atoms), aryl groups (e.g., those having 6 to 15 carbon atoms), alkoxy groups (e.g., those having 1 to 15 carbon atoms), halogen atoms, a hydroxyl group, a phenylthio group, and the like.

Other usable examples of the compounds that generates acid by irradiation of activated light or radiation ray include the compounds represented by the following formulae (b4), (b5), and (b6).

$$Ar^3-SO_2-SO_2-Ar^3 \qquad (b4)$$

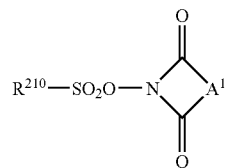
(b5)

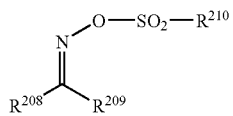
(b6)

In the formulas (b4) to (b6), $Ar^3$ and $Ar^4$ are each independently an aryl group.

$R^{208}$, $R^{209}$ and $R^{210}$ are each independently an alkyl group having 1 to 16 carbon atoms, a cycloalkyl group or an aryl group.

$A^1$ is an alkylene group, an alkenylene group or an arylene group.

Preferable examples of the compounds that generate an acid upon irradiation with radiation ray may include the compounds represented by the formulas (b1) to (b3). Among these compounds, a compound having a sulfonium salt structure is preferable, a compound having a triarylsulfonium salt structure is more preferable, and a compound having a tri(chlorophenyl)sulfonium salt structure is particularly preferable. Examples of the polymerization initiator having a tri(chlorophenyl)sulfonium salt structure include the compound examples (b-37) to (b-40) listed below as preferable compound examples of the polymerization initiator.

Hereinafter the preferable compound examples of the polymerization initiator (compound that generates an acid upon irradiation with radiation ray) that may be used in the invention are exemplified, but the invention is not limited by the examples.

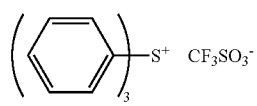
(b-1)

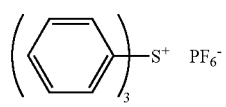
(b-2)

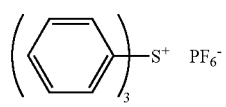
(b-3)

(b-4)

(b-5)

(b-6)

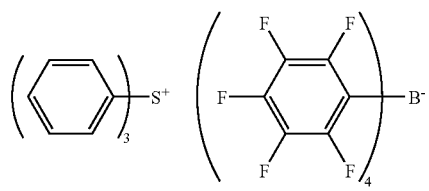
(b-7)

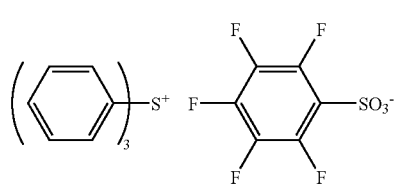
(b-8)

-continued
(b-9)
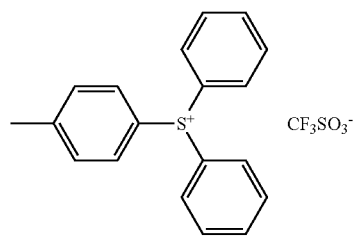
(b-10)
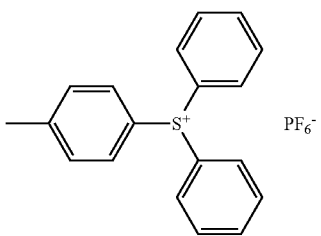
(b-11)
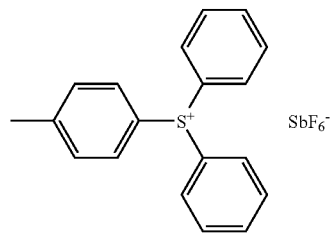
(b-12)
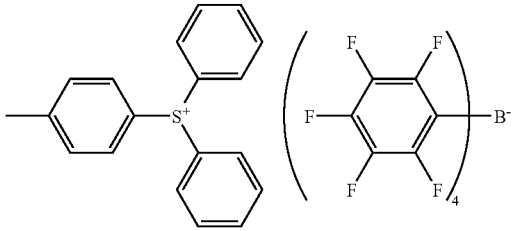
(b-13)
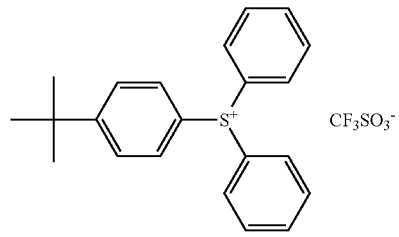
(b-14)
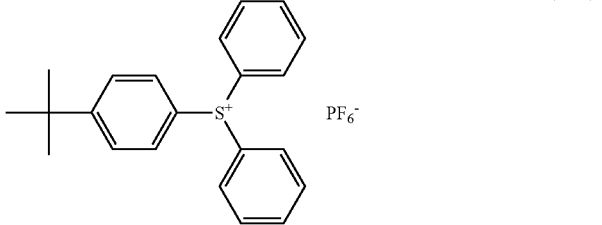
(b-15)
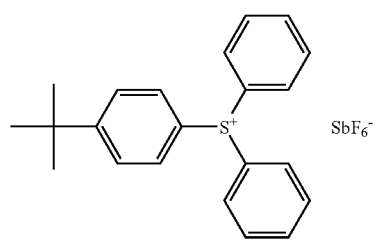
(b-16)
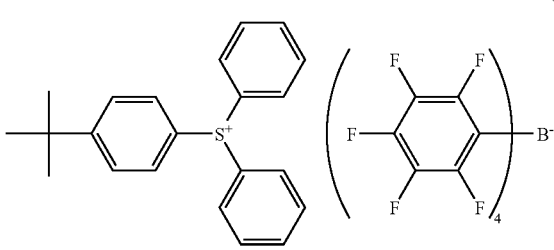
(b-17)
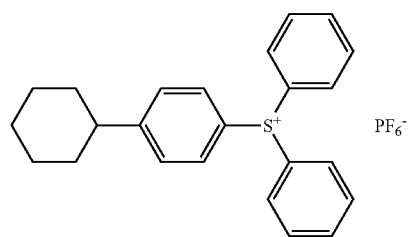
(b-18)
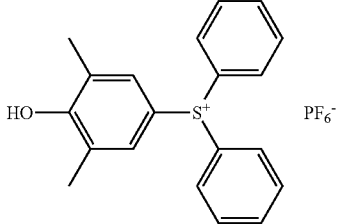
(b-19)
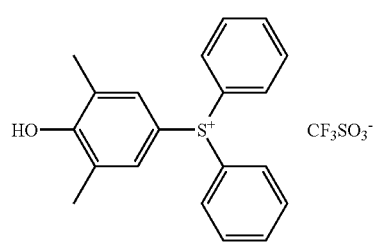
(b-20)
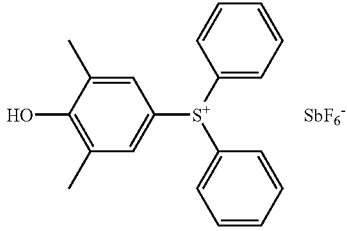

-continued
(b-21)
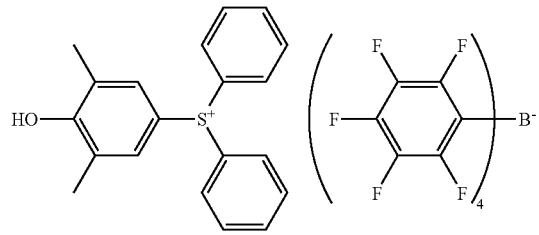
(b-22)
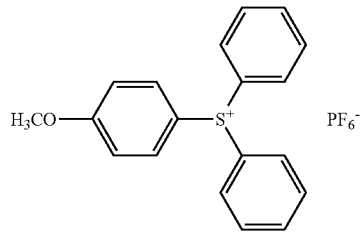
(b-23)
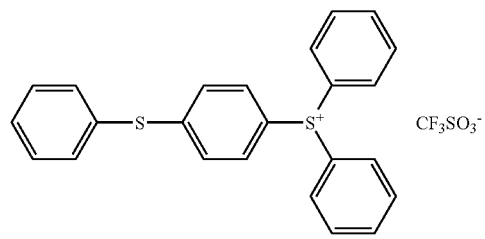
(b-24)
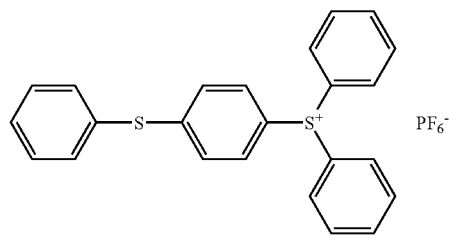
(b-25)
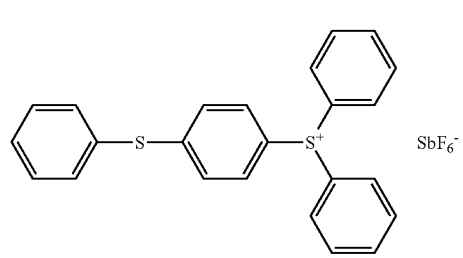
(b-26)
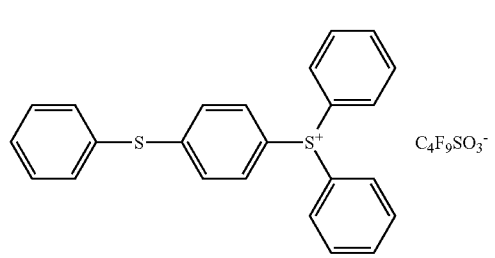
(b-27)
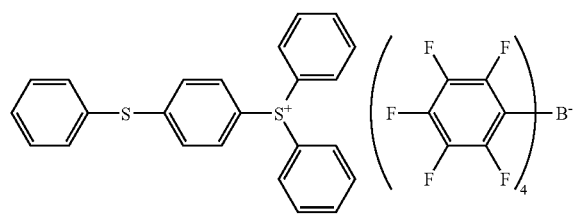
(b-28)
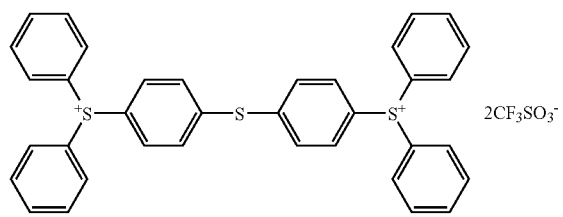
(b-29)
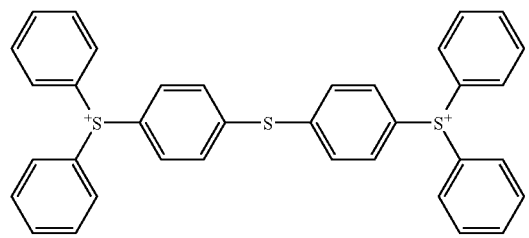
(b-30)
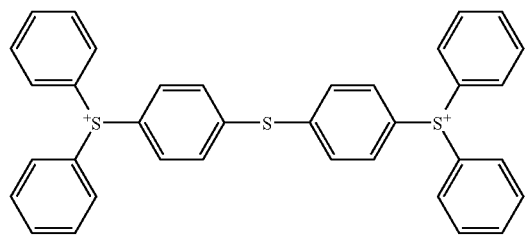
(b-31)
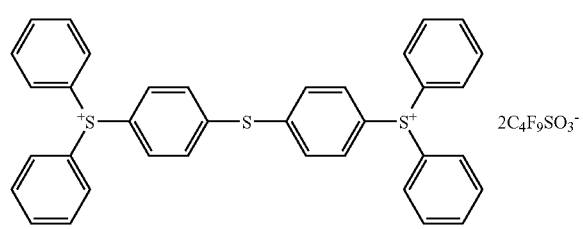

-continued
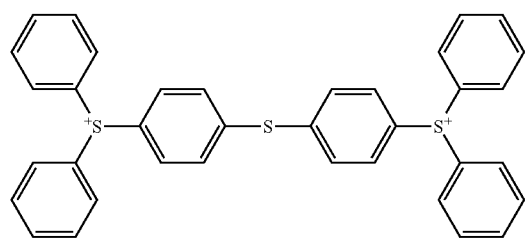
(b-32)
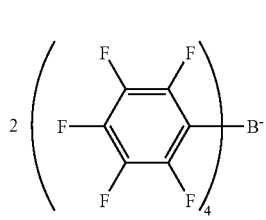
(b-33)
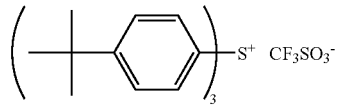
(b-34)
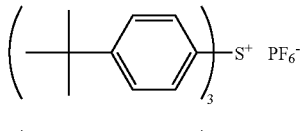
(b-35)
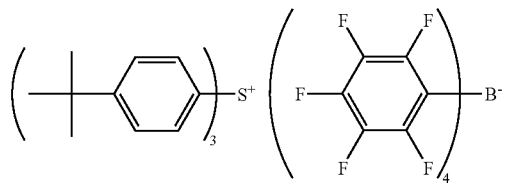
(b-36)
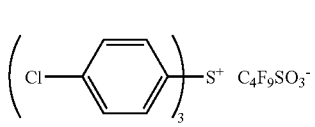
(b-37)
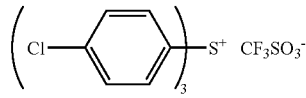
(b-38)
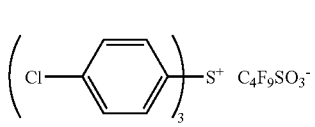
(b-39)
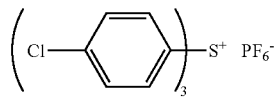
(b-40)
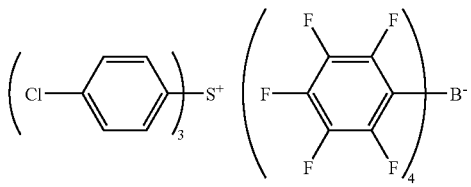
(b-41)
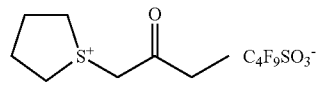
(b-42)
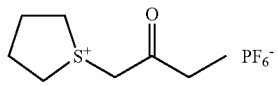
(b-43)
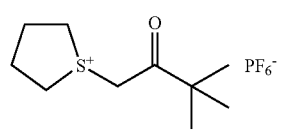
(b-44)
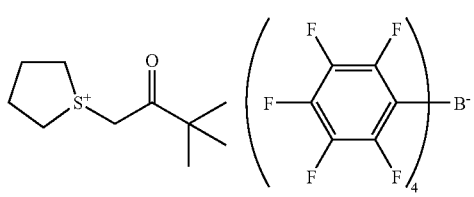
(b-45)
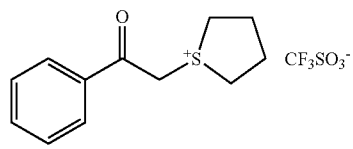
(b-46)
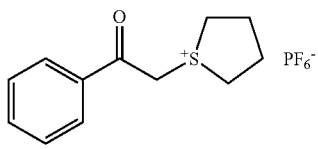
(b-47)
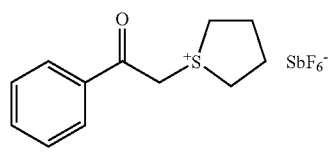
(b-48)
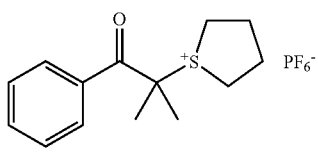
(b-49)
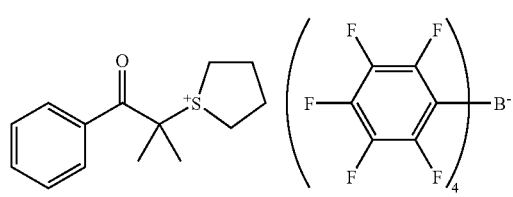
(b-50)
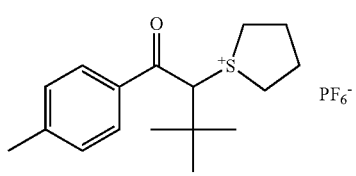

-continued
(b-51) 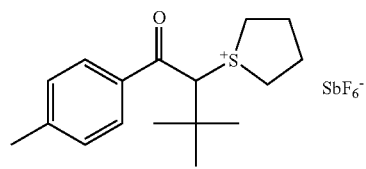 SbF$_6^-$
(b-52) 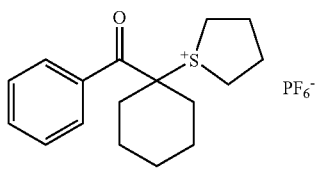 PF$_6^-$
(b-53) 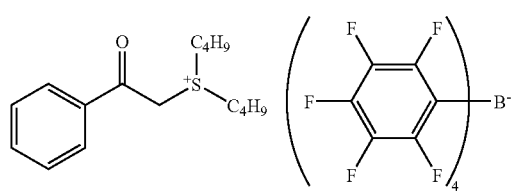
(b-54) 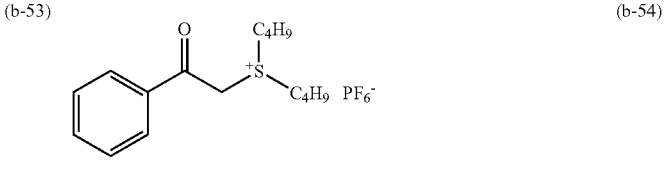 PF$_6^-$
(b-55) 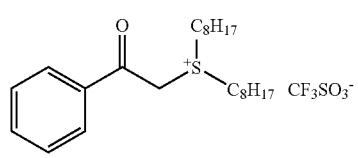 CF$_3$SO$_3^-$
(b-56) 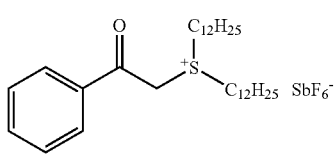 SbF$_6^-$
(b-57) 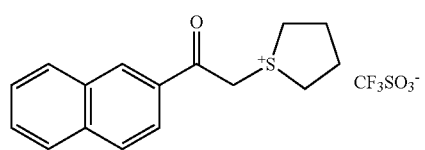 CF$_3$SO$_3^-$
(b-58) 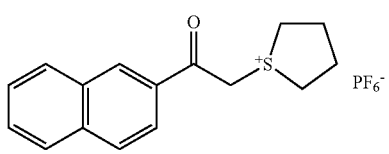 PF$_6^-$
(b-59) 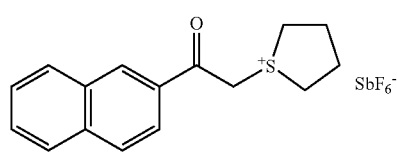 SbF$_6^-$
(b-60) 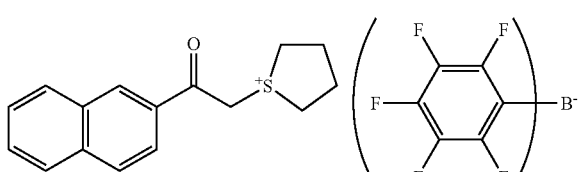
(b-61) 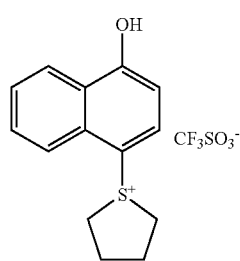 CF$_3$SO$_3^-$
(b-62) 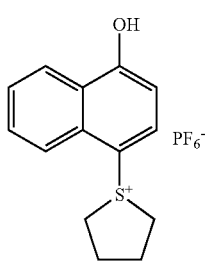 PF$_6^-$
(b-63) 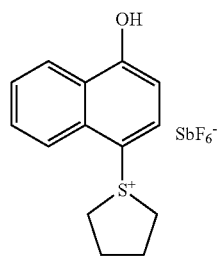 SbF$_6^-$
(b-64) 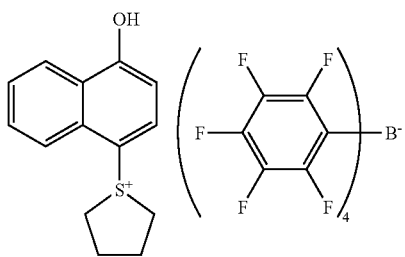
(b-65) 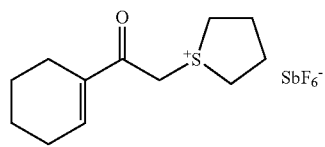 SbF$_6^-$
(b-66) 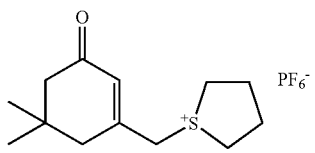 PF$_6^-$ -continued
(b-67)
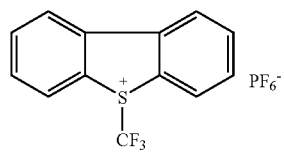
(b-68)
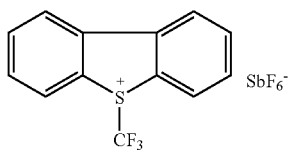
(b-69)
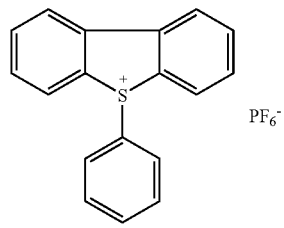
(b-70)
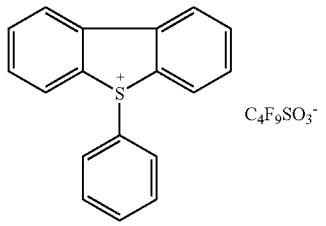
(b-71)
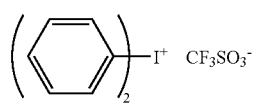
(b-72)
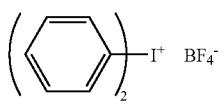
(b-73)
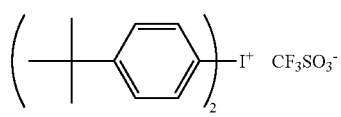
(b-74)
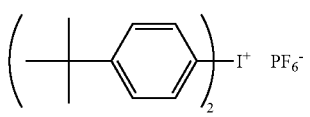
(b-75)
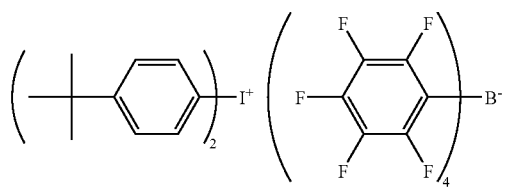
(b-76)
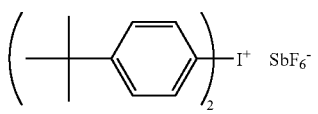
(b-77)
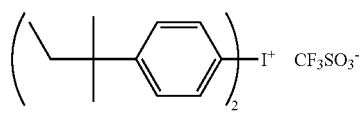
(b-78)
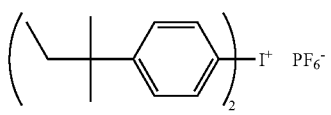
(b-79)
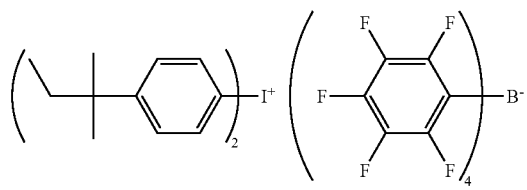
(b-80)
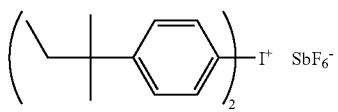
(b-81)
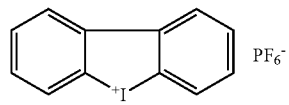
(b-82)
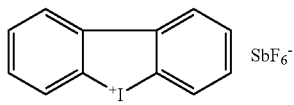
(b-83)
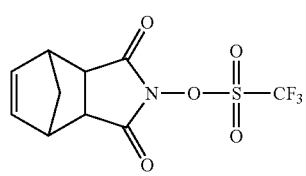
(b-84)
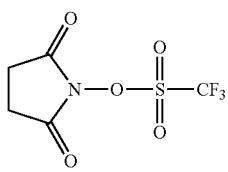
(b-85)
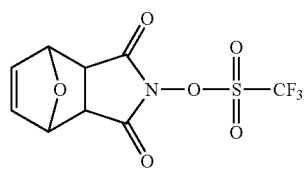
(b-86)
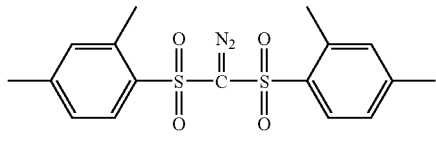

-continued

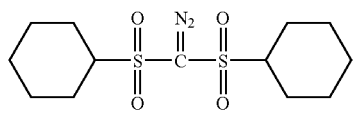
(b-87)

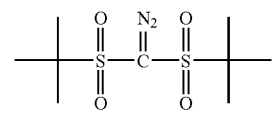
(b-88)

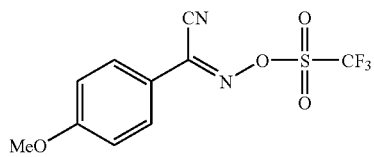
(b-89)

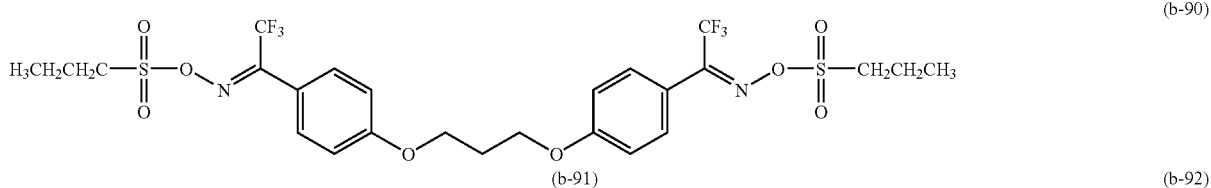
(b-90)

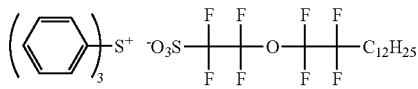
(b-91)

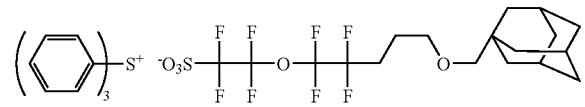
(b-92)

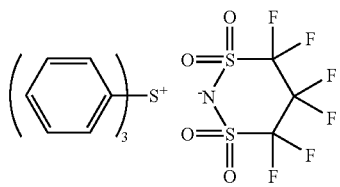
(b-93)

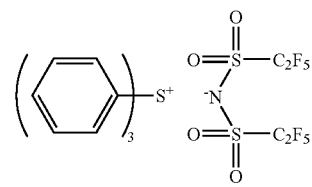
(b-94)

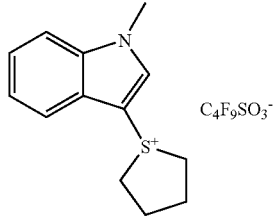
(b-95)

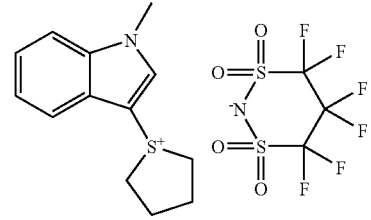
(b-96)

In addition, the oxazole derivatives, s-triazine derivatives and the like described in JP-A No. 2002-122994, paragraph Nos. [0029] to [0030], may also be used favorably.

Further, the onium salt and sulfonate compounds exemplified in JP-A No. 2002-122994, paragraph Nos. [0037] to [0063], may also be used favorably.

—Radical Polymerization Initiator—

Where a radical polymerizable compound is used as the polymerizable compound in the invention, it is preferable to use the following conventionally known radical polymerization initiators as shown below.

By using the compounds, the polymerization reaction of the radical polymerizable compound is occurred by the radical and the like generated from the radical polymerization initiator and the compound is cured.

As the radical polymerization initiator, acetophenone derivatives, benzophenone derivatives, benzyl derivatives, benzoin derivatives, benzoin ether derivatives, benzyldialkylketal derivatives, thioxanthone derivatives, acylphosphine oxide derivatives, metal complexes, p-dialkylaminobenzoic acid, azo compounds, peroxide compounds, and the like are generally known, of which acetophenone derivatives, benzyl derivatives, benzoin ether derivatives, benzyldialkylketal derivatives, thioxanthone derivatives and acylphosphine oxide derivatives are preferable, and acetophenone derivatives, benzoin ether derivatives, benzyldialkylketal derivatives and acylphosphine oxide derivatives are particularly preferable.

Examples of the radical polymerization initiator include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler's ketone, benzyl, benzoin, benzoin methyl ether, benzoin isopropyl ether, benzoin n-propyl ether, benzoin isobutyl ether, benzyl dimethyl ketal, 1-hydroxycyclohexyl phenyl ketone, tetramethylthiuram monosulfide, thioxanthone, 2-chlorothioxanthone, 2,4-dimethylthioxanthone, 2,2-dimethylpropioyldiphenylphosphine oxide, 2-methyl-2-ethylhexanoyldiphenylphosphine oxide, 2,6-dimethylbenzoyldiphenylphosphine oxide, 2,6-dimethoxybenzoyldiphenylphosphine oxide, 2,4,6-trimethylbenzoyldiphenylphosphine oxide, bis(2,6-dimethoxybenzoyl)-2,4,4-trimethylpentylphosphine oxide, 2,3,6-trimethylbenzoyldiphenylphosphine oxide, bis(2,3,6-trimethylbenzoly)phenylphosphine oxide, 2,4,6-trimethoxybenzoyldiphenylphosphine oxide, 2,4,6-trichlorobenzoyldiphenylphosphine oxide, 2,4,6-trimethylbenzoylnaphthyl phosphonate, bis(η5-2,4- cyclopentadien-1-yl)-bis(2,6-difluoro-3-(1H-pyrrol-1-yl) phenyl)titanium, p-dimethylaminobenzoic acid, p-diethylaminobenzoic acid, azobisisobutyronitrile, 1,1'-azobis(1-acetoxy-1-phenylethane), benzoin peroxide, di-tert-butyl peroxide, and the like.

Other examples of the radical polymerization initiator may include the photopolymerization initiators described in Kiyomi Kato ed., "Ultraviolet Ray Curing System" (published by Sogo Gijutu Center Co., Ltd, 1989), pp. 65-148, and the like.

These photopolymerization initiators may be used alone or as a combination of two or more kinds, or may be used in combination with the sensitizing agent mentioned below.

Furthermore, it is preferable that the photopolymerization initiator does not decompose by heat up to 80° C. An initiator that decomposes by heat at 80° C. or less is not preferable since it causes a problem of the storage of the products.

The polymerization initiator may be used alone or as a combination of two or more kinds.

The content of the polymerization initiator in the ink composition is preferably from 0.1% by mass to 25% by mass, more preferably from 0.5% by mass to 20% by mass, and further preferably from 1% by mass to 18% by mass, with respect to the total solid content of the ink composition.

<Other Components>

Hereinafter various additives that may be optionally used in the invention are described.

—Ultraviolet Ray Absorbing Agent—

In the invention, an ultraviolet ray absorbing agent may be used in view of improvement of the weather resistance and prevention of color degradation of the obtained cured product.

Examples of the ultraviolet absorber include the benzotriazole compounds described in JP-A Nos. 58-185677, 61-190537, 2-782, 5-197075 and 9-34057; the benzophenone compounds described in JP-A Nos. 46-2784 and 5-194483, and U.S. Pat. No. 3,214,463; the cinnamic acid compounds described in JP-B Nos. 48-30492 and 56-21141, JP-A No. 10-88106, and the like; the triazine compounds described in JP-A Nos. 4-298503, 8-53427, 8-239368 and 10-182621, Japanese National Phase Publication No. 08-5012911, and the like; the compounds described in Research Disclosure No. 24239; the compounds which absorb ultraviolet ray to generate fluorescence such as stilbene compounds and benzoxazole compounds, i.e., so-called fluorescent brightening agents; and the like.

The amount to be added is suitably selected according to the object, and generally about 0.5 to 15 mass % in terms of solid contents.

—Sensitizing Agent—

The sensitizing agent refers to a compound that is not activated solely by irradiation with light but is more effective, where it is used with the polymerization initiator, than the case where the polymerization initiator is solely used. Generally, amines are used. The reason why the curing velocity increases by addition of an amine is that hydrogen is first supplied to the polymerization initiator by an action to withdraw hydrogen and the generated radical is then bonded to an oxygen molecule in the atmosphere to deteriorate the reaction property, whereas the amine acts to capture the oxygen dissolved in the composition.

Specific examples of the sensitizing agent include amine compounds (aliphatic amines, amines comprising aromatic groups, piperidine, reaction products of epoxy resins and amines, triethanolamine triacrylate, and the like), urea compounds (allylthiourea, o-trylthiourea, and the like), sulfur compounds (sodium diethyldithiophosphate, soluble salts of aromatic sulfine acid, and the like), nitrile compounds (N,N-diethyl-p-aminobenzonitrile and the like), phosphorus compounds (tri-n-butylphosphine, sodium diethyldithiophosphide, and the like), nitrogen compounds (Michler's ketone, N-nitrosohydroxylarine derivatives, oxazolidine compounds, tetrahydro-1,3-oxazine compounds, condensates of amines and formaldehyde or acetaldehyde, and the like), chlorine compounds (carbon tetrachloride, hexachloroethane, and the like), and the like.

The amount of the sensitizing agent to be used may be suitably selected according to the selection and combination of the polymerization initiator and sensitizing agent, the kind of the polymerizable compound to be used, and the like. Generally, the amount is preferably from 0 to 10% by mass, more preferably from 0.1 to 10% by mass, and particularly preferably from 0.2 to 5% by mass, with respect to the ink composition.

—Antioxidant—

An antioxidant may be added, for improvement of stability of the ink composition. Examples of the antioxidants include those described in EP Laid-Open Nos. 223739, 309401, 309402, 310551, 310552, and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and others.

The addition amount is decided properly according to applications, but generally, approximately 0.1 to 8 mass % as solid matter.

—Discoloration Inhibitor—

Any one of various organic and metal complex-based discoloration inhibitors may be used in the ink composition according to the invention. Examples of the organic discoloration inhibitor include hydroquinones, alkoxyphenols, dialkoxyphenols, phenols, anilines, amines, indanes, chromanes, alkoxyanilines, heterocyclic rings, and the like. Examples of the metal-complex discoloration inhibitors include nickel complexes, zinc complexes, and the like; and typical examples thereof include the compounds described in the patents cited in Research Disclosure No. 17643 (sections VII-I to J), ibid., No. 15162, ibid., No. 18716 (left column on p. 650), ibid., No. 36544 (p. 527), ibid., No. 307105 (p. 872), and ibid., No. 15162; and the compounds included in the formula of typical compounds and the exemplary compounds described in JP-A No. 62-215272, pp. 127 to 137. The addition amount is decided properly according to applications, but generally, approximately 0.1 to 8 mass % as solid matter.

—Electroconductive Salts—

Electroconductive salts are solid compounds that may improve electroconductivity upon dissolving in the ink composition. Where the ink composition of the invention is used as an ink composition for inkjet recording, it is preferable to add the salt in order to control the ejection property. Although it is preferable to not use the salt substantially in the invention since there is fair amount of concern that the ink composition precipitates during storage, the salt may be added in a suitable amount where the solubility becomes favorable by increasing the solubility of the electroconductive salt or using a liquid component having high solubility in the ink composition. Examples of the electroconductive salts include potassium thiocyanate, lithium nitrate, ammonium thiocyanate, dimethylamine hydrochloride, and the like.

—Solvent—

In order to improve the adhesiveness of the ink composition of the invention with the recording medium, it is also effective to add a trace amount of organic solvent.

Examples of the solvent include ketone solvents such as acetone, methyl ethyl ketone and diethyl ketone; alcohol solvents such as methanol, ethanol, 2-propanol, 1-propanol, 1-butanol and tert-butanol; chlorine solvents such as chloroform and methylene chloride; aromatic solvents such as benzene and toluene; ester solvents such as ethyl acetate, butyl acetate and isopropyl acetate; ether solvents such as diethyl ether, tetrahydrofuran and dioxane; glycol ether solvents such as ethylene glycol monomethyl ether and ethylene glycol dimethyl ether; and the like.

In this case, the effective addition is performed within a range not causing problems such as solvent resistance and VOC. The amount thereof is preferably from 0 to 5% by mass, more preferably from 0 to 3% by mass, with respect to the total ink composition.

—Polymer Compound—

Various polymer compounds may be added to the ink composition of the invention in order to adjust the physical properties of the film.

Examples of the polymer compound used may include acrylic polymers, polyvinyl butyral resins, polyurethane resins, polyamide resins, polyester resins, epoxy resins, phenol resins, polycarbonate resins, polyvinyl butyral resins, polyvinyl formal resins, shellak, vinyl resins, acrylic resins, rubber resins, waxes, other natural resins, and the like. Two kinds or more of these resins may be used in combination. Among these, preferred are vinyl copolymers obtained by copolymerization of acrylic monomers. Furthermore, copolymers including "carboxyl group-containing monomer", "alkyl methacrylate ester", or "alkyl acrylate ester" as a structural unit may also be preferably be used as a copolymer composition for the polymer binding material.

—Surfactant—

A surfactant may be added to the ink composition according to the invention.

The surfactants include those described in JP-A Nos. 62-173463 and 62-183457. Examples thereof include anionic surfactants such as dialkylsulfosuccinic acid salts, alkylnaphthalenesulfonic acid salts, and fatty acid salts; nonionic surfactants such as polyoxyethylene alkylethers, polyoxyethylene alkylallylethers, acetylene glycol, and polyoxyethylene-polyoxypropylene block copolymers; cationic surfactants such as alkylamine salts and quaternary ammonium salts; and the like. An organic fluorocompound may be used instead of the surfactant. The organic fluorocompound is preferably hydrophobic. Examples of the organic fluorocompounds include fluorochemical surfactants, oily fluorochemical compounds (e.g., fluorine oil) and solid fluorochemical compound resins (e.g., tetraethylenefluoride resin); and typical examples thereof include those described in JP-B No. 57-9053 (Columns 8 to 17) and JP-A No. 62-135826.

—Storage Stabilizing Agent—

The ink composition of the invention may further comprise a storage stabilizing agent.

The storage stabilizing agent is an agent which suppresses undesirable polymerization during storage and dissolves in ink. Examples thereof include quaternary ammonium salts, hydroxyamines, cyclic amides, nitrites, substituted ureas, heterocycle compounds, organic acids, hydroquinone, hydroquinone monoethers, organic phosphines, and copper compounds. Specific examples thereof include benzyltrimethylammonium chloride, diethylhydroxylamine, benzothiazole, 4-amino-2,2,6,6-tetramethylpiperidine, citric acid, hydroquinone monomethyl ether, hydroquinone monobutyl ether, copper naphthenate, and the like.

Although it is preferable that the amount of the stabilizing agent to be used is suitably adjusted based on the activity of the polymerization initiator, the ability for polymerizing of the polymerizable compound and the kind of the storage stabilizing agent, the amount is preferably from 0.005 to 1% by mass, more preferably from 0.01 to 0.5% by mass, further preferably from 0.01 to 0.2% by mass in the ink composition. Where the amount to be added is small, the storage stability is decreased, whereas where the amount to be added is large, curing is difficult to occur.

In addition, where necessary, pH adjusting agents, leveling additives, matting agents, antifoaming agents, waxes for adjusting the physical property of the films, tackifiers that do not interfere polymerization so as to improve the adhesiveness to a recording media such as polyolefin and PET, and the like may be incorporated.

Specific examples of the tackifier include high molecular weight tacky polymers described on p. 5 and 6 of JP-A-2001-49200 (e.g. a copolymer formed from an ester of (meth)acrylic acid and an alcohol having an alkyl group having 1 to 20 carbon atoms, an ester of (meth)acrylic acid and an alicyclic alcohol having 3 to 14 carbon atoms, or an ester of (meth)acrylic acid and an aromatic alcohol having 6 to 14 carbon atoms), and a low molecular weight tackifying resin having a polymerizable unsaturated bond.

Although the ink composition of the invention uses the pigment and the oil-soluble dye (the particular dye) as coloring components, it is not necessary to consider deterioration of the dispersing property due to use of the pigment, and a larger amount of dye may be incorporated into the ink composition. Furthermore, since the particular dye has a high light fastness, the ink comprising the particular dye has a favorable color tone and a high light fastness.

In the invention, the pigment and oil-soluble dye having the same color, more specifically, the pigment and oil-soluble dye having the colors in which one range of the $L^*a^*b^*$ values is encompassed in the other range of the $L^*a^*b^*$ values, are used so that the color tone may be favorably adjusted and the density may be improved. The invention is useful for the application using cyan, magenta and yellow.

The ink composition of the invention cures upon irradiation with radiation ray such as ultraviolet ray, and may yield developed colors having an excellent strength, a high light fastness, a low film thickness and high vividness. Therefore, the ink composition of the invention may be applied to various usages including ink compositions for image forming, formation of ink receiving layers (image portions) in planographic printing, coating materials, sealing materials, elastomers, and the like.

Among these usages, it is preferable that the composition of the invention is used as an ink composition since the obtained cured product is excellent in color developing property and light fastness.

The ink composition of the invention may form images by applying it to known recording methods (printing methods), printing devices, and the like. Although the viscosity of the ink composition of the invention during image formation is suitably determined in accordance with the recording method and recording device to be used, generally, the viscosity is preferably from 5 to 100 mPa·s, more preferably from 10 to 80 mPa·s. The surface tension is preferably from 20 to 60 mN/m, more preferably from 30 to 50 mN/m.

Specifically, it is preferable that the ink composition of the invention is used as an ink for inkjet recording since the composition cures at a high sensitivity upon irradiation with radiation ray, and the obtained cured product is excellent in color developing property and light fastness and may provide images having high image quality. As such, where the ink composition of the invention is used as an ink for inkjet recording, recording is performed by ejecting the ink composition on a recording medium using an inkjet printer, and curing the ejected ink composition by irradiating with radiation ray.

When the ink composition according to the invention is used as inkjet recording ink, the viscosity of the inkjet recording ink is preferably 7 to 30 cm Pa·s, more preferably 7 to 20 mPa·s, at the ejection temperature (for example, 40 to 80° C., preferably 25 to 30° C.), from the point of ejection efficiency. The viscosity of the ink composition according to the invention at room temperature (25 to 30° C.) is preferably, for example, 35 to 500 mPa·s, more preferably 35 to 200 mPa·s. It is preferably to adjust the composition suitably so as to make the ink composition according to the invention have a viscosity in the range above. By increasing the viscosity at room temperature, it becomes possible to prevent penetration of the ink into a recording medium even when a porous recording medium is used, and reduce the amounts of unhardened monomer and odor. Favorably, it is also possible to suppress ink bleeding when the ink droplet is ejected and consequently improve the image quality.

Where the ink composition of the invention is used as a composition for an ink for inkjet recording, the surface tension of the composition is preferably 20 to 30 mN/m, and more preferably 23 to 28 mN/m. Where recording is performed on various types of recording medium such as polyolefin, PET, coated paper and uncoated paper, it is preferably 20 mN/m or more in view of bleeding and penetration, and it is preferably not more than 35 mN/m in view of wettability.

<Inkjet Recording Method>

The inkjet recording method to which the ink composition of the invention is suitably applied will be described below.

The inkjet recording method of the invention includes the following two steps, namely, the step of ejecting the ink composition of the invention onto a recording medium (support, recording material, or the like) using an inkjet recording apparatus and the step of curing the ejected ink composition by irradiation with active radiation. After these steps, images are formed onto the recording medium with the cured ink composition.

The recording medium to which the ink composition of the invention may be applied is not specifically limited, and paper such as normal uncoated paper and coated paper, various non-absorbable resin materials used for so-called soft packaging, or a resin film thereof formed into a film shape may be used. Examples of various plastic films include PET films, OPS films, OPP films, ONy films, PVC films, PE films and TAC films. Other plastics that may be used as materials for the recording medium include polycarbonate, acrylic resins, ABS, polyacetal, PVA, rubbers, and the like. Moreover, metals or glasses may be used as the recording medium.

Furthermore, examples of the recording medium that is applicable in the invention also include supports for planographic printing plates.

These recording media may be applied to not only inkjet recording method but also to any printing method.

Examples of the active radiation applicable in the inkjet recording method of the invention include α-ray, γ-ray, X-ray, ultraviolet ray, visible ray, infrared ray, electron beam, and the like. The peak wavelength of the active radiation is preferably from 200 to 600 nm, more preferably from 300 to 450 nm, and further preferably from 350 to 420 nm. Furthermore, the output of the active radiation is preferably 2,000 mJ/cm$^2$ or less, more preferably from 10 to 2,000 mJ/cm$^2$, further preferably from 20 to 1,000 mJ/cm$^2$, and particularly preferably from 50 to 800 mJ/cm$^2$.

In particular, in the inkjet recording method of the invention, radiation is preferably irradiated from a light-emitting diode that generates ultraviolet ray where an emission peak wavelength is from 350 to 420 mm and a maximum illuminance on the surface of the recording medium is from 10 to 2,000 mW/cm$^2$.

(Inkjet Recording Device)

The inkjet recording device that may be applied to the inkjet recording method of the invention is not specifically limited, and commercial inkjet recording devices may be used.

Examples of the inkjet recording device include those equipped with an ink supply system, a temperature sensor, and a radiation ray source that may irradiate radiation ray as mentioned above.

Examples of the ink supply system include those comprising a source tank including the ink composition of the invention, a supply pipe, an ink supply tank located just before the inkjet head, a filter and a piezoelectric inkjet head. The piezoelectric inkjet head may be driven so that a multi-size dot of from 1 pl to 100 pl, preferably from 8 pl to 30 pl may be emitted at a resolution of from 320 dpi×320 dpi to 4000 dpi×4000 dpi, preferably from 400 dpi×400 dpi to 1600 dpi× 1600 dpi, more preferably 720 dpi×720 dpi. In this invention, "dpi" means the number of dots per inch, that is, 2.54 cm.

In a radiation ray-curable ink such as the ink composition of the invention, it is preferable that the area from the ink supply tank to the inkjet head portion may be heat-insulated and warmed since it is desirable to keep the ejected ink at a constant temperature. Although the method for controlling temperature is not specifically limited, it is preferable, for example, to provide a plurality of temperature sensors at each of the piping sections to control heating according to the flow amount of the ink and the ambient temperature. The temperature sensors may be provided around the ink supply tank and the nozzle of the inkjet head. Furthermore, it is preferable that the head unit to be heated is thermally blocked or insulated so that the main body of the device is not affected by the external temperature. In order to shorten the start-up time of the printer required for heating, or decrease heat energy loss, it is preferable to insulate from other sections and decrease the heat capacity of the whole heating unit.

Although the pigment and the oil-soluble dye (the particular dye) are used in the ink of the invention as coloring components, it is not necessary to consider the deterioration of the dispersing property due to use of the pigment, and a larger amount of dye may be incorporated into the ink. Furthermore, since the particular dye has a high light fastness, the ink comprising the particular dye has a favorable color tone and a high light fastness.

In the invention, the pigment and oil-soluble dye having the same color, more specifically the pigment and oil-soluble dye having the colors wherein one range of the L*a*b* values is encompassed in the other range of the L*a*b* values, are used so that the color tone may be favorably adjusted and the density may be improved. The invention is useful for the application using cyan, magenta and yellow.

The ink composition of the invention cures upon irradiation with radiation ray such as ultraviolet ray, and may yield developed colors having an excellent strength, a high light fastness, a low film thickness and a high vividness. Therefore, the ink composition of the invention may be applied to various usages including ink compositions for image forming, formation of ink receiving layers (image portions) in planographic printing, coating materials, sealing materials, elastomers, and the like.

Among these usages, it is preferable that the composition of the invention is used as an ink composition for image forming since the obtained cured product is excellent in color developing property and light fastness.

EXAMPLES

Hereinafter the invention is described with referring to Examples, but the invention is not limited thereto unless the invention departs from its purport. In the following Examples, the "part" refers to "parts by mass" unless otherwise specified.

Example 1-1

—Preparation of Ink 1-1—

The components of the following Composition 1-1 were stirred in a high-speed water-cooling type stirrer to give a yellow UV ink for inkjet recording (Ink 1-1).

| (Yellow Ink 1-1) Composition 1-1 | |
|---|---|
| KAYARAD HDDA [trade name, an acrylate monomer; 1,6-hexanediol diacrylate (a bifunctional acrylate), manufactured by Nippon Kayaku Co., Ltd.] | 32.00 parts |
| Firstcure ST-1 [trade name, a polymerization inhibitor, manufactured by ChemFirst, Inc.] | 0.30 parts |
| Ebecryl 657 [trade name, manufactured by DAICEL-CYTEC Co., Ltd.] | 9.72 parts |
| Rapi-Cure DVE-3 (trade name, a vinyl ether, manufactured by ISP Europe) | 12.30 parts |
| Irgacure 184 (trade name, a photopolymerization initiator, manufactured by Ciba Specialty Chemicals, Inc.) | 2.48 parts |
| Lucirin TPO (trade name, a photopolymerization initiator, manufactured by BASF) | 5.98 parts |
| Benzophenone (a photopolymerization initiator) | 2.81 parts |
| Byk 307 (trade name, an antifoaming agent, manufactured by BYK Chemie) | 0.10 parts |
| Disperbyk 168 [trade name, manufactured by BYK Chemie] | 3.49 parts |
| DPGDA [dipropylene glycol diacrylate] | 26.82 parts |
| Particular oil-soluble dye [the exemplified dye DYE-A4] | 1.00 parts |
| Novoperm Yellow H2G [trade name, a pigment, Pigment yellow 120] | 3.00 parts |

Printing was performed by using the thus-produced Yellow Ink 1-1 on a sheet made of PET, and the ink was cured by irradiating by passing the sheet under the ray from an iron-doped UV ray lamp (power: 120 W/cm) at the velocity of 40 m/min to form a printed product.

(Evaluation of Ink)

The ejection stability and storage stability of Ink 1-1 (a light curable composition) obtained as above were evaluated as follows.

Furthermore, the curing property and light resistance of the printed product obtained as above were evaluated as follows.

(Curing Property)

The curing property was evaluated by touching the cured image portion of the printed product printed by Ink 1-1. The exposed applied film was evaluated based on the following criteria; not tacky: A (fine); slightly tacky but the object contacted with the film was not contaminated: B (acceptable); significantly tacky: C (not favorable).

(Light Resistance)

The image portion of the printed product obtained as above was irradiated with xenon ray (140000 1x) for 14 days using a weather meter (trade name: Atlas C. I 65). The image densitys before and after irradiation of xenon were measured using a reflective density meter (trade name: X-Rite 310TR) and the residual ratio of the dye was evaluated.

The evaluation indexes are as follows.

A: Light resistance was favorable (the residual ratio of the dye>80%).

B: Light resistance was acceptable (the residual ratio of the dye was from 40 to 80%).

C: Light resistance was not favorable (the residual ratio of the dye<40%).

(Ejection Stability)

The ink obtained as above was continuously ejected over 30 minutes, and the defect due to nozzle clogging (presence or absence of unprinted portion) and the presence or absence of favorable dots (satellites) around the printed dots were visually evaluated.

The evaluation index is as follows.

A: nozzle defects and satellites were not generated.

B: nozzle defects or satellites were slightly generated.

C: nozzle defects or satellites were significantly generated.

(Storage Stability)

The ink obtained as above was stored under 75% RH at 60° C. for 3 days. The ink viscosity at the ejection temperature was measured and the increase of the ink viscosity was evaluated as a viscosity ratio (ratio of the viscosity after storage to the viscosity before storage). Where the viscosity is not changed and close to 1.0, the storage stability is favorable, whereas it is not preferable that the viscosity exceeds 1.5 since clogging may occur during ejection.

A: storage stability was favorable (the viscosity ratio was 1 or more and less than 1.2).

B: storage stability was acceptable (the viscosity ratio was 1.2 or more and less than 1.5).

C: storage stability was not favorable (the viscosity ratio was 1.5 or more).

Example 1-2 and Comparative Example 1

<Preparation of Inks 1-2 and 1-3>

Ink compositions were prepared according to a similar manner to the preparation of Ink 1-1, except that the particular oil-soluble dye (exemplified dye DYE-A4) was replaced with the following particular oil-soluble dye, or that only the pigment was used without adding the dye in the preparation of Ink 1-1, and the compositions were evaluated.

Example 1-2

<Ink 1-2>

Ink 1-2 was prepared using the exemplified dye DYE-A6 as the particular oil-soluble dye instead of the exemplified dye DYE-A4.

Comparative Example 1

<Ink 1-3>

Ink 1-3 was prepared using only the pigment without adding the particular oil-soluble dye.

Example 2-1

Preparation of Ink 2-1

The components of the following Composition 2-1 were stirred in a high-speed water-cooling type stirrer to give a magenta UV ink for inkjet recording (Ink 2-1).

| (Magenta ink 2-1) -Composition 2-1- | |
|---|---|
| DPGDA | 21.65 parts |
| KAYARAD HDDA | 35.00 parts |
| [trade name, an acrylate monomer; 1,6-hexanediol diacrylate (a bifunctional acrylate), manufactured by Nippon Kayaku Co., Ltd.] | |
| Firstcure ST-1 | 0.30 parts |
| [trade name, a polymerization inhibitor, manufactured by ChemFirst, Inc.] | |
| Ebecryl 230 [trade name, manufactured by DAICEL-CYTEC Co., Ltd.] | 1.70 parts |
| Rapi-Cure DVE-3 | 9.64 parts |
| [trade name, a vinyl ether, manufactured by ISP Europe] | |
| Irgacure 184 | 3.00 parts |
| [trade name, a photopolymerization initiator, manufactured by Ciba Specialty Chemicals, Inc.] | |
| Lucirin TPO [trade name, a photopolymerization initiator, manufactured by BASF] | 8.50 parts |
| Benzophenone [a photopolymerization initiator] | 4.00 parts |
| Disperbyk 168 [trade name, manufactured by BYK Chemie] | 5.46 parts |
| CN964 A85 (trade name, manufactured by Sartomer Company, Inc.) | 6.80 parts |
| Particular oil-soluble dye [the exemplified dye DYE-D9] | 0.90 parts |
| Cinquasia Magenta RT-355D | 3.00 parts |
| [trade name, a pigment, Pigment Red 42, manufactured by Ciba Specialty Chemicals, Inc.] | |

An ink composition was prepared according to a similar manner to the preparation of the ink 1-1 using the magenta Ink 2-1 produced as above, and evaluated in a similar manner.

Example 2-2 and Comparative Example 2

<Preparations of Inks 2-2 and 2-3>

Ink compositions were prepared according to a similar manner to the preparation of Ink 2-1, except that the particular oil-soluble dye (exemplified dye DYE-A9) was replaced with the following particular oil-soluble dyes, or that only the pigment was used without adding the dye in the preparation of Ink 2-1, and the compositions were evaluated.

Example 2-2

<Ink 2-2>

Ink 1-2 was prepared using the exemplified dye DYE-D16 as the particular oil-soluble dye instead of the exemplified dye DYE-D9.

Comparative Example 2

<Ink 2-3>

Ink 2-3 was prepared using only the pigment, without adding the particular oil-soluble dye.

Example 3-1

Preparation of Ink 3-1

The components of the following Composition 3-1 were stirred in a high-speed water-cooling type stirrer to give a cyan UV ink for inkjet recording (Ink 3-1).

| (Cyan ink 3-1) -Composition 3-1- | |
|---|---|
| DPGDA | 29.00 parts |
| KAYARAD HDDA | 32.00 parts |
| [trade name, an acrylate monomer; 1,6-hexanediol diacrylate (bifunctional acrylate), manufactured by Nippon Kayaku Co., Ltd.] | |
| Firstcure ST-1 | 0.85 parts |
| [trade name, a polymerization inhibitor, manufactured by ChemFirst, Inc.] | |
| Ebecryl 230 [trade name, manufactured by DAICEL-CYTEC Co., Ltd.] | 2.29 parts |
| Rapi-Cure DVE-3 | 9.43 parts |
| (trade name, a vinyl ether, manufactured by ISP Europe) | |
| Irgacure 184 | 1.88 parts |
| (trade name, a photopolymerization initiator, manufactured by Ciba Specialty Chemicals, Inc.) | |
| Lucirin TPO (trade name, a photopolymerization initiator, manufactured by BASF) | 8.01 parts |
| Benzophenone (a photopolymerization initiator) | 2.42 parts |
| Byk 307 (trade name, an antifoaming agent, manufactured by BYK Chemie) | 0.10 parts |
| Solsperse 32000 (trade name, a dispersing agent, manufactured by Noveon, Inc.) | 0.45 parts |
| NPGPODA | 2.70 parts |
| [propoxylated neopentylglycol diacrylate] | |

-continued (Cyan ink 3-1)
-Composition 3-1-

| | |
|---|---|
| CN964 A85 (trade name, manufactured by Sartomer Company) | 9.17 parts |
| Particular oil-soluble dye (the following exemplified dye DYE-V101) | 0.34 parts |
| Irgalite Blue GLVO (trade name, a pigment, Pigment Blue 15:4, manufactured by Ciba Specialty Chemicals, Inc.) | 1.36 parts |

DYE-V101

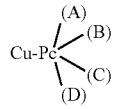

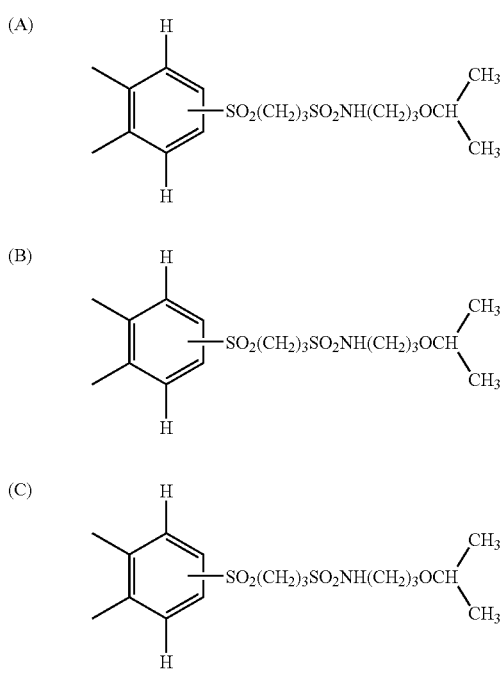

-continued

DYE-V101

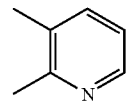

(D)

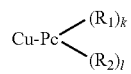

In the table, the specific examples for the groups (A) to (D) are independently in random order, i.e., not in any particular order.

An ink composition was prepared according to a similar manner to the preparation of Ink 1-1 using Cyan Ink 3-1 produced as above, and evaluated in a similar manner.

Example 3-2 and Comparative Example 3

<Preparation of Inks 3-2 and 3-3>

Ink compositions were prepared in to a similar manner to the preparation of Ink 3-1, except that the particular oil-soluble dye (DYE-V101) was replaced with the following particular oil-soluble dye or that only the pigment was used without adding the dye in the preparation of Ink 3-1, and the compositions were evaluated.

Example 3-2

<Ink 3-2>

Ink 3-2 was prepared using the following exemplified dye DYE-VI114 as the particular oil-soluble dye instead of the exemplified dye DYE-V101.

DYE-VI114

$$Cu-Pc\left\langle\begin{array}{c}(R_1)_k\\(R_2)_l\end{array}\right.$$

| k | $R_1$ | l | $R_2$ |
|---|---|---|---|
| 2 | —SO$_2$(CH)$_3$CO$_2$CHCH$_2$OCH$_3$ with CH$_3$ branch | 2 | —SO$_2$NH— (2-Cl, 4-CO$_2$C$_{12}$H$_{25}$(n))-phenyl |

In the table, the order of introduction of the substituents ($R^1$) and ($R^2$) in the β-substituted form is random, ie., not in any particular order.

The values of k and l are average values of the mixing ratio derived from the charging molar ratio of the phthalonitrile derivative used for the synthesis of the phthalonitrile derivative.

Comparative Example 3

<Ink 3-3>

Ink 3-3 was prepared using only the pigment without adding the particular oil-soluble dye.

The evaluation results of Examples 1-1 to 3-2 and Comparative Examples 1 to 3 are summarized in Table 1 below.

The invention includes the following embodiments.

<1> An ink composition comprising a polymerizable compound, a polymerization initiator, a pigment and an oil-soluble dye, wherein the pigment and the oil-soluble dye have L*a*b* values in the same range, and

[1] the absolute value of the difference between the L* value of the pigment and the L* value of the oil-soluble dye is 34 or less,

[2] the absolute value of the difference between the a* value of the pigment and the a* value of the oil-soluble dye is 50 or less, and

[3] the absolute value of the difference between the b* value of the pigment and the b* value of the oil-soluble dye is 50 or less.

TABLE 1

| | | Kind | | Evaluation results | | | | | | |
|---|---|---|---|---|---|---|---|---|---|---|
| | | | Coloring components | | | | Curing | Light | Ejection | Storage |
| | | Evaluation | Pigment | Dye | L* | a* | b* | property | resistance | stability | stability |
| Examples | 1-1 | Ink 1-1 | Novoperm Yellow H2G | DYE-A 4 | 99.11 | −14.33 | 99.06 | A | A | A | A |
| | 1-2 | Ink 1-2 | Novoperm Yellow H2G | DYE-A6 | 96.82 | −16.76 | 104.22 | A | A | A | A |
| | 2-1 | Ink 2-1 | Cinquasia Magenta RT-355D | DYE-D9 | 51.35 | 91.93 | −17.55 | A | A | A | A |
| | 2-2 | Ink 2-2 | Cinquasia Magenta RT-355D | DYE-D16 | 53.89 | 86.77 | −18.04 | A | A | A | A |
| | 3-1 | Ink 3-1 | Irgalite Blue GLVO | DYE-V101 | 51.58 | −34.22 | −45.35 | A | A | A | A |
| | 3-3 | Ink 3-2 | Irgalite Blue GLVO | DYE-VI114 | 53.64 | −36.71 | −48.76 | A | A | A | A |
| Comparative Examples | 1 | Ink 1-3 | Novoperm Yellow H2G | — | 83.05 | −32.01 | 90.42 | A | A | C | A |
| | 2 | Ink 2-3 | Cinquasia Magenta RT-355D | — | 38.24 | 100.26 | −22.6 | A | A | B | B |
| | 3 | Ink 3-3 | Irgalite Blue GLVO | — | 44.09 | −31.59 | −58.6 | A | A | B | A |

In Table 1, the L*a*b* values in Examples are the values obtained from the combinations of the pigments and dyes used in Examples. The L*a*b* values in Comparative Examples are the L*a*b* values of the pigments used in Comparative Examples. As in the above-mentioned Examples, the same color tone may be obtained by using a pigment and a dye having L*a*b* values in the same range.

The L*a*b* values described in Table 1 were measured for the inks used in Examples 1-1 to 3-2 and Comparative Examples 1 to 3 (Inks 1-1 to 3-2 and Inks 1-3 to 3-3) using a reflective densitometer (trade name: X-Rite 310TR, manufactured by X-Rite) and CIE D65 as a standard light source.

As is apparent from the results in Table 1, the problematic ejection stability was significantly improved while similar curing property, light resistance and storage stability were maintained in the inks comprising the compounds represented by the formulas (I) to (VII) (Inks 1-1, 1-2, 2-1, 2-2, 3-1 and 3-2), as compared with the inks using only conventional pigments (Inks 1-3, 2-3 and 3-3).

Furthermore, comparing the L*a*b* values, it is obvious that the performances similar to the above-mentioned performances were maintained while the color tones were improved more preferably.

<2> The ink composition of <1>, wherein the content of the oil-soluble dye is from 0.05% by mass to 10% by mass, with respect to the total amount of the ink composition.

<3> The ink composition of <1>, wherein the content of the oil-soluble dye is from 0.2% by mass to 3% by mass, with respect to the total amount of the ink composition.

<4> The ink composition of <1>, wherein the mass-based content ratio of the pigment to the oil-soluble dye is from 95/5 to 50/50.

<5> The ink composition of <1>, wherein the mass-based content ratio of the pigment to the oil-soluble dye is from 85/15 to 60/40.

<6> The ink composition of <1>, wherein the polymerizable compound is an unsaturated carboxylic acid or a salt thereof.

<7> The ink composition of <1>, wherein the polymerization initiator is a benzophenone derivative.

<8> The ink composition of <1>, wherein the ink composition is a yellow ink composition, and the oil-soluble dye comprises at least one compound selected from the compounds represented by the following formulas (I) to (III), and the composition has the L*a*b* values in which 70≤L*≤104, −40≤a*≤10 and 70≤b*≤120:

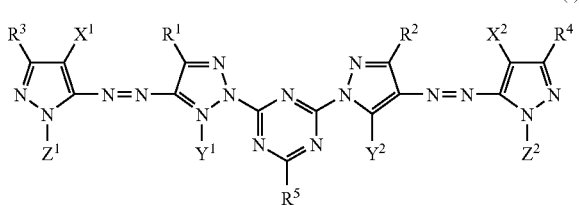

Formula (I)

wherein in the formula (I), $Y^1$, $Y^2$, $Z^1$, $Z^2$ and $R^1$ to $R^5$ are each independently a hydrogen atom or a monovalent substituent; and $X^1$ and $X^2$ are each independently a monovalent electron-withdrawing group having a Hammett's σp value of 0.20 or more;

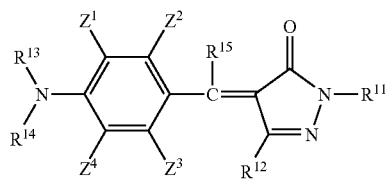

Formula (II)

wherein in the formula (II), $R^{11}$, $R^{13}$ and $R^{14}$ are each independently an unsubstituted or substituted alkyl group, an unsubstituted or substituted aryl group or an unsubstituted or substituted heteroaryl group, and $R^{12}$ and $R^{15}$ are each independently a hydrogen atom or a monovalent substituent, wherein the $R^{13}$ and $R^{14}$ may be linked to each other to form a 5- or 6-membered hetero ring; and $Z^1$, $Z^2$, $Z^3$ and $Z^4$ are each independently a hydrogen atom or a monovalent substituent, wherein $Z^1$ and $Z^2$, and $Z^3$ and $Z^4$ may be linked to each other to form a 5- or 6-membered ring;

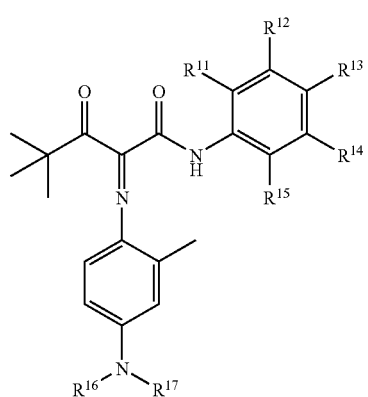

Formula (III)

wherein in the formula (III), $R^{11}$, $R^{12}$, $R^{13}$, $R^{14}$ and $R^{15}$ are each independently a hydrogen atom or a monovalent substituent; and $R^{16}$ and $R^{17}$ are each independently an unsubstituted or substituted alkyl group, an unsubstituted or substituted aryl group or an unsubstituted or substituted heteroaryl group, and may be linked to each other to form a ring.

<9> The ink composition of <8>, wherein the pigment has the L*a*b* values in which 80≤L*≤100, −30≤a*≤0 and 80≤b*≤110.

<10> The ink composition of <1>, wherein the ink composition is a magenta ink composition, and the oil-soluble dye comprises a compound represented by the following formula (IV), and the composition has the L*a*b* values in which 30≤L*≤64, 55≤a*≤105 and −40≤b*≤10:

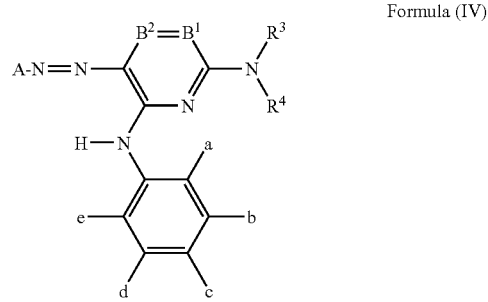

Formula (IV)

wherein in the formula (IV),

A is a residue group of a 5-membered heterocyclic diazo component A-NH$_2$;

$B^1$ is a nitrogen atom or —CR$^1$=, and $B^2$ is a nitrogen atom or —CR$^2$=, provided that $B^1$ and $B^2$ are not simultaneously nitrogen atoms, wherein $R^1$ and $R^2$ are each independently a hydrogen atom, a halogen atom or a monovalent substituent;

$R^3$ and $R^4$ are each independently a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group;

$R^1$ and $R^3$, and $R^3$ and $R^4$ may be linked to each other to form a 5- or 6-membered ring;

a and e are each independently an alkyl group, an alkoxy group or a halogen atom, and when both a and e are alkyl groups, the total number of the carbon atoms that constitute the alkyl groups is 2 or more;

b, c and d have the same definition as $R^1$ and $R^2$; and a and b, and e and d may be linked to each other to form a condensed ring structure.

<11> The ink composition of <10>, wherein the pigment has the L*a*b* values in which 40≤L*≤62, 65≤a*≤95 and −30≤b*≤0.

<12> The ink composition of <1>, wherein the ink composition is a cyan ink composition, and the oil-soluble dye comprises at least one compound selected from compounds represented by the following formulas (V) and (VI), and the composition has the L*a*b* values in which 35≤L*≤69, −60≤a*≤−10 and −70≤b*≤−20:

Formula (V)

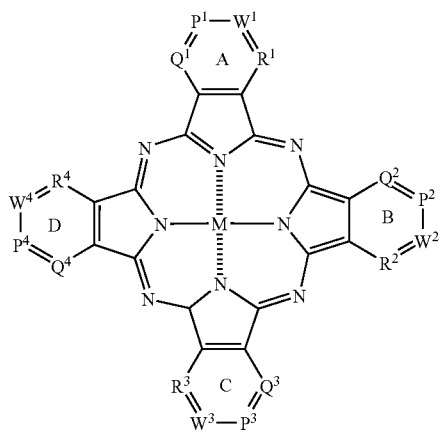

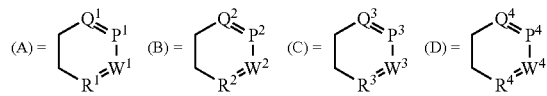

wherein in the formula (V), $Q^1$ to $Q^4$, $P^1$ to $P^4$, $W^1$ to $W^4$ and $R^1$ to $R^4$ are each independently (=C($J_1$)- and/or —N=), (=C($J_2$)- and/or —N=), (=C($J_3$)- and/or —N=) or (=C($J_4$)- and/or —N=), wherein $J_1$ to $J_4$ are each independently a hydrogen atom and/or a substituent, provided that the four rings respectively consisting of ($Q^1$, $P^1$, $W^1$ and $R^1$), ($Q^2$, $P^2$, $W^2$ and $R^2$), ($Q^3$, $P^3$, $W^3$ and $R^3$) and ($Q^4$, $P^4$, $W^4$ and $R^4$) {ring A: (A), ring B: (B), ring C: (C) and ring D: (D)} are not simultaneously aromatic rings; that when all of the four rings are simultaneously pyridine rings, a pyridine ring in which one of $Q^1$ or $R^1$ is a nitrogen atom, a pyridine ring in which one of $Q^2$ or $R^2$ is a nitrogen atom, a pyridine ring in which one of $Q^3$ or $R^3$ is a nitrogen atom, and a pyridine ring in which one of $Q^4$ or $R^4$ is a nitrogen atom are excluded; and that the case where all of the four rings are simultaneously pyrazine rings is excluded, when $J_1$ to $J_4$ are each a substituent, the substituent may further have substituents, at least one of $J_1$ to $J_4$ or at least one of the substituents possessed by $J_1$ to $J_4$ have a substituent having 2 or more carbon atoms, and the total number of carbon atoms of the substituents for $J_1$ to $J_4$ is 8 or more, and ionic hydrophilic groups are not included in a molecule of the compound, and M is a hydrogen atom, a metal atom, a metal oxide, a metal hydroxide or a metal halide;

Formula (VI)

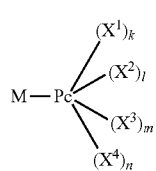

Formula (VII)

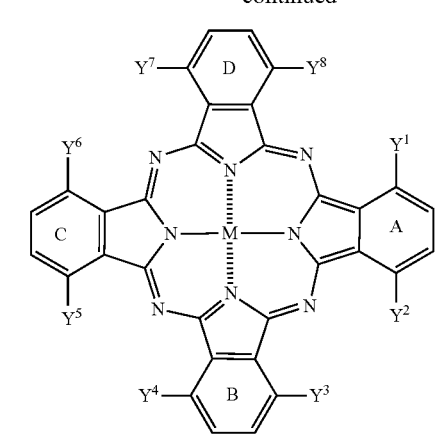

wherein in the formulas (VI) and (VII),

M is a hydrogen atom, a metal atom, a metal oxide, a metal hydroxide or a metal halide;

Pc is a phthalocyanine nucleus represented by the formula (VII) having a valency of (k+l+m+n);

$X^1$, $X^2$, $X^3$ and $X^4$ are each independently —SO—$R^1$, —$SO_2$—$R^1$, —$SO_2NR^2R^3$, —$CONR^2R^3$, —$CO_2$—$R^1$ or CO—$R^1$, and at least one or more of $X^1$, $X^2$, $X^3$ or $X^4$ exists on each of the four benzene rings {A, B, C and D in the formula (VII)} in the phthalocyanine nucleus, provided that $X^1$, $X^2$, $X^3$ and $X^4$ are not all the same, at least one of $X^1$, $X^2$, $X^3$ or $X^4$ is a substituent having 2 or more carbon atoms, the total number of carbon atoms of the substituents represented by $X^1$, $X^2$, $X^3$ and $X^4$ is 8 or more, and ionic hydrophilic groups are not included in the molecules;

$R^1$ is an unsubstituted or substituted alkyl group, an unsubstituted or substituted aryl group, or an unsubstituted or substituted heterocyclic group;

$R^2$ is a hydrogen atom, an unsubstituted or substituted alkyl group, an unsubstituted or substituted aryl group or an unsubstituted or substituted heterocyclic group;

$R^3$ is an unsubstituted or substituted alkyl group, an unsubstituted or substituted aryl group or an unsubstituted or substituted heterocyclic group;

k, l, m and n are respectively an integer satisfying $0 \le k \le 8$, an integer satisfying $0 < l < 8$, an integer satisfying $0 \le m < 8$ and an integer satisfying $0 \le n < 8$, provided that k, l, m and n are numbers that satisfy $4 \le k+l+m+n \le 8$; and $Y^1$, $Y^2$, $Y^3$, $Y^4$, $Y^5$, $Y^6$, $Y^7$ and $Y^8$ are each independently a hydrogen atom or a monovalent substituent, and the monovalent substituents each may further have substituents.

<13> The ink composition of claim <12>, wherein the pigment has the L*a*b* values in which $45 \le L^* \le 65$, $-50 \le a^* \le -20$ and $-60 \le b^* \le -30$.

<14> An ink for inkjet recording comprising the ink composition of <1>.

<15> An ink set comprising the ink for inkjet recording.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink for inkjet recording comprising an ink composition comprising a polymerizable compound, a polymerization initiator, a pigment and an oil-soluble dye, wherein the pigment and the oil-soluble dye are in any combination of a yellow pigment and a yellow oil-soluble dye, or a magenta pigment and a magenta oil-soluble dye, wherein the yellow oil-soluble dye comprises at least one compound selected from compounds represented by the following formulas (I-1), (II) and (III):

Formula (I-1)

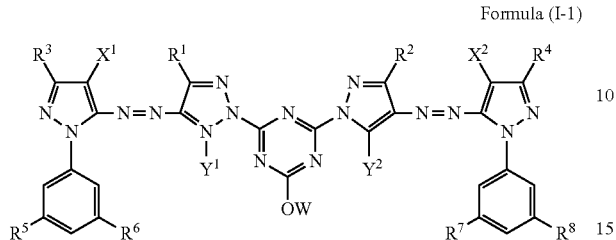

wherein in the formula (I-1),

W, $Y^1$, $Y^2$ and $R^1$ to $R^4$ are each independently a hydrogen atom or a monovalent substituent;

$R^5$ to $R^8$ are each independently an alkoxycarbonyl group; and $X^1$ and $X^2$ are each independently a monovalent electron-withdrawing group having a Hammett's σp value of 0.20 or more;

Formula (II)

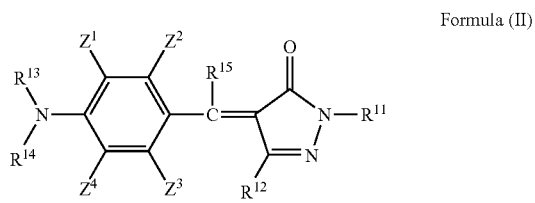

wherein in the formula (II), $R^{11}$, $R^{13}$ and $R^{14}$ are each independently an unsubstituted or substituted alkyl group, an unsubstituted or substituted aryl group or an unsubstituted or substituted heteroaryl group, and $R^{12}$ and $R^{15}$ are each independently a hydrogen atom or a monovalent substituent, wherein $R^{13}$ and $R^{14}$ may be linked to each other to form a 5- or 6-membered hetero ring; and $Z^1$, $Z^2$, $Z^3$ and $Z^4$ are each independently a hydrogen atom or a monovalent substituent, wherein $Z^1$ and $Z^2$, and $Z^3$ and $Z^4$ may be linked to each other to form a 5- or 6-membered ring;

Formula (III)

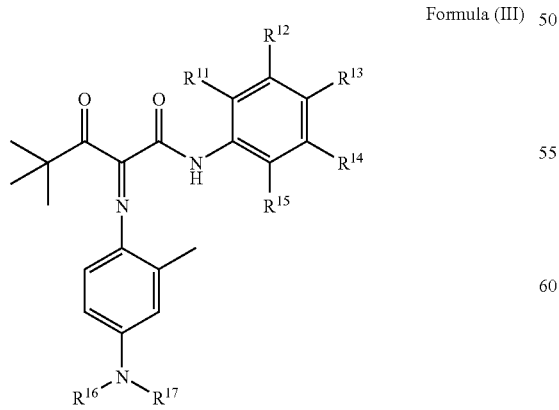

wherein in the formula (III), $R^{11}$, $R^{12}$, $R^{13}$, $R^{14}$ and $R^{15}$ are each independently a hydrogen atom or a monovalent substituent; and $R^{16}$ and $R^{17}$ are each independently an unsubstituted or substituted alkyl group, an unsubstituted or substituted aryl group or an unsubstituted or substituted heteroaryl group, and may be linked to each other to form a ring;

wherein the magenta oil-soluble dye comprises a compound represented by the following formula (IV-1):

Formula (IV-1)

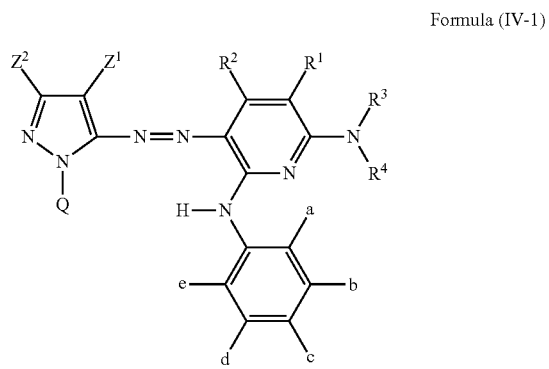

wherein in the formula (IV-1), $Z^1$ is a cyano group; $Z^2$ is an isopropyl group or a t-butyl group; $R^1$ is a hydrogen atom; $R^2$ is an alkyl group having 1 to 4 carbon atoms; $R^3$ and $R^4$ are each independently an alkyl group, an aryl group, a heterocyclic group, a sulfonyl group or an acyl group; a and e are each an alkyl group which may be substituted, wherein the number of carbon atoms of a+e is 2 or more; b, c and d are each independently a hydrogen atom, a halogen atom or an alkyl group; and Q is a heterocyclic group.

2. The ink for inkjet recording of claim 1, wherein the content of the oil-soluble dye is from 0.05% by mass to 10% by mass with respect to the total amount of the ink composition.

3. The ink for inkjet recording of claim 1, wherein the content of the oil-soluble dye is from 0.2% by mass to 3% by mass with respect to the total amount of the ink composition.

4. The ink for inkjet recording of claim 1, wherein the mass-based content ratio of the pigment to the oil-soluble dye is from 95/5 to 50/50.

5. The ink for inkjet recording of claim 1, wherein the mass-based content ratio of the pigment to the oil-soluble dye is from 85/15 to 60/40.

6. The ink for inkjet recording of claim 1, wherein the polymerizable compound is an unsaturated carboxylic acid or a salt thereof.

7. The ink for inkjet recording of claim 1, wherein the polymerization initiator is a benzophenone derivative.

8. An ink set comprising the ink for inkjet recording of claim 1.

9. The ink for inkjet recording of claim 1, wherein the yellow pigment is any of Pigment Yellow 74, 93, 97, 110, 120, 138, 139, 154, 155, 180 or 185.

10. The ink for inkjet recording of claim 1 wherein the magenta pigment is either of Pigment Red 202 or Pigment Violet 19.

11. The ink for inkjet recording of claim 1, wherein the amount of solvent is from 0 to 5% by mass with respect to the total amount of the ink composition.

* * * * *